United States Patent
Selviah et al.

(10) Patent No.: US 11,049,267 B2
(45) Date of Patent: Jun. 29, 2021

(54) APPARATUS, METHOD, AND SYSTEM FOR ALIGNMENT OF 3D DATASETS

(71) Applicant: UCL BUSINESS PLC, London (GB)

(72) Inventors: David R. Selviah, London (GB); Eero Willman, London (GB)

(73) Assignee: UCL BUSINESS PLC, London (GB)

( * ) Notice: Subject to any disclaimer, the term of this patent is extended or adjusted under 35 U.S.C. 154(b) by 27 days.

(21) Appl. No.: 16/481,450

(22) PCT Filed: Jan. 26, 2018

(86) PCT No.: PCT/GB2018/050233
§ 371 (c)(1),
(2) Date: Jul. 26, 2019

(87) PCT Pub. No.: WO2018/138516
PCT Pub. Date: Aug. 2, 2018

(65) Prior Publication Data
US 2020/0043186 A1 Feb. 6, 2020

(30) Foreign Application Priority Data
Jan. 27, 2017 (GB) ..................................... 1701383

(51) Int. Cl.
*G06T 7/33* (2017.01)
*G06K 9/62* (2006.01)

(52) U.S. Cl.
CPC .............. *G06T 7/33* (2017.01); *G06K 9/6203* (2013.01); *G06T 2207/10028* (2013.01); *G06T 2207/10088* (2013.01); *G06T 2207/30004* (2013.01)

(58) Field of Classification Search
CPC ............. G06T 7/33; G06T 2207/10028; G06T 2207/10088; G06T 2207/30004; G06K 9/6203
See application file for complete search history.

(56) References Cited

U.S. PATENT DOCUMENTS

| | | | |
|---|---|---|---|
| 8,351,656 B2 | 1/2013 | Spicola et al. | |
| 2009/0232388 A1* | 9/2009 | Minear | G06T 3/0075 382/154 |
| 2013/0039555 A1 | 2/2013 | Xu et al. | |

(Continued)

OTHER PUBLICATIONS

Rusu, R. "Semantic 3D Object Maps for Everyday Manipulation in Human Living Environments," Doctor of Computer Science Dissertation, Institut für Informatik der Technischen Universität München, University of Munich, Jul. 14, 2009, 284 pages.

(Continued)

*Primary Examiner* — David F Dunphy
(74) *Attorney, Agent, or Firm* — McCoy Russell LLP

(57) ABSTRACT

The present invention lies in the field of 3D surveying, mapping, and imaging. In particular, the present invention relates to the rotational alignment of 3D datasets. Embodiments include an apparatus method and program for rotational and optionally also translational alignment of 3D datasets. The 3D datasets being stored as point clouds, transformed into vector sets, and the vector sets being represented as a unit sphere or Gaussian sphere and compared for best alignment. The found best alignment is used to rotate the two 3D datasets into rotational and translational alignment with one another.

33 Claims, 14 Drawing Sheets

(56) References Cited

U.S. PATENT DOCUMENTS

| | | | | |
|---|---|---|---|---|
| 2013/0081805 | A1* | 4/2013 | Bradford | G01V 1/40 166/250.1 |
| 2014/0037194 | A1* | 2/2014 | Kitamura | G01B 11/24 382/154 |
| 2014/0118716 | A1* | 5/2014 | Kaganovich | G06T 7/254 356/4.01 |
| 2016/0379083 | A1* | 12/2016 | Sala | G06T 7/75 345/633 |
| 2020/0183009 | A1* | 6/2020 | Iwai | G01S 17/931 |

OTHER PUBLICATIONS

Temerinac-Ott, M. et al., "Evaluation of a New Point Clouds Registration Method based on Group Averaging Features," Proceedings of the 20th International Conference on Pattern Recognition, Aug. 23, 2010, Istanbul, Turkey, 4 pages.

Lagüla, S. et al., "Automatic Procedure for the Registration of Thermographic Images With Joint Clouds," Proceedings of the International Society for Photogrammetry and Remote Sensing, Aug. 25, 2012, Melbourne, Australia, 6 pages.

Zhang, L. et al., "An Improved RGB-D SLAM Algorithm based on Kinect Sensor," Proceedings of the 2015 IEEE International Conference on Advanced Intelligent Mechatronics (AIM), Jul. 7, 2015, Busan, South Korea, 8 pages.

Wu, H. et al., "Registration of Airborne LiDAR Point Clouds by Matching the Linear Plane Features of Building Roof Facets," Remote Sensing, vol. 8, No. 6, May 25, 2016, 17 pages.

ISA European Patent Office, International Search Report and Written Opinion Issued in Application No. PCT/GB2018/050233, dated Jul. 18, 2018, WIPO, 58 pages.

\* cited by examiner

APPARATUS, METHOD, AND SYSTEM FOR ALIGNMENT OF 3D DATASETS

CROSS-REFERENCE TO RELATED APPLICATIONS

The present application is a U.S. National Phase of International Patent Application Serial No. PCT/GB2018/050233 entitled "APPARATUS, METHOD, AND SYSTEM FOR ALIGNMENT OF 3D DATASETS," filed on Jan. 26, 2018. International Patent Application Serial No. PCT/GB2018/050233 claims priority to Great Britain Patent Application No. 1701383.0 filed on Jan. 27, 2017. The entire contents of each of the above-referenced applications are hereby incorporated by reference for all purposes.

TECHNICAL FIELD

The present invention lies in the field of 3D surveying, mapping, and imaging. In particular, the present invention relates to the rotational alignment of 3D datasets.

BACKGROUND AND SUMMARY 3D survey datasets enable the creation of computerised 3D datasets, models, and meshes, for analysis, calculation, measurement and monitoring of the surveyed space. It is often the case that all parts of a space to be surveyed cannot be included in the field of view of an imaging apparatus at a single location. Multiple images, scans or surveys are taken at different times and with the imaging apparatus at different locations and orientations, or with multiple variously positioned and oriented scanners simultaneously, and the multiple images are subsequently merged.

Presently, techniques for determining rotational and translational alignment of the multiple 3D datasets are labour intensive. At a time of imaging, where the subject of interest is accessible, artificial targets or features must be placed in an imaged location common to two images to be merged.

For inaccessible subjects of interest (eg, underground geological surveys or the human body), preparation is required to identify a feature that may be designated as a virtual or natural target. The natural target is identified in processing the images and forms an anchor point or points for combining data from the two images. Targets may be natural, identified in the images prior to alignment, or artificial, introduced to the field of vision.

It is desirable to provide a reliable automated technique for the rotational alignment of overlapping 3D datasets.

STATEMENTS OF INVENTION

Statement 1

Embodiments of a first aspect include an apparatus comprising: a 3D dataset acquisition unit, configured to: obtain from an imaging apparatus at a first position and orientation, a first 3D dataset of a first space at a first time, the first 3D dataset being a first point cloud in three dimensions, each point in the first point cloud representing a reading within the first space by the imaging apparatus; and obtain from an imaging apparatus at a second position and orientation, a second 3D dataset of a second space at a second time, the second space and the first space overlapping the second 3D dataset being a second point cloud in three dimensions, each point in the second point cloud representing a reading within the second space by the imaging apparatus; a storage unit configured to store the first 3D dataset and the second 3D dataset as respective clouds of points in a common coordinate system; and a rotational alignment processor configured to: transform the stored first point cloud into a first set of vectors, and transform the stored second point cloud into a second set of vectors, wherein each member of the first set of vectors and each member of the second set of vectors represents the respective point and neighbouring points; find at which angle of rotation of the second set of vectors relative to the first set in one or more of three axes of rotation, defined in the common coordinate system, the greatest degree of matching between the angular distribution of the first set of vectors and the angular distribution of the second set of vectors is obtained. The rotational alignment processor is further configured to store or output the angle of rotation about each of the one or more axis or axes of rotation for which the calculated degree of matching is greatest; or rotate the second point cloud by the stored angle of rotation about the respective one or more axes of rotation in the common coordinate system and output the rotated second point cloud in the common coordinate system.

Advantageously, embodiments provide a mechanism to improve 3D imaging apparatus and imaging processes by determining a rotation vector by which one obtained 3D dataset is to be rotated to be brought into rotational alignment with another, overlapping, 3D dataset. Importantly, the mechanism is analytical and obviates the present requirement for artificial targets to be manually positioned and, where high accuracy is required, separately surveyed, within the space to be imaged and obviates the need to identify and find the location and orientation of natural targets. Spaces can be scanned by a scanner (imaging apparatus) generating separate datasets representing said scanning without the need to maintain consistent orientation and/or position of an imaging apparatus between the datasets, thereby speeding up the setting up of the imaging procedure and obviating the requirement for, for example, a fixed frame or tripod for the imaging apparatus.

The rotational alignment of 3D datasets allows subsequent highly accurate measurement of distances on the aligned dataset, scan, point cloud, model or mesh without having to go back to the site to do the measurement.

Of course, embodiments can be extended to deal with more than two scans (i.e. >2 3D datasets) of a space by aligning individual pairs of overlapping scans in turn.

High quality 3D datasets and models are readily created from two overlapping datasets of a subject of interest where neither knowledge of the relative orientation of the imaging apparatus from dataset to dataset, knowledge of the relative orientation of the imaging apparatus to the subject of interest, nor the placement of artificial targets nor the surveying of their positions, nor the identification of the location and orientation of natural targets is required. Overlapping includes both datasets overlapping one another in terms of the physical space they represent, and/or may be overlapping one or several common natural features, which common natural features could be a plane, such as a floor or wall or could be a rod, pipe, railway line, or hanging wire, for example. The datasets are, for example, scan datasets or image datasets, that is to say, data generated by scanning or imaging a physical space.

The 3D datasets can be represented by 3D point clouds and viewed as 3D images.

A further advantage lies in the ease with which downstream dataset processing can be applied to the output rotationally aligned datasets without which several otherwise good translational alignment methods and pattern recognition methods cannot be used.

Scans

Each of the datasets obtained by the 3D dataset acquisition unit comprises data recorded at successive points in the imaging process, each point being separated from its neighbour to a degree dictated by the resolution and direction of the imaging, each point recording data about the position of the point relative to the imaging apparatus or relative to an already-scanned (in the same scan) point, and each point being generated by an imaging apparatus in response to a reading, in other words, each point in the dataset represents a reading by a imaging apparatus. In turn, a reading is a recording of the response received by the imaging apparatus from an interaction with the transmitted or reflected beam at the point of interrogation when the scanner is active. Or if something is being emitted by the object the imaging apparatus is receiving it. In the case of measuring resistance there is an electric current.

The datasets are 3D datasets. The imaging apparatus may be, for example, a 3D scanner. Each dataset contains data representing a 3D image of a subject of interest.

The inputs, the first and second 3D datasets, may be restricted to being scans of a physical space. Alternatively, embodiments may obtain 3D datasets of a virtual space as one or both of the first and second 3D datasets. Often 3D point clouds are represented as mesh models in virtual space to reduce memory, storage, rotation and translation calculation speed and transmission bandwidth requirements. For similar reasons, 3D datasets are often generated as mesh models for use in virtual space. In order to align mesh models with point clouds or with other mesh models the mesh models may be converted into point clouds, for example, by changing the mesh nodes to points or by interpolation and sampling, after which the methods described in this document can be used. Alternatively, the vector representations described in this document can be directly extracted from the mesh model for the rotational methods described in this document to be used.

The first 3D dataset and second 3D dataset may be obtained from the same imaging apparatus or may be obtained from different imaging apparatuses. The imaging apparatuses are operable to take readings within a space. The readings are, for example, locations of emission or reflection or absorption of a wave or particle detected by the imaging apparatus. The imaging apparatuses are operable to interpret readings as physical features within 3D space, and to generate a data point in a point cloud corresponding to the reading. A physical feature may be, for example, a surface or an interface between two materials. The imaging apparatus used to generate the first 3D dataset and second 3D dataset may image using different imaging techniques. For example, the first imaging apparatus may be an X-ray scanner and the second imaging apparatus an MRI scanner. Alternatively, in the optional further step of reduction of the respective datasets to one-dimensional arrays, an extra variable of scale or magnification can be varied along with translations until a best agreement is found. The size of one scan relative to the other is increased or decreased, and all the other steps are the same.

The reading can record the distance from the imaging apparatus to the point. Readings can record such values as position in x, y, z Cartesian coordinates or in cylindrical or spherical or geographic or other coordinates such as space-time. The reading can include date and time and person or instrument doing the recording as well as the resolution set and power of the laser used. The reading can record the strength of the reflected or transmitted or absorbed signal from the laser or sound wave. The reading may record the intensity and colour of any light or radiation or sound emitted from the point and detected by the apparatus. The reading may also include a property of the point and its neighbouring points such as the curvature of the surface and the position and orientation of a small flat plane patch fitted to the point and its neighbouring points which can be represented as a surface normal vector. The reading may also include derived properties such as the divergence of the surface normal vectors and whether the curvature is positive or negative and the direction of the surface normal vector. The reading can record the resistivity or conductivity or capacitance or inductance or electrical complex permittivity or magnetic complex permeability of the space or the speed of travel of electromagnetic or sound waves at that point. The reading may record the colour of a surface of volume in r, g, b coordinates or in any of the following colour coordinates CIELAB, CIELUV, CIExyY, CIEXYZ, CMY, CMYK, HLS, HSI, HSV, HVC, LCC, NCS, PhotoYCC, RGB, Y'CbCr, Y'IQ, Y'PbPr and Y'UV (reference https://people.sc.fsu.edu/~jburkardt/f_src/colors/colors.html). The reading may record the texture or roughness of a surface or the material of which the surface is made or material of which a volume is made. The reading may record any local movement velocity and acceleration and period and vector direction of the point being read over a short time scale by using a method such as Doppler. Note that when the imaging apparatus looks in one direction it may receive back more than one reading. If there is a solid opaque surface there will be generally one reading. But if the surface is slightly transparent or if there is no surface and it is just a volume being imaged there may be thousands of readings from different distances away from the imaging apparatus which distinguishes them from each other. So, for example, a reading may be x,y,z,r,g,b.

The first position and orientation and the second position and orientation are of respective imaging apparatuses relative to the space being imaged.

Overlap

The first space and the second space overlap. The extent of the overlap is implementation dependent, and will vary according to each pair of datasets. The extent of the overlap depends on the number of alignment features in the overlap region. Sufficient common features are needed for high accuracy alignment. The overlap is the overlap of common features. For example, the overlap may be at least a partial overlap, and may be total, for example, where the scans are taken at different times or with scanners using differing technologies and may be total where the scans are taken at different times or with scanners using differing technologies. For example, the overlap may be a common physical space represented in both the first and second datasets. Embodiments may include a preprocessing step as part of the obtaining by the 3D acquisition unit to remove from the input datasets some non-overlapping data.

The first and second space overlap. In an optional extension, it may be that the first and second space both overlap an extended feature which is common to both, but the two spaces do not directly overlap in space. Such extended features have potentially overlapping features such as lines, planes, cylinders, etc. which could be extended from the first space into the second space, for example, based on some knowledge that they do so. So one scan may scan part of a straight railway line or wall and the second scan may scan a different physical space but which includes another part of the railway line or wall. If it is known that the railway line or wall is straight then the apparatus can rotationally align both scans to the railway line or wall. From each scan it is possible to use pattern recognition to recognise the rail or the wall. In the translational alignment step the scans in 2D are aligned normal to the rail or in 1D normal to the wall. If there are several, say rod or edge features at a range of angles to each other which are common to two non-directly overlapping scans (scan being analogous to dataset), then the apparatus can precisely locate one scan relative to the other along the rod directions as well as there will only be one place where the rods in the second scan precisely match the extended rods in the first scan. This is similar for several planes at different angles to each other or even for mixtures of planes, rods, edges, cylinders, toroids, cones and other shapes. This is all important as it then means it is not necessary to have all the scans physically overlapping in space, as long as there is some commonality in features, i.e. a feature appearing in both. An example is a self-driving car which can scan the kurb or white lines or yellow lines on a road and paving slab edges and wall planes and edges, and so align narrow non-overlapping scans.

Common Coordinate System

At the storage unit, the first and second 3D datasets are stored as respective point clouds in a common coordinate system. The common coordinate system is a workspace. Each of the first and second 3D datasets has a native coordinate system in which the respective clouds of points are defined. A prerequisite of embodiments is that the first and second 3D datasets are compatible with the common coordinate system of the storage unit. For example, the native coordinate system may be relative to the position of the imaging apparatus for that dataset as the origin and orientation of the imaging apparatus. The first point cloud may be rotated and translated when placed into the workspace and the second point cloud may be differently rotated and translated when placed into the workspace.

Transforming Points to Vectors

The precise method executed in the transforming process is implementation specific. For examples, embodiments may transform the stored first point cloud into a first set of surface normal unit vectors, and transform the stored second point cloud into a second set of surface normal unit vectors. The rotation alignment processor performs best match finding between the two sets of vectors, and, hence, the two sets are comparable. For example, the same technique, method, or algorithm is used to transform the first point cloud into the first set of vectors as is used to transform the second point cloud into the second set of vectors.

For example, the vectors may represent a notional surface formed by the respective point and neighbouring points. Alternatively, the vectors may represent some other geometrical or other property of the points. For example, if the dataset represents an object such as an organ inside the body, there may not be any surfaces but just a 3D spatially varying set of readings. The vectors may be calculated by finding, for each point, the maximum gradient for each of the variables recorded in a reading.

The first point cloud is transformed into the first set of vectors and the second point cloud is transformed into the second set of vectors. There may be a one:one correspondence between points and vectors, or there may be a sampling ratio to reduce the number of vectors relative to the number of points. Points in the clouds of points represent readings by imaging apparatuses. Neighbouring points within a dataset form notional surfaces, that is to say, notional surfaces can be fitted to groups of points within a point cloud. The transforming includes, for each point of inquiry, generating a vector to represent a notional surface fitted to the point of inquiry and neighbouring points. The notional surface is thus referred to as informed by the respective point and neighbouring points. It will be appreciated that neighbouring points may be selected in different ways according to implementation requirements. Furthermore, it will be appreciated that various algorithms can be selected for the fitting of the notional surface to the group of points, and for generating a vector to represent said notional surface.

The points themselves or associated readings or attributes associated with the respective point or points may be transformed to vectors.

Find Best Match

The rotational alignment processor finds an orientation of best fit between the first and second sets of vectors, by finding at which angle about each axis of rotation of interest the two sets of vectors exhibit the greatest degree of matching. Effectively, one set of vectors is rotated about the other in each axis of rotation of interest until a best match is found. The degree of matching may be measured, for example, by using a mathematical correlation function/operator to compare the angular distribution of the two sets of vectors. For example, the mathematical correlation function/operator may be an existing mathematical correlation function/operator appropriate to the implementation.

The three axes of rotation may be orthogonal, or may be two co-planar (but if two axes are co-planar they are precluded from being parallel) and one non-co-planar axes.

Output

The output may comprise the second point cloud rotated by the rotational alignment processor. The output second point cloud is rotationally aligned with the stored first point cloud. The output may also include a copy of the stored first point cloud. For example, if the common coordinate system is different from the native coordinate system of the first 3D dataset, then in order to achieve two rotationally aligned datasets the apparatus may output both the rotated second 3D dataset and the first 3D dataset as respective clouds of points in the common coordinate system. The rotationally aligned datasets may be merged and output as a single image dataset file. By rotationally aligned datasets, it is taken to mean that physical entities represented in both datasets are co-aligned in the common coordinate system of the two datasets.

For some applications the output includes a vector or other representation of the amount of rotation performed around each axis as well, as this tells how much the imaging apparatus rotated and how it rotated between imaging procedures. So if the imaging apparatus is on a vehicle this rotation data can be used to tell how much the vehicle rotated. This is more accurate than use of fibre optic gyroscopes in inertial measurement units, IMU, when scans are taken at different times when the time is large between datasets due to drift in the IMU sensors.

The outputting may include merging the second point cloud with the first point cloud and outputting the merged point clouds. Also, the first point cloud may also be output. Also, if the first point cloud was rotated and translated when stored it may be output in the same coordinate space as the second point cloud.

The position of the first point cloud in the common coordinate system may also be output. If this was not previously known or output, it may be output here in the common coordinate system.

Statement 2

Optionally, the storage unit is configured to store the first point cloud and the output rotated second point cloud. The apparatus further comprises: a translational alignment processor configured to: for each of three or more lines in the common coordinates system, wherein each pair of lines from among the three lines is non-parallel and at least one pair of lines from among the three lines is non-co-planar: record the position, relative to an arbitrary origin, of a projection onto the line of each point among the first point cloud; store the recorded positions as a first 1-dimensional array, and/or store one or more properties or readings of each point at the respective recorded position as the first 1-dimensional array; record the position, relative to the arbitrary origin, of the projection onto the line of each point among the rotated second point cloud; store the recorded positions as a second 1-dimensional array, and/or store one or more properties or readings of each point at the respective recorded position as the second 1-dimensional array; find a translation along the line of the second 1-dimensional array relative to the first 1-dimensional array at which a greatest degree of matching between the first 1D array and the second 1D array is computed, and record the translation at which the greatest degree of matching is computed; and output either: the first point cloud and the rotated second point cloud as a merged point cloud in the common coordinate system, with the rotated second point cloud translated along each of the three lines in the common coordinates system by the respective recorded translation; and/or a vector representation of the three lines and recorded translation along each of the three lines, and a vector representation of the three axes of rotation and the respective stored angles of rotation; and/or the rotated second point cloud translated along each of the three lines in the common coordinates system by the respective recorded translation.

Advantageously, embodiments including the translational alignment processor provide a mechanism to calculate a positional shift (translation) required to position the two clouds of points such that the points representing the same features in the scanned space are co-located in the common coordinate system. Therefore, the two separate input datasets can be merged and treated as a single dataset. Embodiments achieve the merge in a computationally efficient manner and without the requirement for targets to be manually placed in the overlapping region of the imaged space, or for their positions to be surveyed, or for natural targets to be manually identified and their position and orientation noted, and without the need for a person to manually recognise corresponding features in the two scans and manually rotate and translate the scans to bring the corresponding features into alignment.

The 1-dimensional array records each point cloud data point as a point in one spatial dimension. Optionally, the contributions of each data point may be scaled by the inverse of the local point density in order to make the descriptors less dependent on point-to-point distances and less sensitive to scanning distance. It is noted that each point may have one or more properties in addition to position in the one spatial dimension, such properties include, for example, point density, point colour, reflective strength of each point. These additional properties can also be used in calculating mathematical correlation. The property or reading of each point may be the already-calculated vector representing the point and neighbouring points. The 1-dimensional array may be termed a histogram because in each portion of the array there is at least one number such as the total number of points or the colour or the combination of the readings or the vectors.

The three lines onto which the points are projected are common to both point clouds. The three lines could be the Cartesian co-ordinate axes or a geographic co-ordinate system or spherical or cylindrical co-ordinates. It is noted that three lines is a minimum and that >3 lines may be used.

The property or reading can also be direction of each of the different types of vector. In the case of vectors the correlation is performed by finding the dot products or inner products of the vectors in the two arrays and then doing the usual summation or integration to work out the correlation.

The projection onto a line is effectively a collapsing of the three dimensional point cloud onto a 1D rod or line. The projection onto the line may be along a vector normal to the line, at an angle to the line, or along a curve intersecting the line. The lines of projection may the Cartesian co-ordinate axes or a geographic co-ordinate system or spherical or cylindrical co-ordinates.

The translational alignment processor finds a translation along the line, for each of three or more lines, of one of the one-dimensional arrays relative to the other at which a best match between the two one-dimensional arrays is exhibited. The measured quantity may be, for example, spatial distribution of points. It may also be the colour reading or reflectivity reading or vector associated with the point (which vector may be either or both of a normal vector or sum vector at the point or another type of vector representing dataset points described herein). The more attributes are matched the more accurate the alignment will be to augment the value of the data derived from any single scan but it will be more computationally expensive as each attribute will independently be correlated. Initially spatial point density may be used, for example, with a lowpass filter or smoothing to get some positions of approximate alignment and then the resolution increased around those positions of approximate alignment. The finding may be performed by executing a best match searching and optimisation algorithm such as method of steepest descent, simulated annealing or Levenberg-Marquardt to find the best match position. The finding may comprise iteratively shifting the two arrays relative to one another between two extremes and calculating a degree of matching at each iteration. The two extremes may be, for example, the translation at which the maximum value among the first 1-dimensional array of positions coincides with the minimum value among the second 1-dimensional array of positions, and the translation at which the minimum value among the first 1-dimensional array of positions coincides with the maximum value among the second 1-dimensional array of positions. Alternatively, embodiments may make use of the Convolution Theorem by first Fourier Transforming each of the 1-dimensional arrays of readings and attributes in each of the scans. Then the Fourier Transforms of the same readings and attributes are overlaid with the same scale and origin and are multiplied together. Finally the resulting 1-dimensional array of readings and attributes are Inverse Fourier Transformed. The result is the same as if a correlation had been performed but it is often computationally and programmatically beneficial. Alternatively, embodiments may, after an optional segmenting process, recognise 3D objects and features and label the points associated with them before collapsing them onto a line. The 3D pattern recognition may, for example, be performed by 3D template matching, geometrical matching or by artificial intelligence techniques such as Deep Learning Convolutional Neural Networks. When the correlations are performed as two collapsed scans slide over one another along a line, the points associated with a particular type of object or feature are only correlated with those from a similar type of object or feature. Many independent correlations are performed for points associated with each type of object or feature and for each reading or attribute. These correlation magnitudes are combined in a weighted manner to give the total correlation or match for these scans. This has the advantage that points from one type of object or feature are not inadvertently correlated with those from a different type of object or feature as they retain their individual identities, resulting in more correct alignments. Alternatively, to speed the correlation calculations the recognised 3D objects and features can each be replaced by a single appropriately labelled point and the weights adjusted to compensate when combining correlations to calculate the total correlation.

It is noted that any two of the lines lie in a common plane. The point cloud may be also be projected onto this and other common planes. The projection onto the common plane may be along a vector normal to the common plane, at an angle to the common plane, or along a curve onto the common plane. The lines of projection may be the Cartesian co-ordinate axes or a geographic co-ordinate system or spherical or cylindrical co-ordinates. Each point cloud will form a collapsed image on the common plane. The images from the two overlapping scans may be moved laterally in the plane along the two lines until the positions along each line of the greatest degree of match or correlation is achieved. This method differs from the method of projection onto the lines in that the relative positions of features of the collapsed images are preserved in terms of their distance co-ordinates along the two lines. So, the features of the collapsed images are labelled with two dimensional co-ordinates. Whereas when the point clouds are collapsed onto the lines alone they only preserve one dimensional distance co-ordinates along each line. On the collapsed plane, it is advantageous to perform the correlations making use of the Convolution Theorem, by 2D Fourier Transforming the two patterns on the common plane from the two scans, overlaying them on the same scale with the same origin, multiplying them and Inverse Fourier Transforming them. However, the calculation of two one dimensional matches or correlations along two separate lines is much less computationally expensive than the calculation of one two dimensional match or correlation of a collapsed image on the common plane. The loss of the two dimensional co-ordinates of features are compensated by collapsing the point cloud onto more than three lines. Alternatively, this can be overcome on lines by using the x, y coordinates from the collapsed plane image as labels or readings or attributes to be assigned to each point which move with the points so this knowledge is not lost and is taken into account after collapsing to a line when performing the correlations. Alternatively, these two methods can be combined by both collapsing the point cloud to one common plane and also to one line normal or at an angle to that plane. The common plane could optionally be taken to be the horizontal, when it is known, and the line could be the vertical axis.

For some applications the output includes a vector or other representation of the amount of translation along each axis as well as this tells how much the imaging apparatus moved and in what direction between imaging procedures. So if the imaging apparatus is on a vehicle this translation data can be used to tell how much the vehicle moved. This is more accurate than use of accelerometers in inertial measurement units, IMU, when datasets are taken at different times when the time is large between datasets. Advantageously, the 3D track of the vehicle can be worked out very precisely in this way. In other words, the point of the alignment is to work out the vehicle track and orientation.

As an alternative, the output may comprise the second cloud correctly rotated and translated, or just the first and second clouds correctly oriented and translated in the common co-ordinate system or the two clouds can be merged.
Statements 3-7

The mechanisms for rotational and translational alignment of embodiments are not limited by the imaging technique. The mechanisms are imaging apparatus agnostic, wavelength agnostic, and imaging technique agnostic (agnostic in these contexts meaning independent). Furthermore, embodiments provide a mechanism to align datasets from different imaging apparatuses, or the same imaging apparatus in different locations or at different times, but also to align datasets obtained by different imaging mechanisms. For example, an MRI scan can be aligned with an X-ray scan of an overlapping space (subject).

Exemplary imaging mechanisms and imaging subjects are set out below.

Optionally, the imaging apparatus from which one or both of the first 3D dataset and the second 3D dataset is obtained is a LIDAR scanner.

The space being imaged may be, for example, the inside of a building, the outside of a building, a landscape, an open cast mine, a coastline, the inside or outside of a pipe or network of pipes, a cave, a tunnel such as a mining tunnel, a road, parts of a person or animal, or a skeleton.

LIDAR may also be written Lidar, LiDAR, or LADAR, and means light detection and ranging. The wavelength used by the scanner may be ultraviolet, visible, or near infrared.

The spatial overlap between the first 3D dataset and the second 3D dataset may be substantially complete overlap, but the first time may be different from the second time, so that a space can be imaged at different times (for example to observe changes over time) without a requirement that the LIDAR be positioned and oriented identically relative to the space for both datasets.

The LIDAR scanner may be a 2D scanner that takes a 3D scan by movement of the scanner relative to the scanner or movement of the subject relative to the scanner. Alternatively, the LIDAR scanner may scan in 3D. Alternative optical 3D scanning apparatus includes interferometers, photogrammetry, projection imaging, scanning focal plane, shape from shadow, optical flow. Further alternatives for scanning apparatus are provided below in the description of FIG. 3.

As a further example, the imaging apparatus from which one or both of the first 3D dataset and the second 3D dataset is obtained is a ground penetrating radar or through wall radar using polarised or unpolarised electromagnetic waves and the imaged space is subterranean or blocked from vision via visible light by a wall or other structure. An application of ground penetrating radar is to detect reflection from wet patches of subterranean material, pipes, archaeological remains, unexploded ordnance and tunnels.

For example, the polarised or unpolarised electromagnetic waves may be in the microwave band in the frequency range 100 MHz to 2.6 GHz in ground penetrating radar and 1.6 GHz to 10 GHz for through wall radar and 2.4 GHz for wifi assisted through wall radar. The ground penetrating or through wall radars may be Doppler radars detecting movement of surfaces or subjects.

Optionally, the imaging apparatus from which one or both of the first 3D dataset and the second 3D dataset is obtained is an electrical resistivity tomography scanner inserted into a ground surface and the imaged space is below the ground surface.

As an alternative imaging technique for subterranean scanning, the imaging apparatus from which one or both of the first 3D dataset and the second 3D dataset is obtained is a seismic tomography scanner detecting seismic waves.

Optionally, the imaging apparatus from which one or both of the first 3D dataset and the second 3D dataset is obtained is an electrical impedance tomography scanner comprising electrodes for placement on a skin of a subject animal, and the imaged space is interior of the subject animal.

As an alternative technique for scanning the interior of a subject animal:

Optionally, the imaging apparatus from which one or both of the first 3D dataset and the second 3D dataset is obtained is an MRI scanner or a scanner detecting nuclear quadrupole resonance, and the imaged space is the interior of a subject animal.

Advantageously, embodiments may align a scan from an electrical impedance tomography scanner with a scan from an MRI or nuclear quadrupole scanner without needing any information about the relative position or orientation of the respective scanners.

A nuclear quadrupole scanner is a scanner detecting nuclear quadrupole resonance.

As an alternative technique for scanning the interior of a subject animal (eg human):

the imaging apparatus from which one or both of the first 3D dataset and the second 3D dataset is obtained is an ultrasound scanner, and the imaged space is the interior of a subject animal Optionally, the imaging apparatus from which one or both of the first 3D dataset and the second 3D dataset is obtained is a sonar scanner.

Sonar is a scanning technique that is based on the detection of sound waves, and embodiments may be implemented with passive (listening for sound) or active (emitting sound and listening for reflection thereof) sonar scanners. Sonar may be taken to mean sound navigation and ranging and may include Doppler detection of moving surfaces or subjects.

For example, the scanned space may be submerged, such as submarine. In particular, the scanned space may include the seabed.

Statement 8

Optionally, the 3D dataset acquisition unit comprises a denoising processor, wherein obtaining the first 3D dataset and obtaining the second 3D dataset includes the denoising processor executing a denoising algorithm on the first point cloud, and executing the denoising algorithm on the second point cloud.

Advantageously, running a denoising algorithm emphasises the readings caused by physical features of a subject of interest in the imaged space. Therefore, the strength of matches found by the translational and rotational alignment processors when datasets (i.e. sets of vectors or arrays) are properly aligned is enhanced.

Denoising in the present context means noise filtering, that is to say, signal processing to remove noise, which may be filtering out noise. The denoising processor is a processor which executes signal processing to enhance the signal to noise ratio of the respective datasets.

The denoising algorithm may be, for example, a bilateral denoising algorithm, a deconvolution function, or a Wiener filter. In applications in which a movement track of the scanner is sought, the denoising algorithm may be a Kalman Filter or a Mean or Median Filter or a Particle filter or Heuristics-Based Outlier detection in addition to some interpolation.

Statement 9

Optionally, the vectors of the first set of vectors are surface normal unit vectors, and the vectors of the second set are surface normal unit vectors; and transforming the first point cloud into a first set of surface normal vectors and transforming the second point cloud into a second set of surface normal vectors, comprises generating the first set of surface normal vectors and generating the second set of surface normal vectors by: for each point cloud individually, for each point in the respective point cloud as an inquiry point: selecting a set of neighbour points, calculating a covariance matrix for the set of neighbour points and the inquiry point; solving the covariance matrix to find the three eigenvalues and three eigenvectors for the covariance matrix, determining the eigenvector with the smallest eigenvalue, normalising the eigenvector to a predetermined unit length, adding the normalised unit vector to the respective first or second set of normal vectors.

Alternatively, a small flat plane patch can be aligned to points in a neighbourhood of an inquiry point to minimise the distance of points from the plane. Then the surface normal of this small flat plane patch can be taken to be the surface normal at that point. The direction of the surface normal is chosen so that it points towards the scanner by ensuring that the angle between the surface normal vector and the vector from the point to the scanner is always less than 180 degrees.

The transforming technique yields a set of surface normal unit vectors that accurately represent the point cloud, so that physical features represented in both datasets are represented consistently across the two sets of surface normal unit vectors. Hence, finding a best match between the angular (and spatial) distributions of the two sets of vectors is facilitated in a computationally efficient manner.

Optionally, prior to selecting the set of neighbour points, the process may (depending on the type of point cloud and its density distribution) include executing a sampling algorithm configured to mutually standardise the point density per unit area or per unit volume across the first and second clouds of points.

SPECIFIC EXAMPLES

The sampling algorithm may leverage an Octree or kd tree data structure for storing unstructured 3D data that make fast spatial searches on this data possible. The sampling algorithm may execute random sampling, or substantially uniform Euclidean distance between points. If Octree or kd tree is used as a data structure to sample, the selecting a set of neighbour points is simplified by the existing tree structure. If another data structure is used, the processing may include setting up and populating a tree structure for the respective clouds of points prior to selecting the sets of neighbour points.

Selecting the set of neighbour points may comprise a fixed distance neighbour point method of finding all points within a predefined radius sphere centred on the point of inquiry, or a K nearest neighbours method of finding the nearest N points to the point of inquiry based on Euclidean distance.

In terms of the sampling algorithm, it is noted that:

This standardisation of point density per unit volume must not be carried out for the calculation of the point density gradient vector otherwise it removes the variation in point density which is what that vector is finding.

This sampling is optional but advantageous to find the vectors (other than point density gradient vector). The unsampled or sampled data may be used in the translational alignment processing.

The unsampled or sampled data may be used to recognise 3D shapes. If the method involves finding any vectors (other than the point density gradient vector) then it may be necessary, for certain types of vector, to sample to get uniform point density before vector calculation. Methods for calculating surface normal do not require uniform point density. After the shape and its position and orientation have been found as best as possible from the sampled uniform density points then the removed points can be returned and then a final fine alignment performed to minimise error from the shape using all the points to get the highest accuracy.

Statement 10

Embodiments may also include the following process for selecting the set of neighbour points: choose an inquiry point and form a small search radius sphere around it. Use Principal Component Analysis, PCA on all points inside the sphere. If there is a plane the components output from PCA will lie two in the plane and one normal to it. The smallest magnitude one is the normal to the plane. Draw a unit vector along this direction as a normal direction. Repeat for every point.

Optionally, selecting the set of neighbour points for the inquiry point comprises selecting each of the points within a sphere of a predefined radius with an origin coincident with the inquiry point, or a K nearest neighbours method of finding the nearest N points to the point of inquiry based on Euclidean distance; and transforming the first point cloud into a first set of surface normal unit vectors and/or transforming the second point cloud into a second set of surface normal unit vectors further comprises: storing the respective set of surface normal unit vectors as a reference set of normal unit vectors; repeating the generating the respective set of surface normal unit vectors with a progressively smaller radius of the sphere until a minimum radius is reached, at which point the repeating is terminated and the reference set of surface normal unit vectors is set as the respective set of surface normal unit vectors, at each repetition: determining a degree of confidence with which the respective set of surface normal unit vectors generated in the repetition match the reference set of surface normal unit vectors, and if the determined degree of confidence satisfies a predetermined criterion, setting the reference set of surface normal unit vectors as the respective set of surface normal unit vectors, and terminating the transforming, and if the determined degree of confidence does not satisfy the predetermined criterion, replacing the stored reference set of surface normal unit vectors with the respective set of surface normal unit vectors generated in the repetition, and continuing the repeating.

Advantageously, the repetitive technique for setting the radius set out above provides an empirical technique for finding the best radius for fixed distance neighbour points method. Furthermore, implementing the above technique on a region-by-region (which regions may be determined by a segmentation algorithm) basis is computationally efficient. As a further alternative, once one dataset has been transformed, the radius value can be the initial radius used for the second dataset. If the next dataset does not meet the predetermined criterion then the radius can be scanned over a larger range to find the best radius.

The predetermined criterion may be, for example, a threshold degree of confidence (i.e. does the determined degree of confidence exceed the threshold degree of confidence). Alternatively, the predetermined criterion may be a turning point with respect to repetition, that is to say, when the degree of confidence stops increasing and begins to decrease, then use the value of radius when the degree of confidence was greatest.

The technique set out above for selecting neighbour points can be performed for the whole point cloud, or just for a particular region, with the selecting being repeated for the other regions.

Respective is taken to mean first or second, whichever point cloud is being transformed into vectors in the processing.

Statement 11

As an alternative or additional vector set to surface normal unit vectors: the vectors of the first set of vectors are sum vectors, and the vectors of the second set are sum vectors; and transforming the first point cloud into a first set of sum vectors and transforming the second point cloud into a second set of sum vectors, comprises: optionally executing a sampling algorithm configured to mutually standardise the point density per unit area or per unit volume across the first and second point clouds (this operation is optional depending on type and density distributions of the point clouds); for each point cloud individually, for each point in the respective point cloud as an inquiry point: form a search radius sphere of predetermined radius around the inquiry point or find the nearest specified number of nearest neighbouring points; calculate the vectors from the inquiry point to each of all of the neighbouring points within the search radius sphere or to the specified number of nearest neighbouring points; perform a vector summation to find the vector sum (which is referred to here as "a sum vector").

Statements 12 to 16

Optionally, finding at which angle of rotation of the second set of vectors relative to the first set in one or more of three orthogonal axes of rotation defined in the common coordinate system the greatest degree of matching between the angular distribution of the first set of vectors and the angular distribution of the second set of vectors is obtained, comprises: attributing a common origin to the vectors in the first and second sets of vectors; dividing a notional spherical surface centred on the common origin and of radius equal to the vector length into surface regions; finding at which angle of rotation of the second set of vectors relative to the first set in each of the one or more of the three orthogonal axes of rotation defined in the common coordinate system the best match between the vector point distribution of vectors from the first set of vectors and the vector point distribution of vectors from the second set of vectors among the surface regions is obtained.

In the specific case of surface normal vectors, the process also includes mutually normalising the lengths of the vectors in the first and second sets of vectors.

The surface regions may be, for example, regions of equal area. The size of the regions is implementation-dependent. Considerations include required accuracy of rotational alignment which may depend on the size of scanned features and computational cost. The vector point distributions are frequency distributions of vector points per surface area region. Filtering may be performed to reduce to zero the points per surface area region below a predefined threshold. Alternatively the peaks or centroids or modes (the mode is the value that occurs most often) of high local vector point density may be selected for each set of vectors (ie. Match the peaks or centroids of the high frequency distributions). The normalising step may be omitted in the case of vector sets that are already normalised. It may be that the one or more of three orthogonal axes of rotation is three orthogonal axes of rotation. Alternatively, it may be that it is known that the two obtained datasets are already rotationally aligned about one axis or two axes, so that the one or more of three orthogonal axes is one or two.

For aligning about 1 axis the vectors may be rotated along a line of longitude onto the equatorial plane parallel to the known horizontal. This saves memory and computational cost. So, rather than point density on a spherical surface, the point density on a circle line is used as the vector point distribution, the line being divided into portions. The one axis rotation is performed about the normal to plane of the circle located at its centre.

For example, the best match may be found by a mathematical correlation function.

Advantageously, basing the comparison of the two sets of vectors on a frequency distribution of vector points per surface area region is computationally efficient and provides a reliable mechanism for determining the angle or angles of rotation required to rotationally align the two vector sets and hence the two obtained datasets.

As an alternative, it may be that the vectors, having been attributed a common origin, are projected onto the equatorial plane along a normal to the plane, and a point density pattern appears on the equatorial plane. The equatorial plane projection of one dataset is rotated relative to that of the other until a best match relative rotation is found, noting that only one angle of rotation can be found in this way. Advantageously, this technique overcomes alignment problems which may occur with other techniques when the ceiling is sloping or the inside of a roof.

As a further alternative, it may be that the vectors, having been attributed a common origin, are projected onto a circle, and the circle divided into regions. The vector point distributions are compared in the same way as for the spherical surface example, noting that only one angle of rotation can be found in this way.

The vectors of the first set of vectors and the vectors of the second set of vectors may each be a set of the following vector types:

vectors generated by an autoencoder (an unsupervised deep learning algorithm for extracting features within the 3D space) and representing first order features,
vectors generated by the autoencoder and representing second order features,
vectors generated by the autoencoder and representing third order features,
vectors generated by the autoencoder and representing first, second, and/or third order features,
surface normal unit vectors,
sum vectors,
divergence vectors,
edge vectors,
cylinder vectors,
complex object vectors,
plane vectors,
point density gradient vectors,
point density gradient divergence vectors, and
gradient vectors.

Wherein, in finding the greatest degree of matching: between the angular distribution of the first set of vectors and the angular distribution of the second set of vectors; and/or between the first 1-dimensional array and the second 1-dimensional array; and/or between the first 2-dimensional array and the second 2-dimensional array; degrees of matching between subsets of vectors of the same particular type are calculated on a type-by-type basis, and the degree of matching at any translation or angle of rotation, is a combination of the degrees of matching for the respective particular types, the combination being an average or a weighted average.

Wherein each of the above may be used with or without appropriate filtering, smoothing, thresholding, averaging, centroid selection.

Each type of vector used in an embodiment represents a different type of feature, property, or object.

Furthermore, the vectors of the first set of vectors and the vectors of the second set of vectors each comprise a plurality of subsets of vectors, each subset among the plurality representing the respective point cloud as vectors of a particular type, the particular type being different from that of the other subsets; wherein, the particular types include one or more from the list above.

Optionally, the rotational alignment processor is further configured, before finding the best match between the angular distributions of the first and second sets of vectors, to: filter the first and second sets of vectors by recognising, in both sets, surface normal unit vectors representing one of the template shapes, and removing from the respective sets surface normal unit vectors not recognised as representing one of the template shapes.

As a further option, the recognising is implemented by executing a segmentation algorithm on the first set of surface normal unit vectors and on the second set of surface normal unit vectors, respectively.

The template shapes are one or more of edges, planes larger than a threshold minimum, cylinders, tori, cones, spheres. Furthermore, the template shapes may be combinations of the primitive shapes (edges, planes larger than a threshold minimum, cylinders, tori, cones, spheres). Furthermore, the template shapes may be combinations of the primitive shapes at predetermined angular relation to one another.

The segmenting can be on the basis of one or several attributes. These could be surface texture, periodicity of the surface texture, surface curvature, surface colour, surface roughness.

For the case of the template shape being edges, sum vectors could be used in place of surface normal unit vectors. Edges are extracted by selecting sum vectors with a length larger than some threshold or a local maximum length or having a certain angle to local surface normal vectors. Then the points of the point cloud which have such sum vectors form a line or distinguishable pattern in or on the sphere wherever there is an edge. The sum vector method is described elsewhere in this document in more detail.

Another way to find template shapes is to apply a threshold to select high point density regions on the Gaussian sphere and ignore the other points. Or to find the highest local density regions and throw away the rest. One way to do this is to calculate the point density at each point on the sphere and then calculate the exponential or logarithm of the point density to give some weighting function to emphasise the high or low point densities respectively. Or to find the centroid of the points in a region of high point density. Or add vectorially together all of the vectors of the points within a certain area on the surface of the sphere. This may be followed by thresholding based on the resultant vector length. The remaining vectors may be normalised to unit length. Another method is to identify and remove any periodic features which may lead to incorrect alignment. This can be done by a 2D or 3D Fourier Transform after which high density points are suppressed or removed before inverse Fourier Transforming.

Advantageously, the use of template shapes emphasises the strong (i.e. high point density) physical features represented in the respective datasets. Therefore, the finding a best match between the angular distributions of the representative sets of vectors is facilitated, yielding accurate results with small computational cost.

Statements 17-22

Embodiments include a system as defined in the claims.

Embodiments also include a method or methods as defined in the claims.

Embodiments include a data structure for point clouds as defined in the claims.

Statements 23-30

Embodiments of a second aspect include an apparatus comprising: a dataset acquisition unit, configured to: obtain a first dataset representing a first portion of a subject of interest at a first time, the first dataset being an n-dimensional scan dataset; and obtain a second dataset representing a second portion of the subject of interest at a second time, the second dataset being an m-dimensional scan dataset; obtain an indication of one or more axes in a three dimensional coordinate system, about which indicated one or more axes rotational alignment of the obtained datasets is requested; wherein the first portion and the second portion comprise overlapping features, and each of m and n is equal to 2 or 3. The apparatus further comprises a point cloud generation processor, configured to generate and store a first point cloud representing the first dataset and a second point cloud representing the second dataset, the first and second point clouds being defined in the three-dimensional coordinate system. The apparatus also comprises an alignment processor, configured to: iteratively rotate one of the point clouds relative to the other about the axis or about a combination of angles in each axes, and, for each of one or more particular lines in the three-dimensional coordinate system, at each iteration: project the first and second point clouds onto the line; move the projections relative to one another along the line to find a greatest correlation between the two projections; and record the greatest correlation; identify the angle of rotation, or combination of angles of rotation, of the one of the point clouds for which a maximum greatest correlation is recorded; outputting the identified angle of rotation as the angle of rotational alignment about the respective indicated axis of the first and second stored point clouds, or outputting the combination of angles of rotation about the respective indicated axis of the first and second stored point clouds.

Advantageously, the apparatus enables angles of rotation between different datasets of the same subject of interest to be determined in an automated manner and without requiring the placement of physical targets, nor the manual identification of specific natural targets, within the field of view of the scanner and hence represented in the datasets.

The datasets are 2D or 3D datasets which can be viewed as an image. The imaging apparatus may be, for example, a 3D scanner. Each dataset contains data representing a 2D or 3D subject of interest in 2 or 3 spatial dimensions. Additional dimensions, such as colour, may be included in the dataset.

The inputs, the first and second 2D or 3D datasets, may be restricted to being scans of a physical space. Alternatively, embodiments may obtain 2D or 3D datasets of a virtual space as one or both of the first and second 3D datasets.

The scan datasets are described as n-dimensional and m-dimensional, wherein m and n define the numbers of spatial dimensions. Additional information may be recorded at each spatial point in the dataset, for example, time, three or more rotation angles, colour in r, g, b or in any of the following colour coordinates CIELAB, CIELUV, CIExyY, CIEXYZ, CMY, CMYK, HLS, HSI, HSV, HVC, LCC, NCS, PhotoYCC, RGB, Y'CbCr, Y'IQ, Y'PbPr and Y'UV reference (https://people.sc.fsu.edu/~jburkardt/f_src/colors/colors.html) and other quantities derived from the data such as divergence of surface normal vectors and texture. The spatial dimension could be expressed in Cartesian, x, y, z or cylindrical or polar or latitude and longitude or any other spatial coordinate system.

The indication of one or more axes may be a user input or may be a default value in the apparatus.

The first and second portion comprise overlapping features. Such features are either directly overlapping in space or have potentially overlapping features such as lines, planes, cylinders, etc. which could be extended from the first portion into the second portion, for example, based on some knowledge that they do so. So one scan may scan part of a straight railway line or wall and the second scan may scan a different physical space but which includes another part of the railway line or wall. If it is known that the railway line or wall is straight then the apparatus can rotationally align both scans to the railway line or wall. From each scan, it is possible to use pattern recognition to recognise the rail or the wall. In the translational alignment step the scans in 2D normal are aligned to the rail or in 1D normal to the wall. If there are several say rod or edge features at a range of angles to each other which are common to two non-directly overlapping scans. Then the apparatus can precisely locate one scan relative to the other along the rod directions as well as there will only be one place where the rods in the second scan precisely match the extended rods in the first scan. This is similar for several planes at different angles to each other or even for mixtures of planes, rods, edges, cylinders, toroids, cones and other shapes. This is all important as it then means it is not necessary to have all the scans physically overlapping in space, as long as there is some commonality in features, i.e. a feature appearing in both. An example is a self-driving car which can scan the curb or white lines or yellow lines on a road and paving slab edges and wall planes and edges, and so align narrow non-overlapping scans.

Alternatively, in the step of reduction of the respective datasets to one-dimensional arrays, an extra variable of scale or magnification can be varied along with translations until a best agreement is found. The size of one scan relative to the other is increased or decreased, and all the other steps are the same. If each scan is from a different technology scanner or one is 2D and one 3D it is possible that they will not be in the same scale. There are two approaches to deal with it. In the first the same artefact such as a reticle or precisely calibrated ruler is scanned as a means for calibration then the scales can be adjusted to be the same for each scan. In the other method, the magnification is varied in steps as well as rotating about two axes in steps and the maximum correlations along all the lines is found. In other words, an additional dimension (scale) is varied in the process of finding maximum correlation. Once found, the magnification factor is applied to one dataset to bring them into alignment.

Optionally, the alignment processor is further configured to modify the stored first and second point clouds by, for the or each of the indicated one or more axes, rotating the one of the point clouds relative to the other by the respective identified angle of rotation; and to store the modified first and second point clouds as rotationally aligned point clouds.

Optionally, the alignment processor is further configured: at each iteration, to record a translation (which may be considered a relative movement) of the projections along the line at which the greatest correlation is found between the two projections; for the or each of the indicated one or more axes: to identify the translation recorded for the identified angle of rotation for which maximum greatest correlation is recorded; and to modify the stored first and second point clouds by moving the point clouds relative to one another along the respective particular line by an amount and direction of the identified translation; and to store the modified first and second point clouds as a single merged point cloud.

Optionally, the alignment processor is further configured: at each iteration, to record a translation of the projections along the line at which the greatest correlation is found between the two projections; for the or each of the indicated one or more axes: to identify the translation recorded for the identified angle of rotation for which maximum greatest correlation is recorded; and to output the translation for each of the indicated one or more axes.

In particular, the translation is output as an amount and direction of movement. The direction is determined by the line of projection, and the direction of translation along the line and amount of translation is determined by the translation of the projections.

Optionally, finding a greatest correlation between the two projections comprises: representing each projection as a one-dimensional point density distribution; iteratively calculating a correlation between the two one-dimensional point density distributions, one of the one-dimensional point density distributions being moved along the line relative to the other at each iteration; and identifying a greatest correlation among a range of movements along the line.

Optionally, finding a greatest correlation between the two projections comprises: dividing the line into an adjacent series of distinct bins of a defined length, and for each projection calculating the number of points in the projection within each of the series of distinct bins, the number of points in each bin being the one-dimensional point density distribution; and wherein one of the one-dimensional is moved along the line relative to the other at each iteration until the divisions between bins are coincident, the correlation being a sum across series of distinct bins of the product of the number of points from one projection in a bin and the number of points from the other projection in the coincident bin.

Optionally, to get a finer precision, the defined length is reduced. But when the pitch of the array elements is too fine it does not work due to lack of data to correlate per bin. A method to obtain a finer pitch is to fit a curve to the histogram (the one-dimensional point distribution) when the pitch is large enough to make it meaningful and then interpolate an array as fine as is required. The critical pitch is about equal to several times (for example, 10 times) the average point spacing.

Optionally, the point clouds represent a value of each of one or more properties per data point in addition to the position of the respective data point, the projections of the data points onto the line including the respective values of the one or more properties in addition to the position of the data point; finding a greatest correlation comprises, in addition to calculating the correlation between the two one-dimensional point density distributions, for the or each of the one or more properties, calculating a correlation between respective distributions along the line of values of the property for the two projections, and aggregating the correlation between the two one-dimensional point density distributions with the or each correlation between distributions of values of the property or properties, the greatest correlation being the greatest aggregated correlation.

Advantageously, the aggregated method results in more robustness and precision. The scanner may have the ability to record other information about the data points other than just their x, y, z, position. For a LIDAR, it may record the reflected intensity of the infra-red laser beam and some LIDARs also have a high-resolution colour camera so they record the colour or rgb or or hsl, hsb or his data. Moreover, additional data can be derived from the x, y, z, points at each location such as divergence of surface normals, surface texture, etc. So, the correlations of the distributions of each of these additional properties and other different variables are calculated after projection onto the line. All of these should reach their maximum correlation magnitude at the same angle at the correct rotation. For example, if most of the variables reach their maximum correlation value but one of the variables does not the rotation is still identified as the correct rotation because if one of the variables is for some reason incorrect in one dataset the others will give the correct rotation. In a particular example, each of the colour variables rgb is correlated separately so the red distribution with the red one.

The aggregating may be a summation, or may be finding an angle of rotation at which a predefined proportion or number of the variables show a correlation maximum.

Embodiments include a computer program as defined in the claims.

Statements 31-38

Embodiments of another aspect include an image processing method, comprising obtaining a point-cloud representation of a subject, the point-cloud representation being composed of a plurality of individual scans, each scan being a point-cloud representation of a portion of the subject, each scan overlapping one or more other scans and having a defined rotational and translational relation to said one or more other scans, where in at least one of the scans is overlapping more than one other scan. The method is characterised by executing a global alignment process comprising: for each of the plurality of individual scans as a subject point cloud, setting the one or more other scans overlapping with the subject scan as a reference point cloud, for each individual scan of the reference point cloud, executing a rotational alignment algorithm and translational alignment algorithm on the subject point cloud and the individual scan of reference point cloud with the defined rotational and translation relation between the subject point cloud and the individual scan of the reference point cloud in the point-cloud representation of the subject as an initial estimation, to rotate and translate the subject point cloud relative to the individual scan of the reference point cloud until a process error criterion is met, to obtain a revised defined rotational and translational relation between the subject point cloud and the individual scan of the reference point cloud; combining the revised defined rotational and translational relations between the subject point cloud and each of the individual scans in the reference point cloud; implementing the combined revised defined rotational and translational relation between the subject point cloud and the reference point cloud in the point-cloud representation of the subject.

Advantageously, embodiments utilise a technique in which instead of using simple pairwise alignment, all other scans in the neighbourhood of a scan (not just a single one of its neighbours) are used to adjust the position (i.e. the rotational and translation position relative to the remainder of the point-cloud representation) of the scan. This is repeated for all scans in turn. This "global" approach to alignment achieves more accurate alignment than simple pairwise alignment, and in fewer iterations.

The global alignment process is a process defined by the steps included in the process. The use of the term global indicates that each of the plurality of scans is addressed individually, either in turn, or in parallel (or with some combination of serial and parallel processing of scans). The rotational alignment algorithm and the translational alignment algorithm may be the same algorithm which performs both translational and rotational alignment, or may be two separate algorithms, which may feed into one another. Each of the rotational and translational alignment algorithm may be one of the processes described elsewhere in this document. The algorithms may be iterative closest point (ICP) algorithms. The term iterative closest point indicates the nature of the algorithm used to revise the rotational and translational relation between the subject point cloud and the reference point cloud. The iterative closest point algorithm, used here, and elsewhere in this document where ICP is mentioned, may be point-to-point based, or point-to-plane based.

Combining the revised defined rotational and translational relations between the subject point cloud and each of the individual scans in the reference point cloud may be achieved by finding the mean revision of the relations, on a component by component basis (for example, there may be three rotational components and three translational components).

Optionally, embodiments may include repeating the global alignment process one or more times, with a progressively stricter process error criterion on each repetition.

For example, the process error criterion can progress to an overall target tolerance on the error and in the rotational and translational alignments desired by a user.

Embodiments may be configured to divide a difference between an initial value of error in the rotational and translational alignments and an overall target tolerance into a finite number of steps, each step being an iteration of the global alignment process.

BRIEF DESCRIPTION OF THE FIGURES

Embodiments will now be described, purely by way of example, with reference to the accompanying drawings, in which.

DETAILED DESCRIPTION OF FIRST ASPECT

Figure 1:
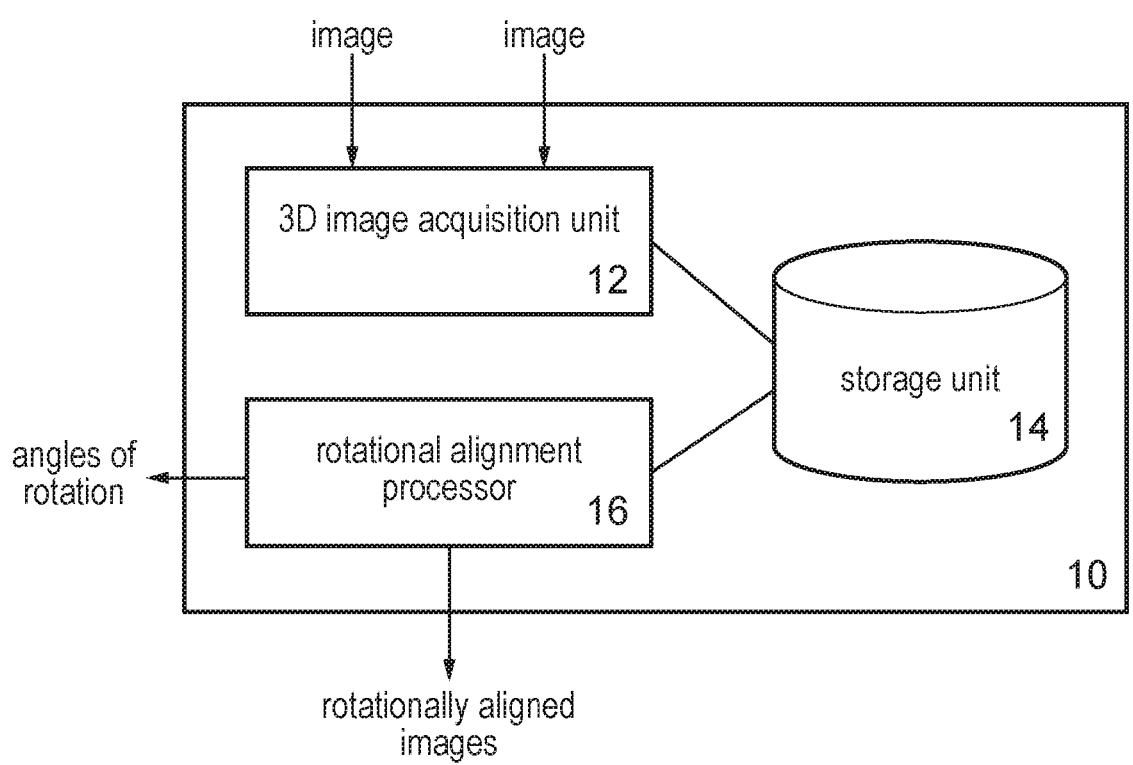
FIG. 1 is a schematic illustration of an embodiment.

Description of FIG. 1
Overview of Components and Interconnections

The embodiment illustrated in FIG. 1 is a 3D dataset alignment apparatus 10 embodying the present invention. The apparatus 10 comprises a 3D dataset acquisition unit 12, a storage unit 14, and a rotational alignment processor 16. Certain interconnections and inputs/outputs are illustrated. These are not intended to represent all interconnections and interactions between components, but merely illustrate some interactions important for describing the apparatus 10 in detail.

3D Scan Acquisition Unit

The 3D dataset acquisition unit 12 is a functional component configured to obtain from a imaging apparatus at a first position and orientation, a first 3D dataset of a first space at a first time, the first 3D dataset being a first point cloud in three dimensions, each point in the first point cloud representing a reading within the first space by the imaging apparatus. The 3D dataset acquisition unit 12 is further configured to obtain from a imaging apparatus at a second position and orientation, a second 3D dataset of a second space at a second time, the second space and the first space overlapping, the second 3D dataset being a second point cloud in three dimensions, each point in the second point cloud representing a reading within the second space by the imaging apparatus.

In terms of hardware, the 3D dataset acquisition unit 12 includes a programmed CPU and/or a GPU and/or and FPGA for real time processing or an array of them together with an array of memory as in a computer cloud for parallel processing, and I/O (input/output) hardware configured to receive or read the first and second 3D datasets. The 3D dataset acquisition unit 12 may also comprise volatile or non-volatile memory for storage of processing instructions and image data during processing.

The imaging apparatus may be an apparatus for generating photogrammetric scans, which use two or more adjacent or side by side or slightly spaced cameras to view the 3D Scene. Then the slightly different spacing of features in one photo from those in the other are used to work out the depth of each feature. The output format is pointcloud as for LIDAR.

The imaging apparatus may be an apparatus for projection mapping: This makes use of projected structured light patterns which are projected onto the 3D scene. Examples include Kinect and Hololens. The patterns projected may be lines or grids or random spots. The scene is then viewed using a camera often with a wide angle lens. The light projected is usually infrared so that it is not visible to the human eye.

Other formats such as unsigned shorts generated from a video stream, or meshes, may be converted into point clouds as a pre-processing step and then input to embodiments.

The data formats that are possible for the input 3D datasets include one or more from among .fls, .ptx, .leica format, .ptl, .e57, .xyz, .pod, .wrl, .obj, .las, .laz which are typically used for surveying applications and DICOM .dcm, PAR/REC, .ima, NIFTI, which are typically used for medical applications and other formats for other applications. Data formats may be Cartesian or in spherical angular and radial co-ordinates or in other co-ordinates advantageously chosen to suit the symmetry of the 3D scanned volume or scanning method. .pod is favoured for use in post-processing cleaning and filtering.

Almost all MRI scanners output neuroimaging data in DICOM .dcm format, a standardized medical image format. Vendor specific formats are often the default data export type, e.g. PAR/REC on Philips scanners. One example of a manufacturer-specific image in DICOM format, is the ".ima" format. The analysis of neuroimaging data often starts with converting the vendor-specific data to a data format called NIFTI, since most analysis packages cannot work directly with the original data. Any of these formats may serve as inputs to embodiments.

More Detail on Functionality

The 3D dataset acquisition unit is the input mechanism for the apparatus 10. The input is two 3D datasets. The prerequisites for the datasets is that they are compatible with being stored as a point cloud in a common coordinate system (common in this context meaning common to both datasets), and that they are 3D datasets of spaces that are at least partially overlapping. The first and second 3D datasets may be obtained from the same imaging apparatus. However, there is no requirement therefor, and the apparatus 10 is configured to rotationally align 3D datasets from different imaging apparatuses, even from imaging apparatuses that use different imaging techniques.

The first and second 3D datasets may be transmitted, for example, from a imaging apparatus or pre-processor, and received by the 3D dataset acquisition unit 12. Alternatively, the first and second 3D datasets may be stored in physical storage at an address accessible to the 3D dataset acquisition unit 12 for retrieval thereby.

The 3D dataset acquisition unit 12 may be configurable by an apparatus user, to enable specification of a storage location from which to obtain the 3D datasets, such configuration being, for example, via an interface. Alternatively, the 3D dataset acquisition unit may comprise a storage location or interface to which 3D datasets are submitted or transmitted by a user of a imaging apparatus (user here means a imaging apparatus operator or any party analysing or processing the 3D datasets produced by the imaging apparatus).

The illustrated interconnection between the 3D dataset acquisition unit 12 and the storage unit 14 represents the submission of the obtained first and second 3D datasets to the storage unit 14 by the 3D dataset acquisition unit 12. The first and second 3D datasets are stored as clouds of points in a common coordinate system by the storage unit 14.

The obtained 3D datasets are clouds of points in three dimensions. The 3D dataset acquisition unit 12 may execute processing on the obtained 3D datasets to define the respective clouds of points in a common coordinate system (common here denotes common to the two 3D datasets). A rotational relation (i.e. a relative orientation) about three orthogonal axes of rotation is thereby set in the 3D datasets as submitted for storage in or by the storage unit 14.

Storage Unit

The storage unit 14 is configured to store the first 3D dataset and the second 3D dataset as respective clouds of points in a common coordinate system. The storage unit 14 is a volatile or non-volatile storage hardware that is accessible to the 3D dataset acquisition unit 12 and the rotational alignment processor 16. The storage unit 14 may comprise a controller or management unit to control read and write accesses to stored data.

Storage Unit—Common Coordinate System

The common coordinate system need not be expressed in the same way for both clouds of points. However, there is a defined spatial and angular relationship between the coordinate system in which the two clouds of points are stored, so that whatever the expression of the clouds of points in storage, they are defined in a common coordinate system.

Rotational Alignment Processor

The rotational alignment processor 16 is configured to: transform the stored first point cloud into a first set of vectors, and transform the stored second point cloud into a second set of vectors, wherein each member of the first set of vectors and each member of the second set of vectors represents the respective point and neighbouring points; find at which angle of rotation of the second set of vectors relative to the first set in one or more of three orthogonal axes of rotation defined in the common coordinate system the greatest degree of matching between the angular distribution of the first set of vectors and the angular distribution of the second set of vectors is obtained; store the angle of rotation about each of the one or more orthogonal axis of rotation for which the calculated degree of matching is greatest; rotate the second point cloud by the stored angle of rotation about the respective one or more axes of rotation among the three orthogonal axes of rotation in the common coordinate system; and output the rotated second point cloud.

In terms of hardware, the rotational alignment processor 16 is a programmed processor for executing stored processing instructions in order to realise the functionality of the transforming, finding, rotating, and outputting. In addition, the rotational alignment processor 16 may comprise or have access to volatile or non-volatile memory for storing data during processing and for storing processing instructions. And it may have a CPU and/or a GPU and/or and FPGA for real time processing or an array of them with an array of memory as in a computer cloud for parallel processing. Optionally, each node has a processor and a memory, and there is an array of nodes.

Rotational Alignment Processor—More Detail (Incl. Nested Spheres)

The rotational alignment processor is configured to find at which angle of rotation the second set of vectors exhibits the best match with the first set of vectors. In the case of rotational alignment about three axes of rotation being sought, an exemplary processing is: attributing a common origin to each vector in the first and second sets of vectors, dividing a notional spherical surface centred on the common origin and having a radius equal in magnitude to the surface normal unit vectors into sphere surface regions, calculating the mathematical correlation between the frequency distribution of vector points per sphere surface region for each set of vectors, rotating the second set of vectors, and repeating the calculating. A step of normalising the lengths of each member of first and second sets of vectors is performed for surface normal vectors. The rotating may be done in an incremental manner in each of the three angles of rotation until all combinations of angles have been covered for predefined ranges of angles about each rotational axis at a predefined level of granularity. Best match finding algorithms, such as simulated annealing, may be implemented to find the combination of angles at which the best match exists.

How to Quantify the Match

The mathematical correlation between the angular distribution of two sets of vectors may be found by dividing the angular space into regions of equal size, and comparing the number of vectors from each set in each region. An integrated value is calculated by summing across all of the regions, wherein a contribution to the integrated value from a particular region is proportional to the similarity in the number of vectors from the two sets in the region (for example, moderated according to the total number of vectors or the highest number of vectors from one set in a single region). As a particular example, the comparing comprises the comparing may comprise multiplying the number of vector points from one set in one region by the number of vector points from the other set in the same region, and integrating the products over all sphere regions.

It may be that rotational alignment between the first and second 3D datasets is only required about one or two axes of rotation, and the finding can be restricted to only rotating the second set of vectors about axes of rotation in which rotational alignment is sought.

Rotational Alignment Processor Output

The output may be to the device, apparatus, or location from which the datasets were obtained by the 3D dataset acquisition unit 12. For example, the datasets may be obtained from a imaging apparatus, and output to the imaging apparatus, or to a computer or other device being used in conjunction with the imaging apparatus, so that the combination of imaging apparatus and dataset alignment apparatus 10 forms an improved imaging apparatus. The output may comprise only the rotated second 3D dataset, for example if the native coordinate system of the first 3D dataset is the same as the common coordinate system so that the first 3D dataset as obtained is aligned with the output rotated second 3D dataset. Alternatively, it may be that both the first 3D dataset and the rotated second 3D dataset are output, the output being the two datasets defined in a coordinate system in which they are rotationally aligned. As a further alternative, the output may be to the storage unit 14 for access in downstream processing.

As an alternative or additional output (illustrated by the second output arrow in FIG. 1), the rotation angles which bring the scans into alignment are output, which angles will be useful for tracking rotational movement of the imaging apparatus.

Where a point cloud or other representation of the rotationally, and optionally translationally, aligned 3D datasets is output, the data may be in one or more of the following data formats: .fls, .ptx, .leica format, .ptl, .e57, .xyz, .pod, .wrl, .obj, .las, .laz which are typically used for surveying applications and DICOM .dcm, PAR/REC, .ima, NIFTI, which are typically used for medical applications and other formats for other applications. Data formats may be Cartesian or in spherical angular and radial co-ordinates or in other co-ordinates advantageously chosen to suit the symmetry of the 3D scanned volume or scanning method.

Multiple Vector Types

Particularly robust and accurate alignment results can be obtained by utilising more than one vector representation of each point cloud for alignment processing. This document sets out different possible choices of vector types in the description of FIG. 4. More information can be found in Annex B of the published version of United Kingdom patent application GB1701383.0.

Each type of vector represents a different aspect or quantity of the 3D subject of interest or represents them in different ways. So surface normal vectors represent a surface or part of a surface, sum vectors represent edges, corners, openings in planes and occlusions, divergence vectors represent edges and corners, spheres and cylinders and rough textured surfaces, edge vectors represent edges, cylinder vectors represent cylinders, pipes and columns, complex object vectors represent complex objects such as chairs, plane vectors represent the whole of a plane area, point density gradient vectors represent the direction of increase of point density which may also be the real density or reflectivity, point density gradient divergence represent where point density gradient vectors diverge such as near points of local high point density and gradient vectors represent the directions of increase of reading parameters such as colour, brightness, curvature, roughness. Therefore, it is advantageous to use several types of vector together to represent the features, structure and density present within the 3D subject of interest. This can either be done by constructing the same spherical representation construction described for surface normal vectors for each of the vectors in parallel and rotating the spheres together, performing each correlation or match for each vector in turn on each of the different vector spheres. Or all the different types of vector can be plotted in the same spherical representation but labelled with its own type. Then when the spheres are rotated and correlated the correlations are calculated separately between vectors of each type with those of the same type. For non-normalised vectors the space inside and outside the sphere between the minimum and maximum vector lengths is divided into radial and circumferential volume segments and the number of vector points or tips within each segment is multiplied by that for the other scan and summed to perform the mathematical correlation although other forms of matching can also be used such as summing segments coming into alignment and then summing all the sums.

A complex object such as a chair may need to be represented by more than one vector, for example, one pointing from the bottom to the top of the chair to see if it standing upright or has fallen over in which direction, and another vector pointing from the back to the front of the chair to say which way the chair is facing. These two types of vector must be kept separate in the sense that they must only be correlated and compared with vectors of the same type in the overlapping scan.

Embodiments can repeat the rotational alignment (and optionally also translational alignment) processing with a different vector representation, and the results combined. For example, surface normal vectors can be used in a first execution and sum vectors in a second. Any combination of two or more vector representations from among those disclosed in this document can be combined in the same manner.

The results from the executions with different vector representations can be combined as follows:

The method includes finding all the rotations at which each type of vector, separately, has a local maximum correlation, and making a note of the correlations at that rotation for all of the other types of vector. The search method may use coarse angular steps to find several high correlation values and then may converge from each of those rotations using fine angular steps. The method includes making a table (see table 1 below) putting these rotation values in the first column and the correlation magnitude for each type of vector in each adjacent column. Adding together all of the correlations in each row and placing the sum in the right hand column. Finding the row with the maximum value in the right hand column and reading off the rotations in the left hand column which are the required rotations. It is advantageous to multiply each column of correlations of each different vector type by a different weighting factor before carrying out the sum of correlations across a row. These weighting factors are determined experimentally or by knowing the relative importance of the different types of vector for different subjects of interest which can be specified at the start of the process.

TABLE 1 combining different vector representations for alignment processing

| Rotation angles | Correlations of vector type 1 Weight W1 | Correlations of vector type 2 Weight W2 | Correlations of vector type 3 Weight W3 | Sum of Correlations |
|---|---|---|---|---|
| Alpha1, beta1, gamma1 | C1, 1 | C1, 2 | C1, 3 | = W1 * C1, 1 + W2 * C1, 2 + W3 * C1, 3 |
| Alpha2, beta2, gamma2 | C2, 1 | C2, 2 | C2, 3 | = W1 * C2, 1 + W2 * C2, 2 + W3 * C2, 3 |
| Alpha3, beta3, gamma3 | C3, 1 | C3, 2 | C3, 3 | = W1 * C3, 1 + W2 * C3, 2 + W3 * C3, 3 |
| Alpha4, beta4, gamma4 | C4, 1 | C4, 2 | C4, 3 | = W1 * C4, 1 + W2 * C4, 2 + W3 * C4, 3 |
| Alpha5, beta5, gamma5 | C5, 1 | C5, 2 | C5, 3 | = W1 * C5, 1 + W2 * C5, 2 + W3 * C5, 3 |

Figure 2:
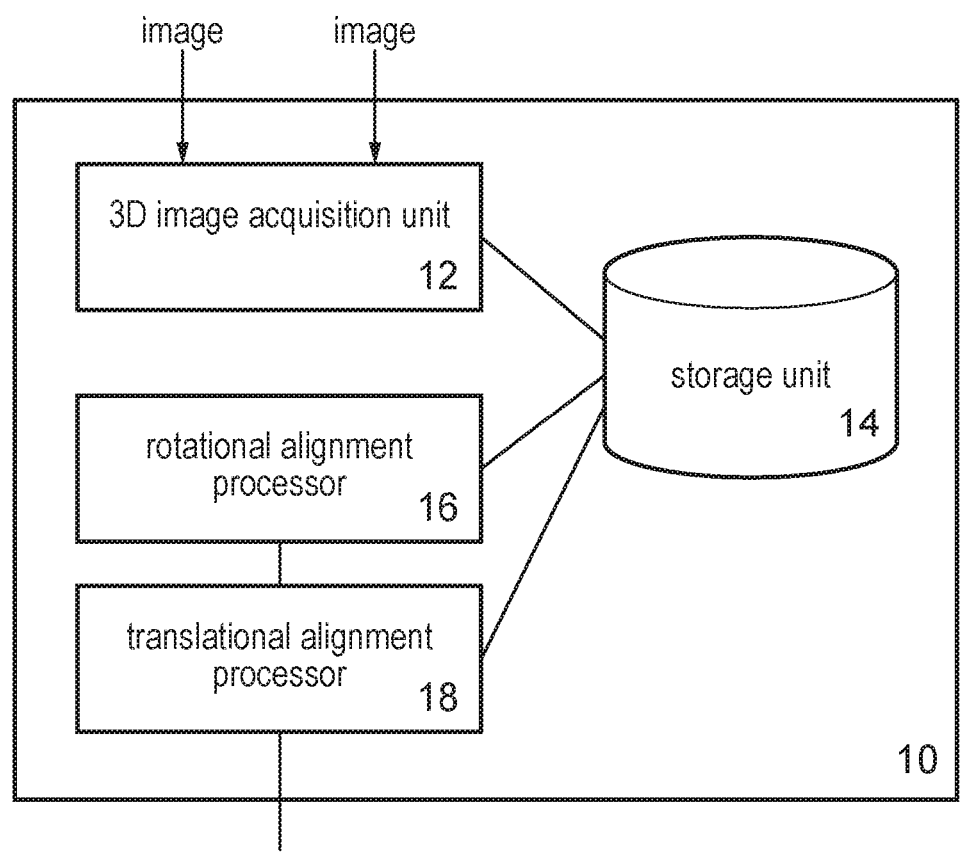
FIG. 2 is a schematic illustration of another embodiment.

Description of FIG. 2
Overview of Components and Interconnections

The apparatus illustrated in FIG. 2 is a 3D dataset alignment apparatus 10 embodying the present invention. The apparatus 10 comprises the components illustrated in FIG. 1, for which a detailed description is provided above in relation to FIG. 1 and is not repeated herein, and a translational alignment processor 18. The translational alignment processor 18 is illustrated with an interconnection to the rotational alignment processor 16, indicating that the first 3D dataset and the second 3D dataset may be output to the translational alignment processor 18 by the rotational alignment processor 18. Alternatively, as illustrated by the interconnection between the translational alignment processor 18 and the storage unit 14, the translational alignment processor may retrieve the rotationally aligned 3D datasets from the storage unit 14.

As a further alternative, the translational alignment processor 18 receives rotationally aligned 3D datasets from a source other than the rotational alignment processor 16.
Translational Alignment Processor The translational alignment processor 18 is configured to: for each of three lines in the common coordinates system, wherein each pair of lines from among the three lines is non-parallel and at least one pair of lines from among the three lines is non-co-planar: record the position, relative to an arbitrary origin, of a projection onto the line of each of the first point cloud; store the recorded positions as a first 1-dimensional array of positions; record the position, relative to the arbitrary origin, of the projection onto the line of each of the rotated second point cloud; store the recorded positions as a second 1-dimensional array of positions; find a translation along the line of the second 1-dimensional array of positions relative to the first 1-dimensional array of positions at which a greatest degree of matching between the first 1D array and the second 1D array is computed, and recording the translation at which the greatest degree of matching is computed. The translational alignment processor 18 is configured to output the first point cloud and the rotated second point cloud as a merged point cloud in the common coordinate system, with the rotated second point cloud translated along each of the three lines in the common coordinates system by the respective recorded translation. The translational alignment processor 18 stores the received rotationally aligned datasets on the storage unit 14, in preparation for merging the point clouds. Thus, a copy of the rotationally aligned datasets as received is retained, since information is lost in the process of finding the translations along the lines. Alternatively to, or in addition to, outputting the merged point clouds, the translational alignment processor 18 may output the translational amounts (i.e. distances along the three lines) for use, for example, in tracking the movement of an imaging apparatus between imaging procedures (for the two datasets).

As a further option, the procedure could be repeated for a different three lines, and the respective recorded translations compared before the output step. For example, each set of three recorded translations can be represented by a single point in the common coordinate system (go the recorded distance along the three lines from a common origin in turn to reach the single point). If the points are within a threshold distance of one another, then either set of translations along the respective lines can be used to generate the output. If not, the procedure may be repeated until a threshold proportion of sets of recorded translations are found to agree to within a threshold distance of one another.

The translational alignment processor 18 may be configured to avoid using lines in which the projection shows periodicity.

Figure 3:
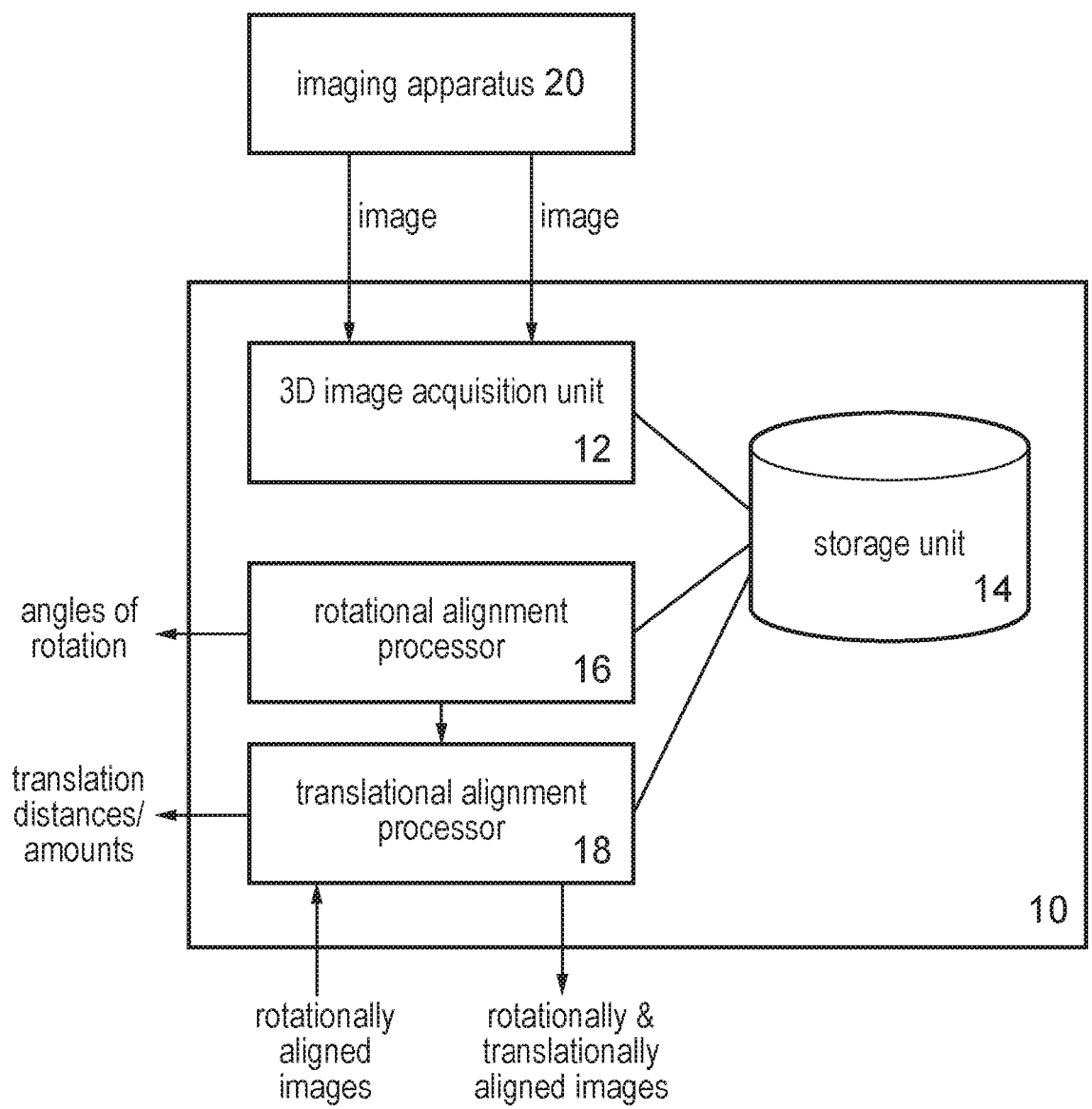
FIG. 3 is a schematic illustration of a system of an embodiment.

As an alternative method for finding the translation to align the point clouds without collapsing the points clouds, the method can include finding corresponding matching 3D objects and features in both scans. The translation vectors which bring these 3D objects and features into alignment are found. Then most common translation vector from amongst these translation vectors is found. This is done by plotting histogram graphs of the length of the vectors and the angles of the vectors relative to three orthogonal axes. Then the most common length and angles are chosen, and those vectors within a small range of the most common vectors selected, and the rest are discarded as a method of removing outliers caused by incorrect correspondences between the 3D objects and features in both scans.
Translational Alignment Processor—Detail on Projections For example, the three (or more) lines may be mutually orthogonal straight lines. The plane of two lines may be the horizontal plane. Or the plane of two lines may be a floor or wall or flat plane in the scene. The projection onto the line is of every point in the cloud along a vector at an angle to the line, or along a curve. The angle of the vector of projection to the line may be the same vector for all points in the cloud. Alternatively, the vector may be a function of position of the point, said function being consistent for both clouds of points. The projection may be along a curve onto the line. An example of this is for a cylinder to move all points around its circumference to lie on a line or alternatively to project radially onto the cylinder axis. Also, on a planetary scale or for another imaged spherical subject, it would make sense to project onto lines of latitude and longitude and onto the radius of the sphere. So that means the latitude and longitude lines are nor straight and are actually circular lines.
Description of FIG. 3
Overview of Components and Interconnections The system illustrated in FIG. 3 is a 3D dataset alignment system 10 embodying the present invention. The apparatus 10 comprises the components illustrated in FIG. 2, for which a detailed description is provided above in relation to FIG. 2 and is not repeated herein, and a imaging apparatus 20. The imaging apparatus 20 is configured to image or survey a space by taking readings and attributing the reading to a position in three dimensions. A plurality of such readings form an image of a space (or subject), represented by a dataset.

Scans

The imaging apparatus 20 may generate a point cloud, each point corresponding to a reading, or the imaging apparatus 20 may generate a dataset in some other format with the 3D dataset acquisition unit 12 performing a conversion to a point cloud. Each of the datasets made by the imaging apparatus 20 may comprise data recorded at successive points in the imaging process (which may for example, sweep a field of view), each point being separated from its neighbour to a degree dictated by the resolution and direction of the imaging process, each point recording data about the position of the point relative to the imaging apparatus 20, and each point being generated by a imaging apparatus in response to a reading, in other words, each point in the dataset represents a reading by the imaging apparatus 20. Although FIG. 3 illustrates a single imaging apparatus 20, it may be that a different imaging apparatus 20 is responsible for each dataset.

Relation of Scanner to Output

The user of the imaging apparatus 20, or the party for which the datasets are generated, may also be the destination of the output of the apparatus 10. From the perspective of the party for which the datasets are generated, and for the imaging party, the system comprising the imaging apparatus 20 and apparatus 10 is an improved imaging apparatus 20.

Scanner Examples

The imaging apparatus 20 may be, for example:
a handheld LIDAR scanner;
a static tripod based LIDAR scanner;
a ground penetrating RADAR;
a 3D mobile LIDAR, or a 2D LIDAR from which 3D datasets are generated;
an Electrical Resistivity Tomography (ERT) or electrical resistivity imaging (ERI) scanner;
a CT (computerised tomography) or CAT (computerised axial tomography) scanner;
a positron emission tomography (PET) scanner;
an MRI (magnetic resonance imaging) scanner;
a nuclear quadrupole scanner;
a 3D terahertz wave scanner;
a projection mapping scanner based on structured light patterns;
a photogrammetric scanner using spaced-apart 2D cameras;
a 3D ultrasound scanner;
a 3D seismic scanner; or
a 3D sonar scanner
optical interferometers
photogrammetry
projection imaging
Surface 3D profiling instruments such as Alphastep, Talystep, Atomic Force Microscope, SNOM
scanning focal plane, Z-stack.
Scans may include:
shape from focus
shape from shadow
Shape from texture
Shape from texture
Shape from silhouette
Shape from shading
shape from template
Shape from symmetry
Shape from varying illumination and viewpoint
Shape from movement or optical flow
Shape from interaction
shape from positional contrast
Shape from defocus
Virtual 3D computer generated images, in computer aided design, computer generated models or plans, More detail on the exemplary scanners is provided in Annex A of the published version of United Kingdom patent application GB1701383.0.

Figure 4:
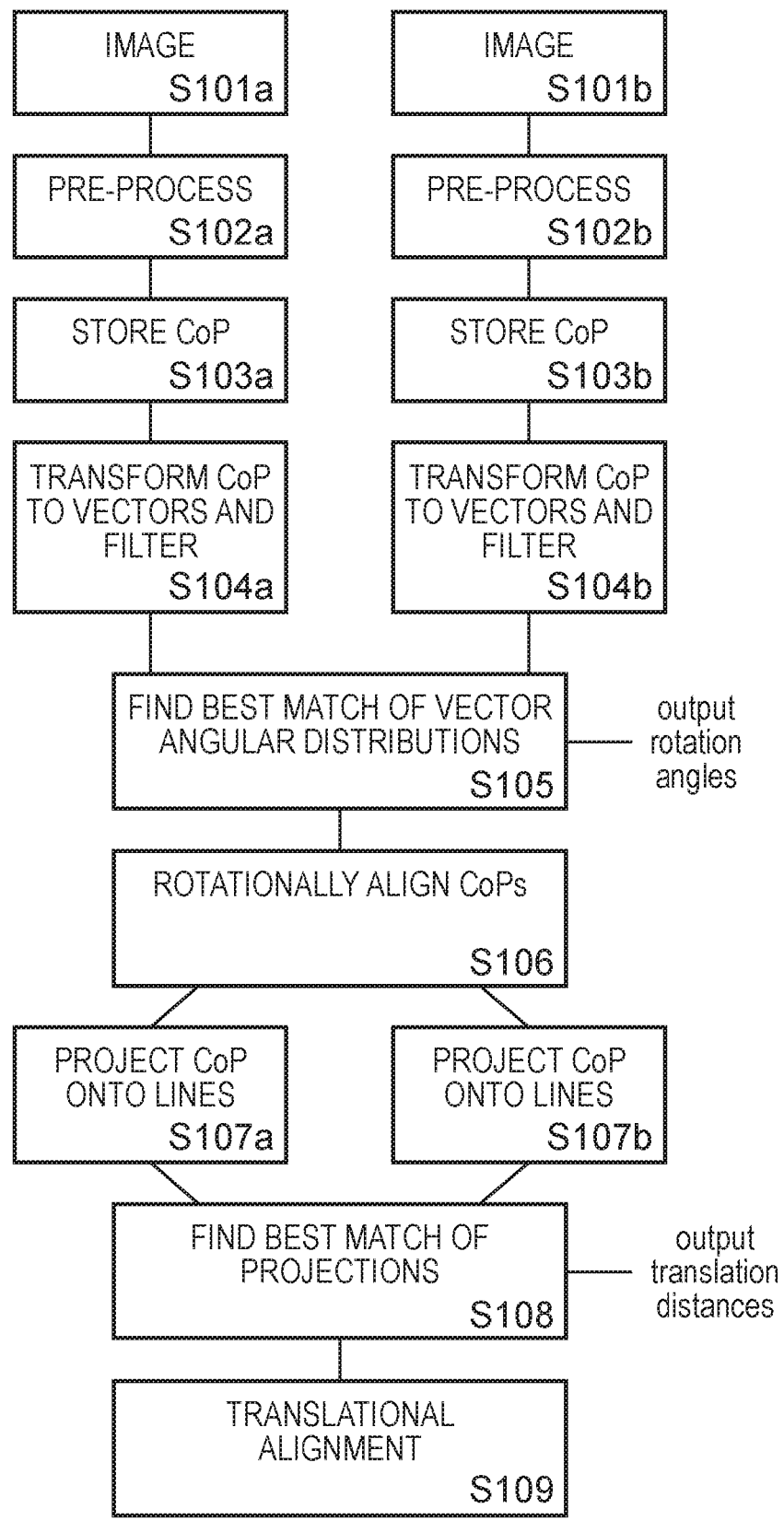
FIG. 4 is a flowchart of processing in an embodiment.

Description of FIG. 4

Overview and Relation to Other Figures

FIG. 4 is a flowchart illustrating a method of an embodiment, or carried out by an embodiment. The imaging step S101 is exemplary of the functionality of the imaging apparatus 20. The pre-process step S102 is exemplary of the functionality of the imaging apparatus 20 or the 3D image acquisition unit 12. The stored point cloud step S103 is exemplary of the functionality of the 3D image acquisition processor 12 operating in cooperation with the storage unit 14. The transform point cloud to vectors and filter step S104, find best match of vector angular distributions step S105, and rotationally align clouds of points step S106 are exemplary of the functionality of the rotational alignment processor 16. The project point cloud onto lines step S107, find best match of projections step S108, and translational alignment step S109 are exemplary of the functionality of the translational alignment processor 18. Where a step is divided into an "a" and a "b", it is an indication that it is performed for the two images separately.

Scanning

At step S101a part of a 3D scene or subject is imaged by a imaging apparatus 20 to obtain a first point cloud. At step S101b another part of the 3D scene or subject which overlaps or has in common part of the 3D scene or subject imaged in step S101a, for example, wholly overlapping but taken at a different point in time so that the 3D scan or subject has changed over time, obtaining a second point cloud. Step S101a and step S101b may be performed at the same time as one another or at different timings. There may be a difference in orientation in the imaging apparatus(s) responsible for the respective images, the rotational alignment difference about three angles of rotation referred to as alpha, beta, and gamma, being at least partially unknown. There may be a difference in position in the imaging apparatus(s) responsible for the respective images, the translational position difference in delta x, delta y, and delta z, being at least partially unknown.

Optionally, the position of the scanner within each scan may be recorded (for example, in x,y,z coordinates) directly relative to the point cloud points or relative to external reference co-ordinates. This information may be stored with the 3D dataset arising from each dataset as metadata, or it may be information derivable from the 3D dataset itself (for example if positional coordinates are relative to an origin corresponding to scanner location). The location of the scanner may be additionally stored in what would otherwise be a .xyz file representation of a 3D dataset.

Filtering

At steps S102a and S102b optional pre-processing is executed on the respective images either before they are obtained by the 3D image acquisition unit 12 (i.e. by the imaging apparatus), or after they are obtained by the 3D image acquisition unit 12 (i.e. by the 3D image acquisition unit 12).

Whether to perform pre-processing, and which pre-processing to perform, may be selected by a user of the apparatus, for example as an argument submitted along with the two 3D datasets. Alternatively, the apparatus 10 may provide an interface (such as a GUI or text interface) for receiving execution instructions, such as selection of algorithms in embodiments which store for execution plural algorithms for equivalent purpose, or algorithms whose execution is optional.

Filtering in More Detail

The pre-processing may include one or more of the following:

- Executing a cleaning algorithm to filter and clean the images by removing artefacts or clusters of otherwise isolated points floating in the 3D space which commonly occur when the imaging apparatus interrogates the edge of a nearby object in the same line of sight as a far object, or when a beam reflects from a shiny surface or scatters from smoke or mist;
- Executing a ranging algorithm to filter and clean the image by applying range filtering;
- Spatial sampling to even out the point density;
- Detecting and removing stray points due to objects or people moving in the scene while the scanning takes place;
- Detecting and removing points corresponding to physical objects or geometric shapes in the scene that may make the registration process more difficult later (for example detecting tree and bush foliage or other irregular shapes that make scan-registration more difficult due to their uneven spatial distribution) or because the user is not interested in these (for example removing furniture and people from a room, when the user is interested in wall locations only).
- Smoothing by fitting a plane to a flat surface or a curved low order polynomial surface to a curved surface.

Denoising

The pre-processing may also include executing a denoising algorithm on the respective clouds of points. There are many types of denoising algorithm available for this purpose. For example, a bilateral denoising algorithm could be used. Embodiments can also perform deconvolution using a function describing the noise as a function of distance and angles which would have to have been previously measured upon acquisition by the 3D image acquisition unit. Alternatively, the pre-processing may comprise using a Weiner filter which automatically measures the noise and filters it out. Another possibility is a Kalman filter which would be best for real time noise removal such as in a self driving car implementation.

Storing

At steps S103a and S103b the images are stored on a storage unit 14 in a format in which they are defined by a common coordinate system. The common coordinate system may be embodied as a notional 3D workspace. The relative position and orientation of the two images in the common coordinate system may be arbitrary, or may be determined by a relation between the native coordinate systems of the images. If the imaging apparatus recorded some information about level, compass bearing, altitude then this information can be used in the placement into the workspace to minimise later exhaustive matching calculations.

Generating Vectors

At steps S104a and S104b the clouds of points are transformed to respective vector sets. Optionally, the clouds of points may be thinned out prior to the transformation so that the point density is approximately uniform across the two images. The thinning out may be performed using an Octree or Kd-tree algorithm, each of which combine a point with neighbouring points to obtain uniform granularity or sampling.

The Octree algorithm cuts up the space into 8 identical cubes surrounding one cube which has the inquiry point at its centre. All the points in each cube are replaced by a single point at the centre of each cube. Using the kd-tree algorithm finds the K nearest points in 3 dimensions. The 3D space is cut along the x, y z axis into small cubes. All the points in each cube are replaced by a single point at the centre of each cube.

Surface Normal

The same vector generation technique/algorithm is executed on both clouds of points.

The sets of vectors may be surface normal unit vectors. The transforming in such cases comprises selecting a set of neighbour points, for example using fixed distance neighbour points of K nearest neighbours, calculating a covariance matrix in which the positions of the point of inquiry and the set of neighbour points are recorded, and solving the covariance matrix to find the three eigenvalues and three eigenvectors for those points. The eigenvector with the smallest eigenvalue is the normal vector for the point of inquiry and it is normalised. Alternatively, a small flat plane patch can be aligned to points in a neighbourhood of an inquiry point to minimise the distance of points from the plane. Then the surface normal of this small flat plane patch can be taken to be the surface normal at that point. The direction of the surface normal is chosen so that it points towards the scanner by ensuring that the angle between the surface normal vector and the vector from the point to the scanner is always less than 180 degrees. This ensures that, for example, all surface normal vectors in floors should point generally upwards and all the normal vectors in the ceiling generally downwards.

In embodiments in which the location of the scanner is stored with the 3D dataset as metadata or is derivable from the scan data, the surface normal unit vectors may be configured such that they all point towards the scanner. As an alternative, the surface normal unit vectors may be configured such that they all point away from the scanner. Whichever direction is chosen, it is consistent across both 3D datasets being aligned. This is done by requiring that the angle between the surface normal vector and the vector from the point to the known scanner reference location is always less than 180 degrees (or in the alternative case greater than 180 degrees). If it is not, the direction of the surface normal is reversed. This ensures that, for example, all surface normal vectors in floors should point generally upwards and all the normal vectors in the ceiling generally downwards.

Alternative Vector Representation

As an alternative to surface normal unit vectors, or in order to generate one or more additional type of vector so that multiple vector types may be compared between the scans (independently of one another and the respective rotational alignments combined), it may be that a vector field (that is, set of vectors) is generated using one or more of the following techniques:

Optionally executing a sampling algorithm configured to mutually standardise the point density per unit area or per unit volume across the first and second point clouds (this operation is optional depending on type and density distributions of the point clouds); for each point cloud individually, for each point in the respective point cloud as an inquiry point: form a search radius sphere of predetermined radius around the inquiry point or find the nearest specified number of nearest neighbouring points. Calculate the vectors from the inquiry point to each of all of the neighbouring points within the search radius sphere or to the specified number of nearest neighbouring points. Then perform a vector summation to find the vector sum which is referred to here as "a sum vector".

To reduce angular noise it is helpful to perform smoothing by creating a calculation sphere volume with an appropriate radius around each point and to add together vectorially all of the sum vectors inside it. Alternatively the calculation sphere volume may be replaced with a calculation cylinder volume with an appropriate radius centred on the edge. The points of the point cloud may be filtered and removed or selected or labelled based on the length or angular orientation of the sum vector, for example, to extract edges which can then be aligned only to edges when calculating translation alignment.

When the sum vectors are transferred to the Gaussian sphere the locus of their heads often appears as almost continuous "streamer" features radiating outwards from the centre of the Gaussian sphere, but not necessarily along radii, with the end of the streamer furthest from the origin being angled most away from a radial direction. Therefore, advantageous filtering should be used to select a range of sum vector lengths to select the parts of the same streamer which appear clearly in each of two overlapping scans. Then this part of the streamer can be used for alignment. Spatial filtering may advantageously be first applied to the streamers to smooth them by fitting line segments or curved low order polynomials to them. Advantageously, after filtering the sum vectors may be normalised to project a pattern of the streamers onto the surface of the Gaussian sphere in which case 2D correlations can be conveniently performed on the surface of the Gaussian sphere rather than inside its 3D volume which requires 3D correlations.

If the inquiry point is in the middle of a plane the magnitude of the sum vector is nearly zero and the direction of the vector is almost random. If the inquiry point is near the edge of a plane the magnitude of the sum vector is much larger, growing larger still as the inquiry points moves towards the edge of the plane. The sum vector lies in, parallel to the plane, and points away from and normal to any nearby plane edge. If the edge is a corner between two planes then as the inquiry point approaches that corner the sum vector begins to point out of the plane and at the corner has its longest length and points at an approximately equal angle to both planes. Similarly, for corners between 3 or more planes. By appropriate filtering and region growing, points lying on edges or at corners can be identified. Edges can be distinguished from corners by the angles of the sum or normalised sum vectors to the nearby planes or to local surface normals.

The length of the sum vector indicates the likelihood that the point of the point cloud from which it originates is located on an edge or at a corner. Its angle relative to nearby surface normal vectors can be found by performing a vector dot product, dividing by the product of the magnitudes of the two vectors and finding the angle whose cosine is this number. This angle indicates whether there is an edge or a corner, and if so what kind of edge it is, such as an edge where two planes meet or an occlusion or hole in a plane such as a doorway or window. The correlation or matching of such vectors requires a volume correlation or matching within the Gaussian Sphere as they have different lengths. To avoid this complexity the vector lengths can be considered to be readings or parameters associated with normalised versions of those vectors. These readings or parameters will be incorporated into the patterns on the surface of the Gaussian Sphere which may be considered to be brightness or colour of those patterns. This means that these readings or parameters must be kept distinct and also correlated or matched with readings or parameters of their own type.

Figure 8:
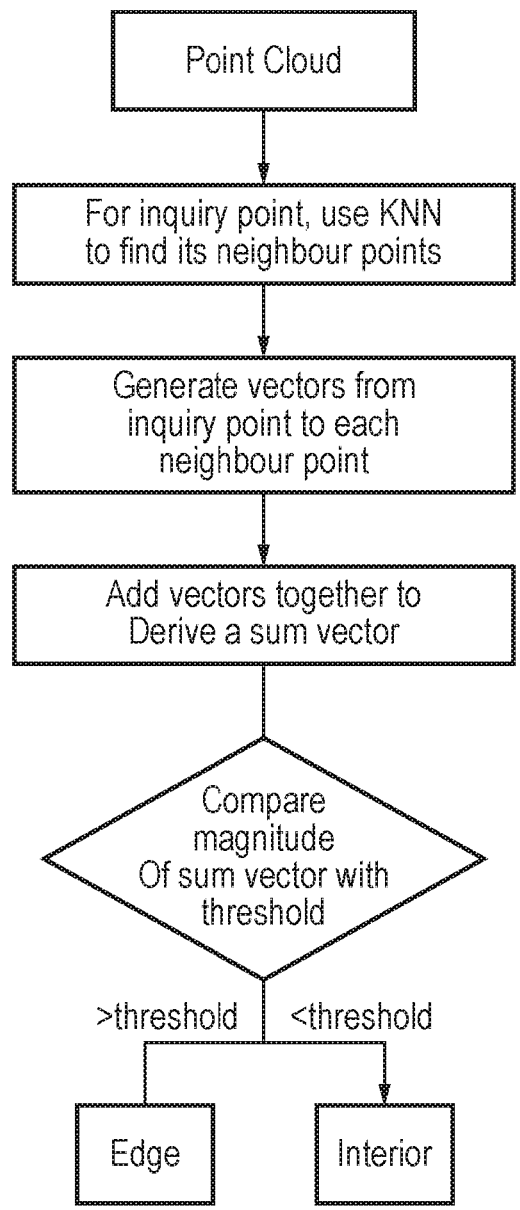

The sum vector may be normalised by dividing its length by the number of points within the calculation sphere or in the neighbourhood. Alternatively, it may be normalised to a unit length in which case it may be referred as a "median vector" (an algorithm for using median vectors to determine whether an inquiry point is part of an edge of a feature or is part of the interior of a feature is illustrated in FIG. 8). The un-normalised sum vectors can be filtered to choose the longest ones or those with lengths longer than a threshold, or this may be done after first smoothing the distribution, to find the points associated with the edge. The un-normalised or normalised sum vectors can be filtered according to their angle to the local surface normal vectors to find the points associated with the edge or corner and to determine what kind of edge or corner it is.

An alternative method to find the median vectors is to choose an inquiry point and form a small search radius sphere around it or find the nearest specified number of nearest neighbouring points. Calculate the centroid of all of these near neighbouring points including the inquiry point. Then calculate the vector from the inquiry point to the centroid. The length of this vector may be the Euclidian distance between the inquiry point and the centroid or more commonly the length is normalised to unity.

Figure 10:
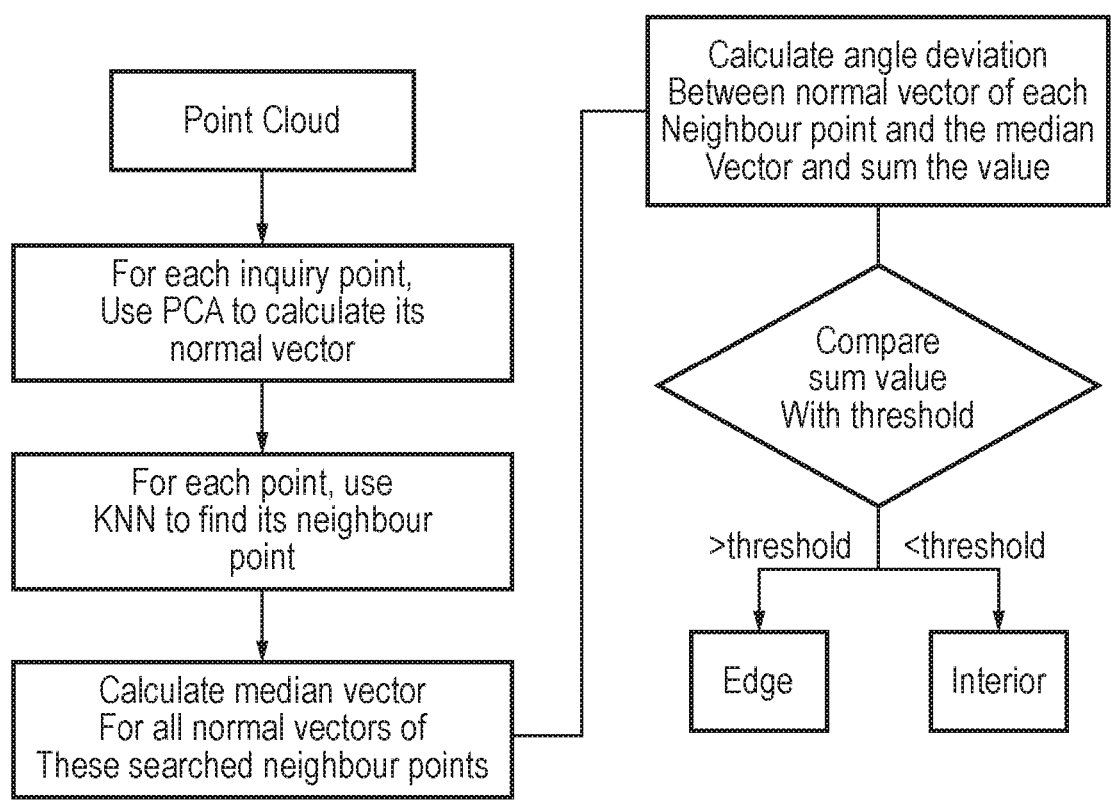
Figure 11:
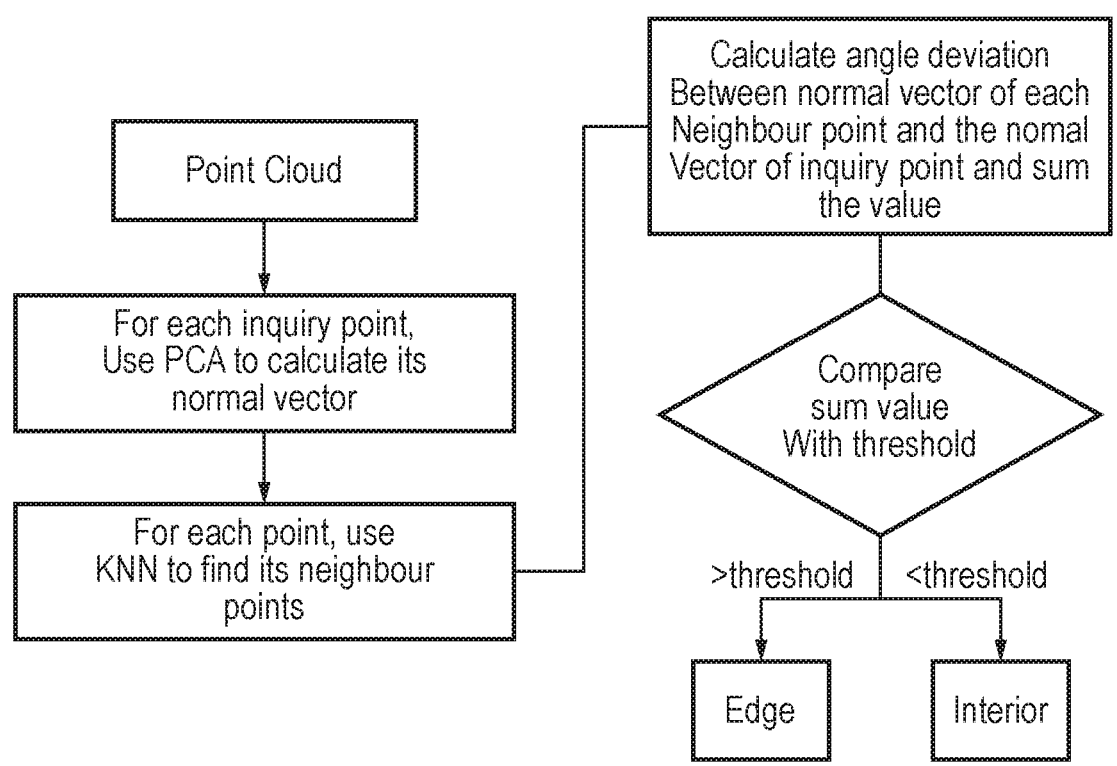
Figure 12:
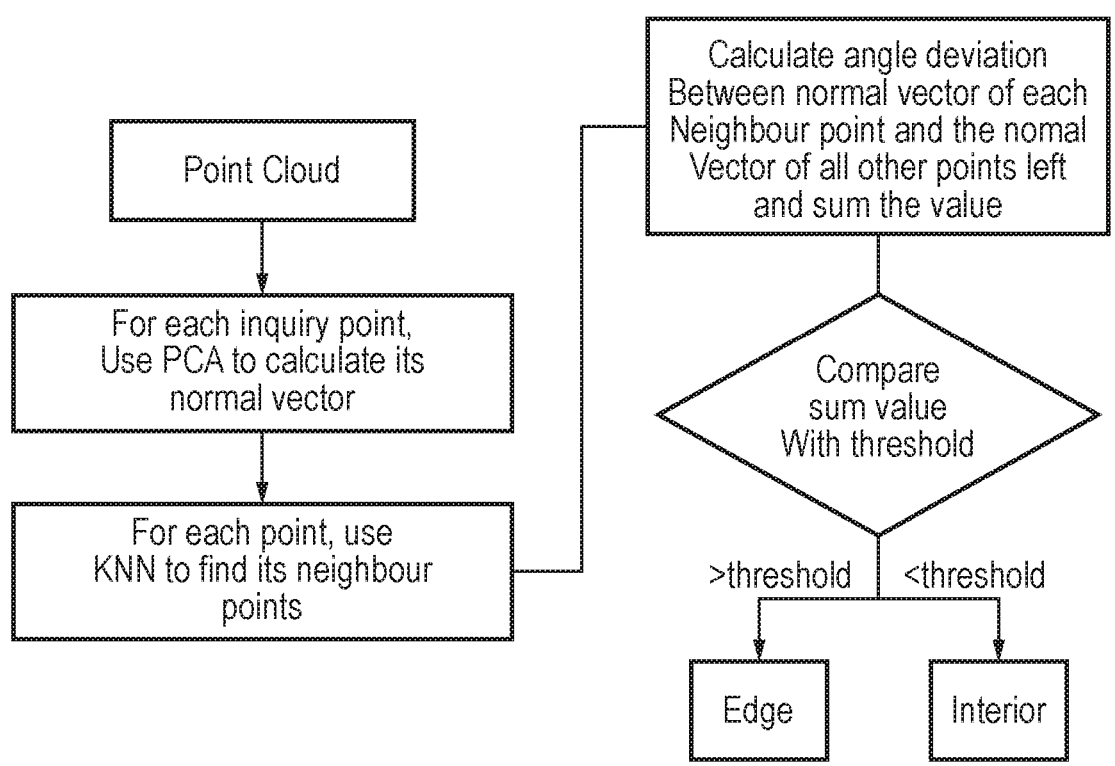

A further technique/algorithm for transforming the clouds of points into respective sets of vectors comprises:

Optionally executing a sampling algorithm configured to mutually standardise the point density per unit area or per unit volume across the first and second point clouds (this operation is optional depending on type and density distributions of the point clouds); for each point cloud individually, for each point in the respective point cloud as an inquiry point: calculate the surface normal. Then calculate the angle deviation between the normal at the inquiry point compared to the normal of all of the near neighbour points within a small search radius sphere or for a specified number of nearest neighbour points. This can be done by finding the dot product between surface normal vectors of adjacent points or those within a certain search radius and then finding the arc-cosine of the result to find the angle. Find the average angle deviation. The local "divergence vector" is then a vector in the same direction as the surface normal vector at this point but has a magnitude or length equal or proportional to the average divergence angle. In effect, they are surface normal vectors scaled by their divergence. FIGS. 10-12 illustrate algorithms for finding divergence vectors. In an alternative method, the surface normal and sum vectors are calculated at each point and the dot product or inner product is found between them. The magnitude of the dot product can be used to scale the length of a vector. The divergence vector chosen may either be the surface normal vector or the sum vector at the point. The advantage of this is that the dot product is either positive or negative and so determines the direction of the divergence vector and whether the edge is convex or concave. When used for alignment it means convex edges will be aligned to convex edges and likewise, concave with concave so reducing the chance of incorrect alignments when concave edges may otherwise align to convex edges. To reduce angular noise it is helpful to perform smoothing by creating a calculation sphere volume with an appropriate radius around each point and to add together vectorially all of the divergence vectors inside it. Alternatively the calculation sphere volume may be replaced with a calculation cylinder volume with an appropriate radius centred on the edge. The points of the point cloud may be filtered and removed or selected or labelled based on the length or angular orientation of the divergence vector, for example, to extract edges which can then be aligned only to edges when calculating translation alignment.

Filtering may be applied to select the longest local divergence vector to a certain small calculation local region or those longer than a certain specified threshold value. This may be done after prior smoothing of the divergence vector distribution to reduce angular and length noise and variations. The referred to, small calculation local region will usually be larger than the size of the calculation sphere or neighbourhood used to find the surface normal and will need to be chosen judiciously.

As the divergence is largest at edges where planes meet and is smallest in the middle of flat smooth planes, the points associated with the filtered divergence vectors are associated with those edges. Moreover, the spatial distribution of divergence can be used to distinguish whether the edge is sharp or rounded and whether it is an edge or a corner between 3 or more planes, and these may be separated by appropriate filtering. The length of the divergence vectors will also indicate the local radius of curvature of a surface. So, by appropriate filtering and region growing based on their lengths, spheres and cylinders, for example, may be segmented from the 3D scanned datasets. The correlation or matching of such vectors requires a volume correlation or matching within the Gaussian Sphere as they have different lengths. To avoid this complexity the vector lengths can be considered to be readings or parameters associated with normalised versions of those vectors. These readings or parameters will be incorporated into the patterns on the surface of the Gaussian Sphere which may be considered to be brightness or colour of those patterns. This means that these readings or parameters must be kept distinct and also correlated or matched with readings or parameters of their own type. The direction of the divergence vector can be set to be positive or negative depending on whether the divergence or local radius of curvature is positive or negative which is concave or convex.

When the surface of the planes is rough or have surface texture the divergence vectors in the middle of a plane will have some magnitude. In such a case, the filtering must exclude divergence vectors having the lengths associated with the middle of such a plane but include divergence vectors having longer lengths associated with the much larger divergence of an edge or corner. The length of the divergence vector on a plane surface also gives an indication of the surface texture or roughness which often has a relationship to the material from which the surface is made. So, regions having similar length divergence vectors can be identified and may often be made of the same material and linked together into one object which can aid segmentation of objects.

Figure 6:
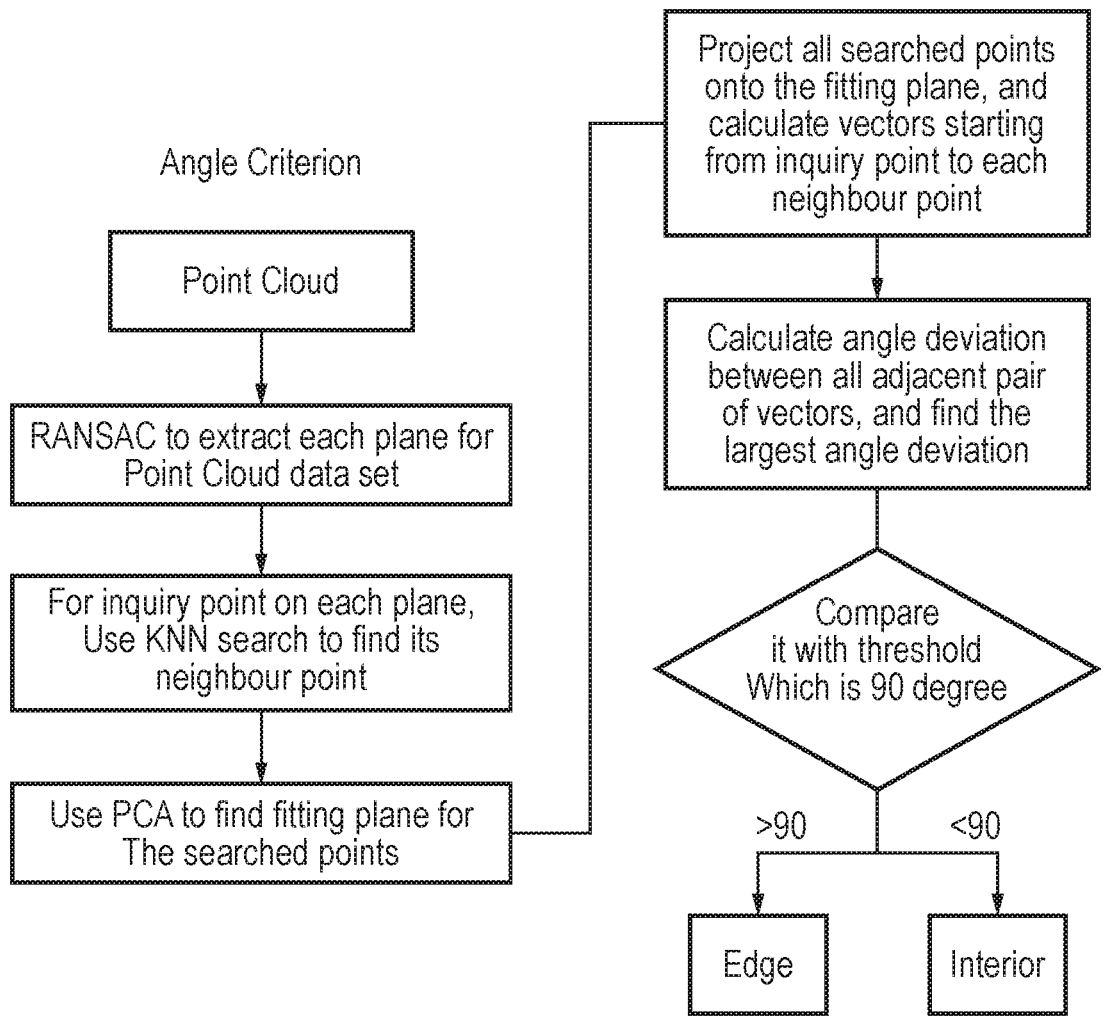
FIGS. 6-12 illustrate edge detection algorithms.
Figure 7:
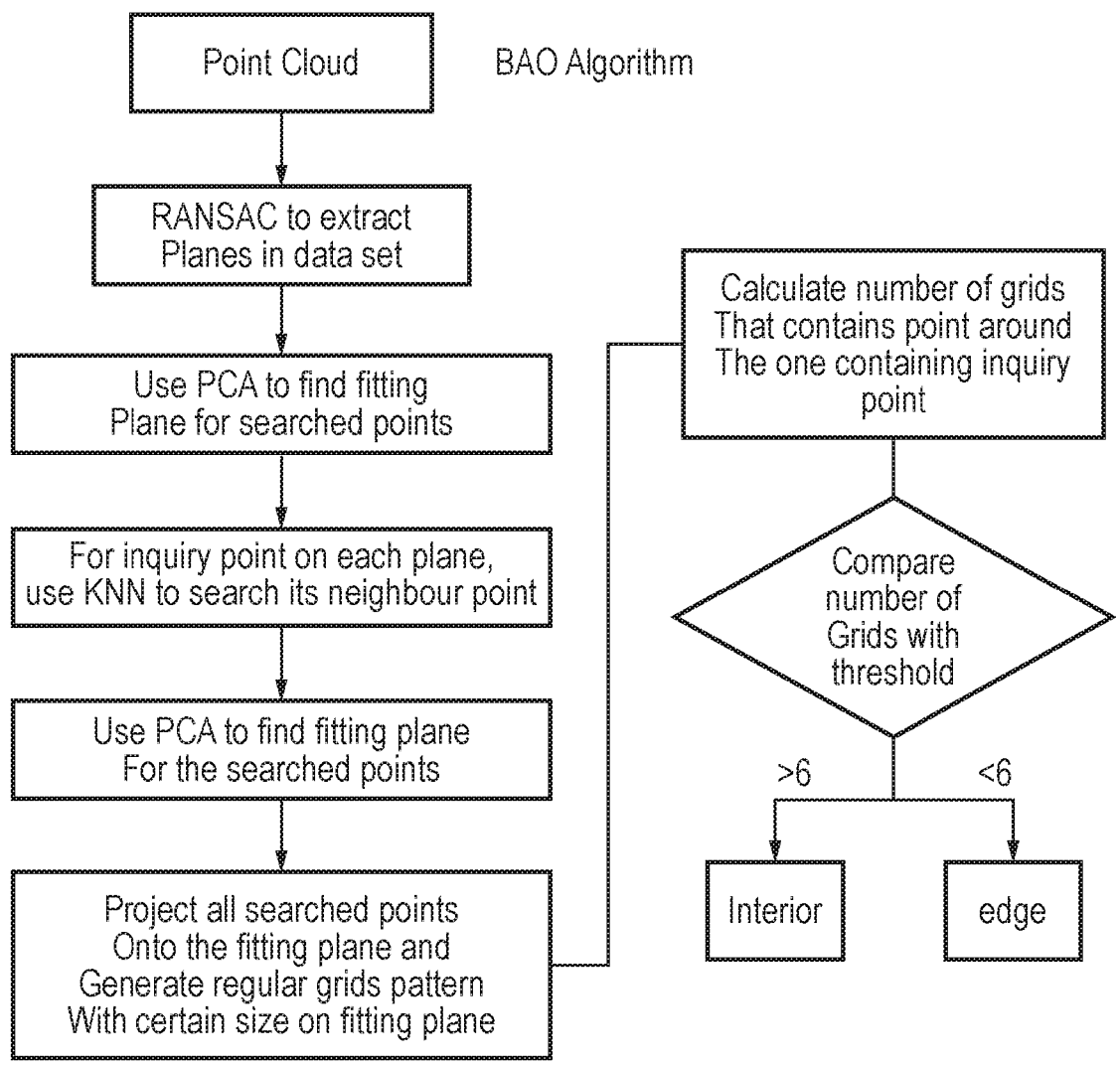

A further technique/algorithm for transforming the clouds of points into respective sets of vectors comprises:

Finding the points in the point cloud associated with edges. This may be done by finding sum vectors and filtering them or by finding divergence vectors and filtering them or by using other known techniques such as the Angle Criterion or the BAO algorithm or by first finding planes using a known method such as RANSAC Plane Detection or Hough Transform Plane detection. Then applying RANSAC Line detection algorithm to find the boundaries of each plane. RANSAC Line detection alone can be used directly but it is more reliable to first find plane and then find the edges. An example of the Angle Criterion technique is illustrated in FIG. 6. FIG. 7 illustrates an example of the BAO algorithm. The "edge vector" is constructed by fitting a straight line or straight-line segments to the edge points using a known method such as minimisation of the distance normal to the line of all the points within a certain neighbourhood of the line. The direction of these line segments form the direction of the edge vectors and their magnitude may be the length of the longest line fitting the points to within a certain accuracy or the magnitude may be normalised to unity. Whether the vector points one way or the other along the line can be determined by pointing them all towards or all away from the scanner or by pointing them up for convex edges and down for concave edges or vice versa. Such edge vectors lie in the plane or the edge and will general be at an angle, typically a right angle, to sum or divergence vectors at those points. They perform a degree of averaging over a number of points along an edge and so reduce noise. The correlation or matching of such vectors requires a volume correlation or matching within the Gaussian Sphere as they have different lengths. To avoid this complexity the vector lengths can be considered to be readings or parameters associated with normalised versions of those vectors. These readings or parameters will be incorporated into the patterns on the surface of the Gaussian Sphere which may be considered to be brightness or colour of those patterns. This means that these readings or parameters must be kept distinct and also correlated or matched with readings or parameters of their own type. Alternatively, a segmentation algorithm can be used to find and distinguish between edges. This may be done based on combinations of curvature, reflectivity, size, area, shape, texture, surface roughness, colour, direction and distance from the scanner and angle between adjacent planes or adjacent plane surface normals, for example. Then the edge vector for each different segmented edge can be labelled as a different type of edge vector. This may be done by setting its length based on the length or number of points on the edge or just labelling it. This ensures that distinguishable edges of the same type are only correlated with others of the same type in the overlapping scan.

Figure 9:
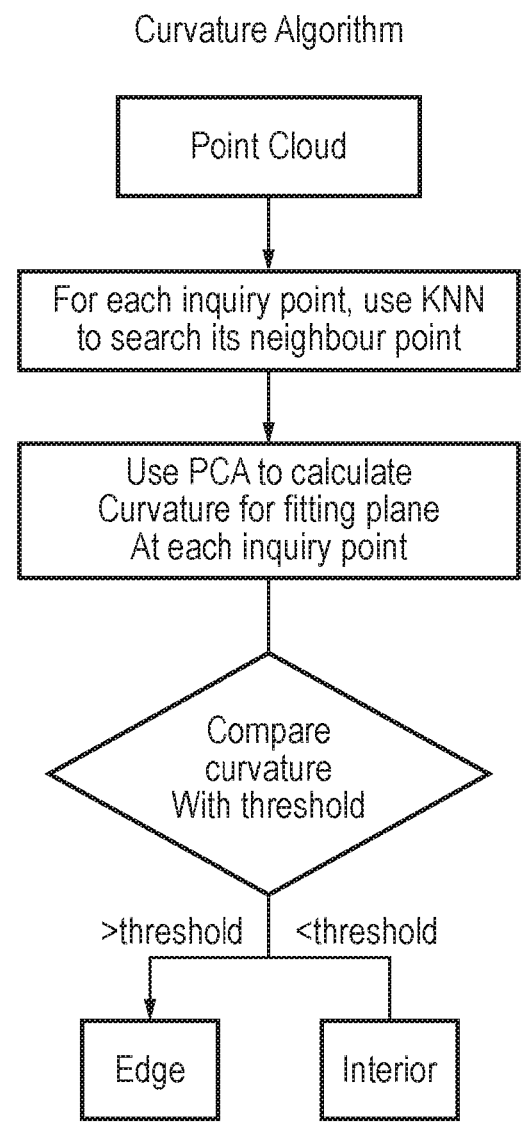

As an alternative or additional vector set to surface normal unit vectors: the vectors of the first set of vectors include cylinder vectors, and the vectors of the second set include cylinder vectors; and transforming the first point cloud into a first set of cylinder vectors and transforming the second point cloud into a second set of cylinder vectors, comprises: Use a method for recognition of cylinders in the 3D dataset and find their radius, position and orientation. Then the "cylinder vector" lies along, at and parallel to the orientation of the axis of the found cylinders and has a magnitude or length related to the radii of each of the found cylinders. Whether the cylinder vector points one way or the other along the cylinder axis can be determined by pointing them all towards or all away from the scanner. Cylinder vectors may also be normalised to unity magnitude. An exemplary curvature algorithm for generating a vector field is illustrated in FIG. 9.

There are several known methods for finding cylinders such as Efficient Hough Transform, and Efficient Hough Transform with RANSAC or by finding great circles when projected onto the Gaussian Sphere. However, if there are many cylinders and other features causing noise on the Gaussian sphere it may be hard to use this method to detect cylinders in which case, the following method is better.

First find the surface normal unit vectors. Use a segmentation algorithm to identify all regions with the same curvature or within a certain range of curvatures and points associated with these regions are preserved for further processing. The curvature may be found using a known technique, such as calculation of the smallest eigenvalue $\lambda 0$ or of $(\lambda 0/(\lambda 0+\lambda 1+\lambda 2))$ or of $(\lambda 0/(\lambda 0+\lambda 1)$ or of $\lambda 0/\lambda 1$ or of some combination of these using the eigenvalues found by PCA when finding the surface normals or by filtering the previously described divergence vectors to have magnitudes lying within a certain range. A segmentation algorithm can be used to find and distinguish between cylinders. Segmentation may be used to reduce the number of points needing to be searched in the next part of the algorithm based on combinations of curvature, reflectivity, size, area, shape, texture, surface roughness, colour, direction and distance from the scanner, directions of surface normals, for example. Then the cylinder vector for each different segmented cylinder can be labelled as a different type of cylinder vector. This may be done by setting its length based on the area or number of points on the cylinder or just labelling it. This ensures that distinguishable cylinders of the same type are only correlated with others of the same type in the overlapping scan.

Randomly choose two points with their normal vectors, and assuming that they both lie on the same cylinder, calculate the orientation, radius and position for a model cylinder fitting the points according to the cylinder's geometric properties. It is beneficial to choose the two random points to lie within a certain distance of each other. Calculate the normal distance of all point cloud points from the surface of the cylinder. Apply a threshold and only keep the points within a certain distance of that cylinder model. In an additional filtering technique which may also be implemented, it is checked whether the surface normal of each point is at approximately right angles to the axis of the cylinder model under consideration. Record the number of points associated with that cylinder model. Then repeat the whole process to find the cylinders with the largest numbers of points associated with them. It is often helpful to use all of the selected points associated with that cylinder model to recalculate the orientation, radius and position parameters of the cylinder model before repeating the whole process again. Once a good cylinder model has been found and its surface curvature, surface angle deviation or roughness, then points near its surface can be investigated to see if they are within a small range of these parameters for region growing.

The correlation or matching of such vectors requires a volume correlation or matching within the Gaussian Sphere as they have different lengths. To avoid this complexity the vector lengths can be considered to be readings or parameters associated with normalised versions of those vectors. These readings or parameters will be incorporated into the patterns on the surface of the Gaussian Sphere which may be considered to be brightness or colour of those patterns. This means that these readings or parameters must be kept distinct and also correlated or matched with readings or parameters of their own type.

Similarly other vectors may be defined to represent toroids, conics, frustums, paraboloids, hyperoloids, ellipsoids, etc.

A further technique/algorithm for transforming the clouds of points into respective sets of vectors comprises:

Use a method for recognition of 3D complex objects in the 3D dataset and find their position and orientation. An example a complex object referred to here for clarity is a chair although it is taken to mean any type of complex object. The recognition may use a known method such as 3D object template matching if an example of the 3D object is available or it may more generally use Deep Learning trained on a very large database of numerous different types of chair in different orientations and scales, together with numerous examples of other types of object which may typically be found in rooms with chairs with which to distinguish them. Then one or more complex object vectors may be associated with the location, orientation and perhaps scale of the complex object. So, for the chair example, one vector may point upwards normal to the seat of the chair along the back of the chair, while a second vector may be at right angles to this vector and lie in the plane of the seat of the chair pointing away from the back of the chair. Each of these types of vector needs to be kept distinguishable and must only be correlated or matched on the Gaussian Sphere with vectors of the same type. So, vectors normal to the seat of the chair must not be correlated or matched with vectors lying in the plane of the seat of the chair. Alternatively, a segmentation algorithm can be used initially to find and distinguish between complex objects. This may be done based on combinations of curvature, reflectivity, size, area, shape, texture, surface roughness, colour, direction and distance from the scanner, for example. Then the complex object vector for each different segmented complex object can be labelled as a different type of complex object vector. This may be done by setting its length based on the area or number of points on the complex object or its texture or reflectivity or just labelling it. This ensures that distinguishable complex objects of the same type are only correlated with others of the same type in the overlapping scan.

A further technique/algorithm for transforming the clouds of points into respective sets of vectors comprises:

Finding surface normal vectors. Finding planes which may be performed by known methods such as RANSAC plane detection, or Hough Transform plane detection or region growing based on surface curvature, surface normal angle deviation, colour, reflectivity or roughness and distance from the plane, or by combinations of these methods. Planes may also be found by representing the vectors on the Gaussian sphere and looking for a concentration or high density of surface normal vectors. The centroid of the density of surface normal vectors is the vector of the plane.

Once planes have been found the area of each plane is found or alternatively the number of points associated with that plane. Then each found plane is represented by a "plane vector" which is a surface normal vector but whose length is equal to the area of the plane, or alternatively the number of points associated with that plane, and which is located at the centroid or centre of mass of the plane. Alternatively, a segmentation algorithm can be used to find and distinguish between planes. This may be done based on combinations of curvature, reflectivity, size, area, shape, texture, surface roughness, colour, direction and distance from the scanner, for example. Then the plane vector for each different segmented plane can be labelled as a different type of plane vector. This may be done by setting its length based on the area or number of points on the plane or just labelling it. This ensures that distinguishable planes of the same type are only correlated with others of the same type in the overlapping scan. Alternatively, small template planes can be fit to the point cloud to minimise the error of the points from the plane. Then the small template planes can be joined together if their normal and other attributes are similar in orientation to grow the region and extend the plane. Alternatively, after segmentation to find planes, a large template plane of a similar area as the plane can be fit by minimising the errors of the points from the plane. This effectively averages across all of the points on the plane and so local noise and errors can be minimised. Alternatively, after segmentation to find planes, all of the surface normals on the segmented object can be added together. This may then be rescaled using the number of points or area of the plane. Alternatively, instead of finding planes, all of the surface normal vectors pointing within a small angular range of each other and positioned relatively near other surface normal vectors with a similar orientation can all be added together as a vector sum. This can most conveniently be performed in the Gaussian Sphere representation of the surface normal vectors by identifying places of high density of surface normal vectors on the Gaussian sphere and finding the centroid and then performing a vector summation of all of the surface normal vectors within a small angular range of the centroid. The correlation or matching of such vectors requires a volume correlation or matching within the Gaussian Sphere as they have different lengths. To avoid this complexity the vector lengths can be considered to be readings or parameters associated with normalised versions of those vectors. These readings or parameters will be incorporated into the patterns on the surface of the Gaussian Sphere which may be considered to be brightness or colour of those patterns. This means that these readings or parameters must be kept distinct and also correlated or matched with readings or parameters of their own type.

This has the advantage of dramatically reducing the number of vectors that have to be rotated in the Gaussian Sphere so speeding calculation time and the noise of the individual points and angular noise of surface normal vectors is averaged out by extraction of a single plane from them. It also avoids the problems of one plane aligning incorrectly to a different plane in the other scan, as generally planes will have different areas, so effectively the area acts as a label distinguishing each plane.

A further technique/algorithm for transforming the clouds of points into respective sets of vectors comprises:

Calculate at each point the point density and at the points around that point calculate the point density. Then find the direction of greatest increase in point density which gives the direction of the point density gradient vector and its length is proportional to the amount of point density change per unit distance. It can be calculated by using the grad or gradient vector operator after the point density has been calculated at every point. However, this vector is different to all the others as in order to calculate it we must not do the first step of making the point density uniform by sampling as we optionally do in the other methods. If we did that we would not find the point density gradients as there would not be any. We can apply a threshold to select the regions with the highest point density gradient and see whether these regions are adjacent and so form something like a curved surface. The remaining point density gradient vectors can then be normalised and treated as surface normal vectors, if required. The correlation or matching of such vectors requires a volume correlation or matching within the Gaussian Sphere as they have different lengths. To avoid this complexity the vector lengths can be considered to be readings or parameters associated with normalised versions of those vectors. These readings or parameters will be incorporated into the patterns on the surface of the Gaussian Sphere which may be considered to be brightness or colour of those patterns. This means that these readings or parameters must be kept distinct and also correlated or matched with readings or parameters of their own type.

This vector is very useful when the volume of space has no planes, edges or cylindrical, toric or conic features. So, the subject may be a volume of fog which is denser in some parts than others or it may be the inside of a human organ where the density varies.

A further technique/algorithm for transforming the clouds of points into respective sets of vectors comprises:

Find the point density gradient vectors as above. Find the divergence vectors as above but instead of using the surface normal vectors to calculate them instead use the point density gradient vectors to calculate the divergence vectors. The resulting vectors are the point density gradient divergence vectors.

A further technique/algorithm for transforming the clouds of points into respective sets of vectors comprises:

Use the method described above for calculation of point density gradient vectors but instead of calculating a gradient of point density calculate a gradient of other parameters and variables in each reading. These may include colour, hue, saturation, brightness, reflectivity, amount of motion of that object per second, surface roughness, surface curvature as examples.

One of the technologies that may be used as part of the conversion of a point cloud into a vector cloud, i.e. to obtain a vector representation of a point cloud, is an autoencoder artificial neural network trained using a learning algorithm in deep learning. The autoencoder extracts features in a 3D space from the point cloud and/or the readings represented by the point cloud and/or vectors representing the respective point and neighbouring points. Features may be extracted at several levels of complexity: first order, second order, third order and optionally also higher orders. The first order features are very simple such as a large gradient in point density or in point readings or an edge, for example, from the distribution of surface normal vectors and/or the sum vectors and/or the divergence vectors, all within a 3D voxel. They may just use point density or may also include reflection strength or intensity, colour and other readings and may include the position, orientation and magnitude of vectors representing the respective point and neighbouring points. The second order features combine the first order features to give more complex features. So, for example, if the first order features are parts of edges, then the second order features may join them in a pattern to give the edges of a corner. The third order features combine the second order features so several edges and corners combined may give the outline of a room. Although this example used edges, flat and curved surfaces are also features. These first, second and third order features are each represented by vectors and hence can be used as a basis for rotational alignment of 3D datasets. The advantage of this is that no prior knowledge is required of the 3D datasets to be aligned, for example, in an unknown 3D environment, as whatever features are present will be automatically identified and used to perform the alignment.

Gaussian Sphere

Whatever technique is used for generating the vectors, the angular distributions (for each type of vector in the case of multiple vector types) are compared at step S105, for which comparison the processing may include forming two nested Gaussian Spheres or unit spheres, with the same centre, from the respective sets of vectors. One Gaussian sphere or unit sphere is formed from the first set of vectors (i.e. from the first image) and one is formed from the second set of vectors (i.e. from the second image). If the vectors are surface normals, the vector points will all lie on a spherical surface. Otherwise this is a sphere representation other than a Gaussian sphere.

Filter

As an optional processing step, a non-linear filter can be applied to the sets of vectors, or to the clouds of points, in which edges, planes, cylinders, tori, cones, spheres and other shapes are recognised and the points or vectors associated with them are preserved for further processing while the rest are removed. The choice of such complex features depends on the 3D scene, so for buildings edges and planes can be beneficial. If the imaging apparatus is very noisy and the scene is known to contain certain complex features it can be beneficial to find those complex features by fitting known shapes to reduce the scatter of points due to noise. Then the points can be projected along the nearest surface normal onto the complex feature. If only the edges are recognised and extracted this will save a lot of memory and calculation cost. This may be possible for some scenes having clear edges. This effectively amounts to alignment of a wire frame version of the 3D scene. This non-linear filter can be applied to the point cloud or to the set of vectors, whichever is the most convenient for the pattern recognition algorithm. As a further alternative, in embodiments in which the best match processing of step S105 includes forming a sphere of the set of vectors by assigning them a common origin, the non-linear filter may be applied to the sphere (which may be a Gaussian sphere). For example, in the Gaussian sphere representation it is known that points of high point density on the Gaussian sphere are due to planes in the scene. Great circles and nearby points are due to cylindrical objects in the scene. Non-great circles and nearby points are due to conical objects or partially conical objects. Therefore this method makes use of all such objects to establish rotational alignment as well as other objects. Therefore it is possible to selectively enhance planes or cylinders or cones before rotational alignment.

In order to recognise complex shapes like chairs an artificial intelligence algorithm such as Deep Learning can be trained using a sufficiently large dataset of example chairs and then used to recognise chairs. This method usually requires segmentation to be carried out first before Deep learning recognition.

Edge Detection Algorithms

The non-linear filter may comprise executing an edge detection algorithm, and excluding from further processing any data point (in the point cloud) or vector (in the set of vectors) not representing an edge. Examples of edge detection algorithms include BAO algorithms, RANSAC line detection algorithms (for example, following plane finding by a RANSAC plane detection algorithm or Hough Transform Plane detection algorithm), or a trilinear interpolation algorithm.

FIGS. 6-12 illustrate exemplary edge detection techniques. Further detail is in Annex C of the published version of United Kingdom patent application GB1701383.0 provides further details.

Segmentation Algorithms

The non-linear filter may comprise a segmentation algorithm from among the following:
- executing a segmentation algorithm which may be a curvature segmentation algorithm or "smoothness constraint segmentation" algorithm;
- executing a curvature segmentation algorithm with regional growing;
- executing a curvature segmentation algorithm with regional growing based on geometric properties.

More detail on the segmentation algorithms is provided above (in the description of FIG. 4), and yet further detail is in Annex D of the published version of United Kingdom patent application GB1701383.0 provides further details.

Recognition Algorithms

Finding template shapes may be executed on the output of the segmentation algorithm, on the clouds of points, on the sets of vectors, or on the Gaussian spheres. Finding template shapes may include executing a cylinder recognition algorithm (e.g. Hough Transform Algorithm) and/or a plane recognition algorithm (e.g. RANSAC algorithm). More complex shapes such as chairs can also be recognised using artificial intelligence algorithms such as Deep Learning which require prior training using a large dataset.

More detail on cylinder and plane recognition algorithms is provided in the description of FIG. 4 (above) with respect to the alternative vector types. In addition, Annex E of the published version of United Kingdom patent application GB1701383.0 provides further details.

The following publication details techniques for identifying cylinders from a Gaussian sphere: Toony, Z., Laurendeau, D. & Gagné, C. Describing 3D Geometric Primitives Using the Gaussian Sphere and the Gaussian Accumulator. 3D Res (2015) 6: 42. doi:10.1007/s13319-015-0074-3

Once template shapes are matched, remaining data points or vectors may be excluded from further (best match) processing.

Finding Best Match

At step S105 an algorithm is executed on the two sets of vectors to determine at which angle of rotation about each of one, two, or three axes of rotation, the angular distributions of the sets of vectors exhibit the best or closest match (i.e. the greatest confidence that the sets match).

For example, step S105 may comprise:
- Either the vectors can be left as they are or the density of vector points on the surface of the Gaussian sphere can be calculated. The point density representation reduces the data storage and computational requirements. This step can be repeated independently for each of the readings and attributes associated with the vector distribution.
- Rotate the vectors of one image about the Gaussian Sphere origin along alpha, beta and gamma orthogonal angles while calculating the match between the vectors of one image with the vectors of the other image by performing a mathematical correlation of the vector point density along the alpha, beta and gamma orthogonal angles. The values of alpha, beta and gamma for the highest match or correlation are the registration rotation vectors. Alternatively, there are well known gradient search algorithms such as simulated annealing and genetic algorithms and greatest descent to find the position where the product of the vector point density of one image with the other image integrated over the sphere is a maximum. Alternatively, the pattern on the surface of the Gaussian sphere may be unfolded or mapped to a pattern on a flat plane so that images and patterns can be slid over one another on this plane to perform the correlations. This can be done for example by mapping longitude and latitude to x and y axes on a plane or by projecting an image from the surface of the sphere onto a cylinder with the same axis as in the Mercator Projection. Or this can be done by mapping azimuthal and elevation angles and radial distance to 3D Cartesian coordinates. Or by using the Gall-Peters orthographic projection which preserves relative areas. Or by using many other projections listed at https://en.wikipedia.org/wiki/List_of_map_projections. Alternatively, it is advantageous to perform the correlations making use of the Convolution Theorem, by 2D Fourier Transforming the two patterns on the surface of the sphere from the two scans, overlaying them on the same scale with the same origin, multiplying them and Inverse Fourier Transforming them.

Note the three angles, alpha, beta and gamma (i.e. the angles about the respective axes of rotation—noting that only one or two angles may be calculated in this way) at the point when the highest degree of match or correlation is calculated. These angles form the rotation part of the registration vector for aligning the two images.

Once calculated, the one, two, or three angles may be output. These angles tell the change in relative orientation of imaging apparatus to imaging subject, and thus may be used to track the rotational movement of an imaging apparatus.

In the case of other types of vector other than the surface normal vectors, such as the Sum Vector, Divergence Vector or Plane Vector for example. These have different lengths and are not normalised to one. So they will fill all or part of the space inside and outside of the unit sphere. So to do the correlation it is necessary to split that 3D space up into radial segments extending out to the distance of the longest vector, split it up in angles in azimuth and elevation to give 3D segments. The density of vector tip points in each (volume) segment is calculated and the result entered into that array element. The array is 3D. Then when two spheres are rotated about various axes they are brought into alignment to the nearest segments. Then a correlation is performed. In this case it is necessary to multiply the point density in one array segment of the first scan with that in the aligned array segment of the second scan for every segment. Then a sum all of the products is performed to get the correlation. The correlation may be found by adding the point densities in aligned segments and then summing. This means it is necessary to rotate one sphere relative to the other to give a resulting rotation in azimuth and elevation. So a 2D correlation using a 3D dataset is being performed, which is a lot less computationally expensive than doing a 3D correlation of a 3D dataset.

Optionally, the first set of vectors and the second set of vectors each comprise a plurality of subsets of vectors, each subset among the plurality representing the respective point cloud as vectors of a particular type, the particular type being different from that of the other subsets. In such cases, the angle of greatest degree of matching is calculated for each type of vector, and then the angles combined (for example, by finding a mean, or a mean after filtering to remove outliers) to find the greatest calculated degree of matching for the respective axis of rotation. The vector types may include one or more from among:

vectors generated by an autoencoder (autoencoder artificial neural network trained using a learning algorithm in deep learning) and representing first order features,
vectors generated by the autoencoder and representing second order features (i.e. combinations of first order features),
vectors generated by the autoencoder and representing third order features (i.e. combinations of third order features),
vectors generated by the autoencoder and representing fourth, fifth, or higher order features (in each case, the nth order features are combinations of the (n−1)th order features),
vectors generated by the autoencoder and representing first, second, and/or third order features,
surface normal unit vectors,
sum vectors,
divergence vectors,
edge vectors,
cylinder vectors,
complex object vectors,
plane vectors,
point density gradient vectors,
point density gradient divergence vectors, and
gradient vectors.

Alternative to S105 (Histograms)

As an alternative to the above-described Gaussian sphere process at S105, each of the point clouds may be represented by 1D histograms of point density or vector distributions, such as surface normal unit vector distributions, along one or more axes or directions. All the points in a point cloud can be projected onto a line or axis (1D histogram) or onto a plane (2D histogram). In some embodiments, some selectivity may be applied to obtain a histogram representing a subset of points. For example, a 1D histogram of point density distribution of all points whose surface normal vector is approximately parallel with an indication of vertical direction of the scan can be used to show the locations of horizontal surfaces in a scan, such as the floor and ceiling in a room.

As a further alternative, 2D histograms of point density of surface normal vector distributions in one or more planes may represent the point clouds. All the points in a point cloud can be projected onto the plane, or some selectivity may be applied to obtain a histogram representing a subset of points. For example a plane coinciding with an indication of a horizontal plane of the scan with the histogram showing point density of points whose surface normals approximately lie in the plane show locations and orientations of vertical surfaces, such as walls in a room. As another example, for 2D histograms of vector field orientations, the two axes of the histogram may indicate the polar and azimuth angles of the vectors or they may be in Cartesian coordinates or in other coordinates appropriate to the 3D environment. The vector-distributions used as data include, but isn't limited to, for example the surface normal vector or the sum-vector.

Additionally, in the case of 1D and some 2D histograms, the individual point contributions may be scaled by the sign of the dot product between a reference direction (e.g. the axis of a 1D histogram or plane normal of a 2D histogram or between a different type of vector) and the vector quantity in question for the histogram. The effect of this is that the histogram now contains peaks of both positive and negative sign, effectively doubling the amount of information compared to just positive peaks. In the case of a 1D histogram along the vertical direction in a scan, showing point densities of horizontal scans, it is possible to distinguish between the floor and the ceiling indicated as positive and negative magnitude peaks in the histogram.

In the histogram alternative, to align the two point clouds, cross-correlations are calculated by performing 1D and 2D cross correlations on the 1D and 2D histograms, assuming that the 1D and 2D histograms being cross-correlated.

Rotating

At step S106, the second point cloud is rotated by the noted angle(s) to bring the two point clouds into rotational alignment. Step S106 is optional—it may be that the rotational transform required to bring the two point clouds into rotational alignment is stored and/or output as a property of one or other or both of the datasets.

Translational Alignment

The flow proceeds to steps S107 to S109, which is the translational alignment processing. The input to the translational alignment processing is two clouds of points representing overlapping spaces.

Projection Onto Lines

At step S107a and S107b, the images are each projected onto three lines, so that each image is recorded as three one-dimensional arrays. Both images are projected onto the same lines, which may be achieved by using a common coordinate system.

Select three lines at an angle to each other. More than three lines may be selected. For example, ten lines may be selected, including three fulfilling the following requirements. The third line must not be in the same plane as the other two lines and a minimum angle may be predefined between the third line and the plane of the first two lines. Conveniently the three lines can be orthogonal and form the three axes, x, y, z. Also conveniently in building images they can align with the edges of the floor and walls. Optionally, a line selection algorithm may be executed which collapses one of the two images (i.e. projects the point cloud) onto a line, the collapsed points are self-correlated, and matching peaks of the correlation are analysed, rotating the line of projection on each analysis, until the matching peaks of the correlation show a single peak that is more than a threshold higher than the other correlation peaks.

The two clouds of points are each projected (collapsed) onto each of the three lines, producing three one-dimensional arrays of positions (wherein each point is a position on the line) per point cloud. If the lines are orthogonal and the co-ordinate axes this is done by setting two of the co-ordinates to zero for a projection onto the third co-ordinate line and similar for the other three axes. This type of collapse represents a projection onto the axis along a vector normal to the axis. Other types of projection or collapse along curved lines or lines at an angle to the axis or in a non-linear fashion may be implemented.

Optionally, a non-linear or linear magnitude scaling is applied to the data representation distribution on each axis, for example, to emphasise stronger magnitudes using an exponential or power law function or to suppress stronger magnitudes using a logarithmic function, for example. Such scaling may be predefined for the apparatus or may be configured in dependence upon the nature of the imaged domain.

Find Best Match of Projections

At step S108, for each co-linear pair of projections (projection meaning one-dimensional array of positions or points in this context), processing is performed to find the relative position (i.e. the amount of shift along the line) at which the best mathematical correlation is exhibited between the projections.

Find Best Match of Projections

The processing for finding the relative position of best match between the projections for each line may be conducted as follows:

Slide the projection of one image along the line (onto which the image is projected) in small steps so that it begins to slide over and past the projection of the other image For one of the 3 lines or axes, at each slide step calculate how well the two projections match by calculating a match which can be done in a number of ways listed below one of which is a mathematical correlation function. Note that this is a one dimensional correlation and so minimises the computational cost For one of the 3 lines or axes, find the maximum value of the match between the projections and note the direction and distance the (for example) second image projection had to be moved along the line in order to achieve this maximum matching value Repeat for each of the three axes to obtain three translation distances (and direction along the line—positive or negative) which form the translation parts of a registration vector.

Depending on the size of the steps used when sliding the projections over one another, it may be that further alignment is required. The translation processing may include a fine alignment step using iterative closest point, ICP, or a least squares alignment algorithm. Convergence can be achieved using an error minimisation technique such as Levenberg-Marquardt (LM) algorithm.

The three obtained translation distances (along with information defining the line along which the distance is calculated) may be output as an alternative to, or in addition to, the merged point cloud.

Finding a best match position of the two one dimensional arrays can be done in a number of ways. For example:

mathematical correlation: a known mathematical operator which effectively slides one function over the other into all possible relative positions and integrates the product across the plane giving zero when there is no overlap. The calculated integrated value can then be also plotted on the plane as another function and the highest point indicates the best alignment;

local gain: one function is slid over the other function into all possible relative positions. Then an area is chosen and the two functions are summed and integrated within the area and divided by the integral of the stationary function to give the local gain or amplification of the function. If the two scans were taken from the same position at the same time and perfectly aligned then the local gain would be uniform and would take the value of 2. For partially overlapping perfectly aligned functions the gain will be higher in the overlap region approaching 2 and will be 1 elsewhere. The overlap region can therefore be extracted by setting a threshold slightly greater than 1. The aim is to find the most uniform local gain across the overlap region. This uniformity of local gain can be found by calculation of the standard deviation or variance of local gain across the overlap region. Apart from exhaustive search of all relative positions of the two functions there are many well known search methods such as simulated annealing, genetic algorithms, direct gradient search to minimise a function such as variance of uniformity;

potential energy: the two functions are plotted in 3D on the surface and are each represented by a rigid solid surface sheet. Then one function is slid over the other to all possible relative positions. In order to move one function over the other the lowest points on one function have to slide over the highest points on the other function. Let us assume one function is stationary and that we calculate the average height of the other function when placed onto of the stationary function to find the potential energy. The aim is to minimise the potential energy. Apart from exhaustive search of all relative positions of the two functions there are many well known search methods such as simulated annealing, genetic algorithms, direct gradient search to minimise a function such as potential energy. It is advantageous once complete to repeat this operation but swapping the two functions. The reason for this is that if someone came into the room in one scan but not the other the two scans would not have a low potential energy when aligned as the person would block them coming close enough if in the upper scan. However, once swapped the person has no effect on the potential energy. So the lowest potential energy between the two swaps is chosen as the alignment position;

least squares or ICP: either of these known methods can be used, optionally after coarse alignment by mathematical correlation, local gain, or potential energy.

Translational Alignment

At step S109 the two clouds of points are brought into translational alignment by shifting the second image along the selected 3 lines. The clouds of points are now in rotational and translational alignment, so can be considered to be a single merged point cloud. The merged clouds of points can be output, for example, to a party or device from which the images were obtained, or to a storage unit. The clouds of points can be output as separate clouds defined in the same coordinate system, or as a single point cloud (in a single coordinate system).

A new image of a space overlapping with the space imaged for either or both of the original first and second images can be obtained and subjected to the rotational and/or translational alignment processing of steps S102 to S106 or S109, wherein either the merged point cloud from the original two images is the image with which the new image is merged, or an individual one of the original two images which overlaps with the new image in terms of imaged space, defined in the coordinate system of the images following alignment processing. There is no limit to the number of new images that can be added in this way.

Check Aligned Scans

An optional checking step may be performed for any pair of scans aligned with an apparatus or process of an embodiment. If the scanner location is stored as metadata with each 3D dataset, or in which the scanner location is derivable from the 3D dataset, the scanner locations can be used to identify false positives (actually incorrect alignment although the first part of the algorithm, before checking, may record this as being correctly aligned) in the alignment of individual 3D datasets with one another. For example, if, following merging, the merged 3D point cloud represents readings (i.e. points) from a first 3D dataset in the line of sight between readings of a second 3D dataset and the scanner location of the second 3D dataset, then it can be taken as an indication that the pairing of the first and second 3D datasets is incorrect. This process may be termed "ray tracing". This may be corrected by rotating one of the scans about an axis, for example a vertical axis, by 90, 180, and 270 degrees to check whether the alignment is corrected, and optionally also about a horizontal axis by 180 degrees. Such correctional rotations may be particularly helpful in implementations in which the scans represent buildings or other subjects showing symmetrical features.

Embodiments operate on a pair of scans or a network of scans in any configuration, as long as there is overlap between each scan in the network and at least one other scan. For a network of scans, the rotational and translational alignment using the techniques disclosed herein can be performed on all overlapping pairs of scans in the network. The network of scans may be accompanied by a scan pair file which identifies, for each scan, at least one other scan with which the scan overlaps. Using this basic information, a single merged point cloud can be constructed by finding the correct rotational and translational alignment (i.e. the correct positional relationship) between each scan and its one or more overlapping neighbours, merging the scan and its one or more overlapping neighbours into a new common point cloud using the correct rotational and translational alignment, and then either: treating the common point cloud as a new input scan and adding other overlapping scans one-by-one; or merging the common point clouds into a single point cloud by putting all of the common point clouds into a common coordinate system and co-locating instances of the same individual scan (for example by using scans at the edge) appearing in more than one common point cloud. In the case of identifying only the best correlation for an individual scan, the common point cloud may be termed a pair-wise point cloud.

As an alternative to the scan pair file being input, embodiments may discover scans which overlap by finding a correlation, or degree of matching, between each combination of scan pairs, and assuming that, for each respective scan (wherein a scan is a 3D dataset), it overlaps the other scan with which it exhibits the best degree of matching, and each remaining scan having a correlation (or degree of matching) with the respective scan within a defined range of the best correlation (or best degree of matching). The range can be adaptive to give a fixed number of overlapping scans or the range can be fixed. The respective scan and the "other scan with which it exhibits the best degree of matching" are treated as a scan pair.

In particular, for each combination of scan pairs the following steps are executed: storing the first 3D dataset and the second 3D dataset as respective clouds of points in a common coordinate system; transforming the stored first point cloud into a first set of vectors, and transform the stored second point cloud into a second set of vectors, wherein each member of the first set of vectors and each member of the second set of vectors represents the respective point and neighbouring points; finding at which angle of rotation of the second set of vectors relative to the first set in one or more of three axes of rotation, defined in the common coordinate system, the greatest degree of matching between the angular distribution of the first set of vectors and the angular distribution of the second set of vectors is obtained; storing the angle of rotation about each of the one or more axis or axes of rotation for which the calculated degree of matching is greatest, and storing said greatest calculated degree of matching. Optionally, the first set of vectors and the second set of vectors each comprise a plurality of subsets of vectors, each subset among the plurality representing the respective point cloud as vectors of a particular type, the particular type being different from that of the other subsets. In such cases, the angle of greatest degree of matching is calculated for each type of vector, and then the angles combined (for example, by finding a mean, or a mean after filtering to remove outliers) to find the greatest calculated degree of matching for the respective axis of rotation.

Then, the stored calculated degrees of matching for all of the pairs including a particular scan are compared to find the scan having the greatest correlation with the particular scan, based on the calculated degrees of matching. In particular, the embodiment identifies the pair for which the stored greatest degree of matching is maximum. Other pairs may be identified by assuming that the particular scan also overlaps other scans having a greatest degree of matching (noting that this represents the most likely angle of rotational misalignment between any pair of scans) within a defined range of the maximum greatest degree of matching. The range can be adaptive to give a fixed number of overlapping scans or the range can be fixed.

In a more complex example, additional processing is performed to encourage the linking of scans in a network. The processing is based on the maximum greatest degree of matching for a scan (say, scan A). Other scan pairs including scan A and exhibiting a greatest degree of matching that is within a predefined threshold (which may be proportional or may be absolute) of the maximum greatest degree of matching may also be determined as an overlapping pair in the network, and hence to be subjected to rotational and translational alignment processing with scan A. For other pairs for which the greatest degree of matching with scan A is less than the maximum degree of matching by a more than a further predefined threshold, it may be assumed there is no overlap. The further predefined threshold may be the same as the predefined threshold, or may be less than the predefined threshold, which leaves a gap in which some pairs may be determined neither as an overlap or a non-overlap. Pairs falling in the gap may, for example, be reviewed manually. If the network is a pairwise daisy chain or branched tree structure (which could be notified by a user as an instruction to the embodiment) then it is assumed that there will be some scans at the end of the daisy chain and some in the chain and some at the branching points. The ones at the end only have one partner. The ones in the daisy chain or branches have two. The ones at the branching points may have 3 or 4 or more. In an example the overlap of scan A and scan B may be more than between scan A and scan C (in other words, the maximum greatest degree of matching is at A-B, at A-C the greatest degree of matching is less than said maximum). Then compare the greatest degree of matching of A-B and A-C and if the difference between them is larger than the further predefined threshold, we know A is at the end of a branch. If the difference is less than the predefined threshold then we know A is in an overlapping pair with both B and C and is likely to be in the middle of a daisy chain or branch. Similarly, if the differences between the greatest degrees of matching of all scan pairs of A-B, A-C and A-D are less than the predefined threshold then they are all linked together in overlapping pairs with scan A, which is at a branching point.

In the case of a daisy chain or branched tree structure all the adjacent scans which are determined to be in overlapping pairs with scan A are those which are used to calculate the alignment of scan A. If A is at the end of a branch then we only use its alignment with scan B to determine its position.

It may be that embodiments weight the influence of any overlapping scans in the calculation of rotation and position of a scan based on the inverse of the amount of overlap (or the closeness of the degree of matching to the maximum degree of matching: the closer the higher weighting). This means calculating the rotation and translation vector correction from a scans present orientation and position using each pair of scans. And then combining these correction vectors by performing vector averaging using this weighting factor on each correction vector. This weighting can be linear or non-linear and can be used together with a threshold to ignore scans with an overlap less than an absolute threshold or with a greatest degree of matching to the scan more than a threshold amount less than the maximum greatest degree of matching for the scan. The predefined threshold may be adapted automatically to give a maximum of say 6 scans to be used in the alignment calculation.

Since the pair have been rotationally aligned, a translational alignment procedure is performed to enable a complete and accurate positional relationship between the two to be determined. Assuming that the two scans are represented in a common coordinate system, the translational alignment process comprises: for each of three or more lines in the common coordinates system, wherein each pair of lines from among the three or more lines is non-parallel and at least one pair of lines from among the three or more lines is non-co-planar: recording the position, relative to an arbitrary origin, of a projection onto the line of each point among the first point cloud; storing the recorded positions as a first 1-dimensional array, and/or storing one or more properties or readings of each point at the respective recorded position as the first 1-dimensional array; recording the position, relative to the arbitrary origin, of the projection onto the line of each point among the rotated second point cloud; storing the recorded positions as a second 1-dimensional array, and/or storing one or more properties or readings of each point at the respective recorded position as the second 1-dimensional array; finding a translation along the line of the second 1-dimensional array relative to the first 1-dimensional array at which a greatest degree of matching between the first 1D array and the second 1D array is computed, and recording the translation at which the greatest degree of matching is computed.

The two scans in the pair are then obtained, rotated into rotational alignment (if this has not already been performed), and translated into position using the recorded translations along the lines calculated in the translational alignment procedure, thereby obtaining a pairwise point cloud representation of the pair of individual 3D datasets with a fixed rotational and translational relation between the pair. Finally, embodiments merge the pairwise point cloud representations of the pairs into a single point cloud by co-locating instances of the same individual 3D dataset (for example by using scans at the edge) appearing in more than one of the pairwise point cloud representations.

In embodiments in which the scanner location is stored as metadata with each 3D dataset, or in which the scanner location is derivable from the 3D dataset, the scanner locations can be used to identify false positives in the pairing of individual 3D datasets with one another. For example, if, following merging, the merged 3D point cloud represents readings (i.e. points) from a first 3D dataset in the line of sight between readings of a second 3D dataset and the scanner location of the second 3D dataset, then it can be taken as an indication that the pairing of the first and second 3D datasets is incorrect. This process may be termed "ray tracing". This may be corrected by removing the first or second 3D dataset from the merged point cloud, and repeating the step of identifying the pair for which the degree of matching is maximum, and excluding the pair comprising the first and second 3D datasets from the candidates, thus finding a new pair for the 3D dataset. The rotational and translational alignment procedures can be performed for the new pair, and the 3D dataset merged into the merged point cloud in the resulting new position. Alternatively, it may be that the scan is rotated about an axis, for example a vertical axis, by 90, 180, and 270 degrees to check whether the alignment is corrected, and optionally also about a horizontal axis by 180 degrees. Such correctional rotations may be particularly helpful in implementations in which the scans represent buildings or other subjects showing symmetrical features.

As a further alternative technique for identifying false positives in the pairing of individual datasets, a manual procedure may be used, in which the merged 3D point cloud is presented to a user via a graphical user interface, for example, as a 2D or 3D image, the individual 3D datasets being identifiable within the merged 3D point cloud (for example, by colour-coding), and the graphical user interface enables a user to re-position individual 3D datasets relative to the rest of the merged 3D point cloud. In such embodiments, the manual re-positioning is constrained insofar as there must be at least a portion of overlap between the re-positioned individual 3D dataset (dataset A) and at least one other individual 3D dataset (dataset B) in the merged 3D point cloud. Dataset A and dataset B are then treated as a pair. The rotational alignment calculations have already been performed for each combination of dataset pairs, and can be retrieved (the angle of rotation about each of the one or more axis or axes of rotation for which the calculated degree of matching is greatest for the pair). The pair are then subjected to the translational alignment processing. The complete positional relationship between dataset A and dataset B is thereby obtained and can be stored as a vector (or vectors: one for rotation; one for translation) representing the rotational and translational transformation needed to bring dataset A (or B) into correct translational and rotational alignment with dataset B (or A). The vector (or vectors) may alternatively be stored on a per dataset basis and be a transformation required to the coordinates of the points in the dataset to render them in the correct position with respect to other datasets in the common coordinate system. Alternatively, the datasets A and B can be stored in the merged 3D point cloud in accordance with said obtained complete positional relationship.

Figure 14:
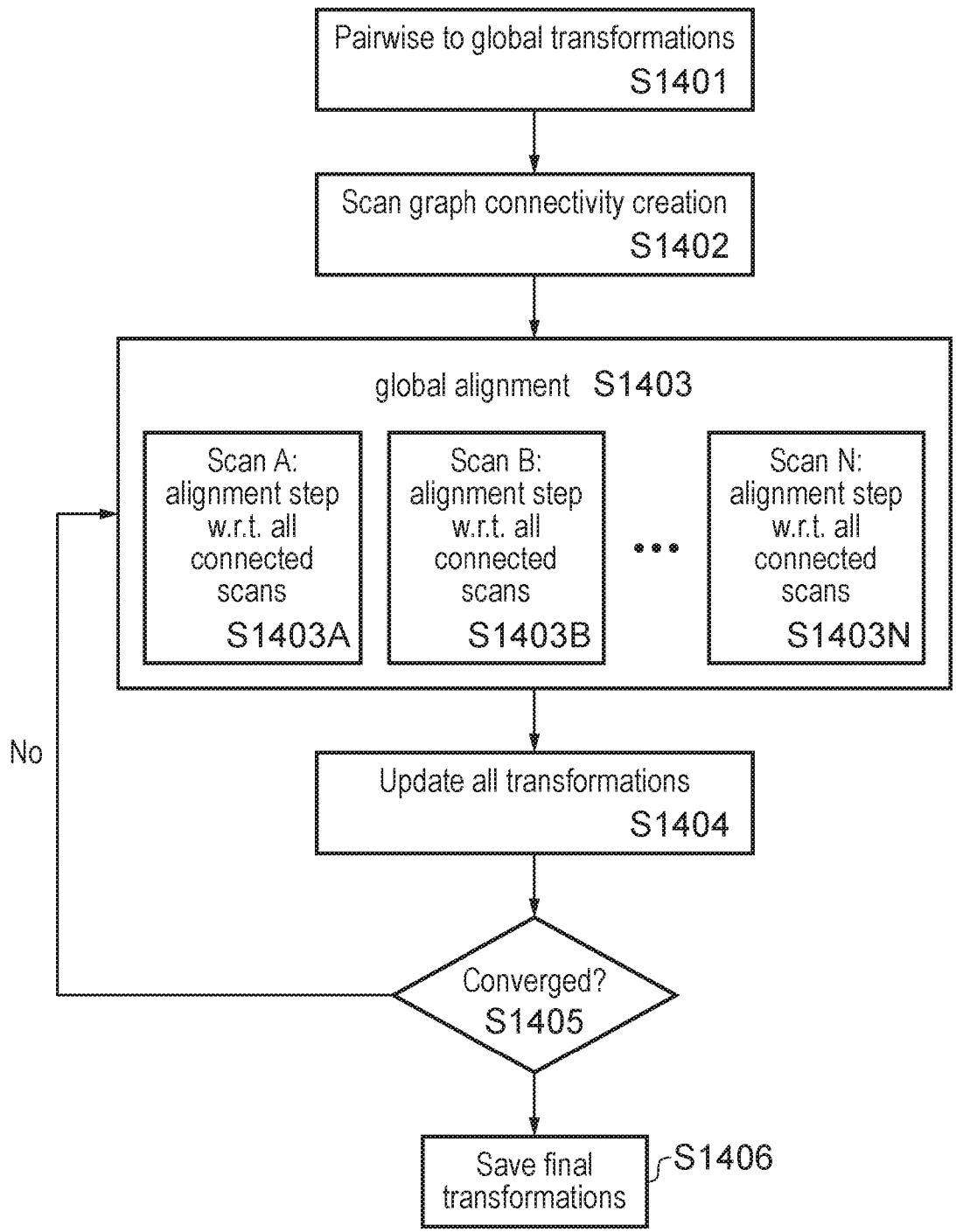
FIG. 14 is a flowchart illustrating processing in an image processing method.

FIG. 14 illustrates a process in an embodiment.

At S1401 pairwise transformations for a plurality of pairs of scans (3D datasets) are transformed to global transformations. This step can be considered pre-processing, and may not be required, depending on the configuration of the input scans. The transformations matrices for each scan are converted from pairwise, relative, transformations to global ones. This step is optional as it is only required if the input scans are provided with relative transformations in pairs. After step S1401, the position and orientation of each scan is expressed w.r.t. to a common shared point of reference. In other words, the plurality of scans are expressed in a common workspace or common coordinate system.

At S1402 a scan connectivity graph (map) is created. This step can be considered pre-processing. At S1402, for each scan, which when being processed can be considered a "subject" scan, a set of neighbouring "reference" scans that share some overlapping area with the subject scan are identified. The identified reference scan or set of reference scans for each scan is stored as a subject scan as a mapping of subject scan to reference scan(s). Selection criteria for reference scans may include the following:

Distance: reference scans must be within some defined maximum distance from the subject scan. For example, within a 15 metre radius.

Overlap: each reference scan must have sufficient overlap with the subject scan, for example at least 10%. Overlap is calculated as the number of point-pairs relative to the total point count, that are within some threshold distance from each other. Additional constraints include matching surface normal directions, reading values, surface curvatures, surface roughness or divergence of surface normals, etc.

The created scan connectivity graph (or map) may be constrained by the following criteria:

Each scan must have at least one reference scan. However, multiple scans in connected networks or loops are likely to reduce (or more evenly spread out) alignment errors. This means that loops are allowed (and preferred) in the connectivity graph.

At least one scan must be selected as a fixed reference scan. This could for example be the scan that has the largest number of connected reference scans. It is also possible to have multiple fixed scans, whose positions could for example be based on accurate measurements using a total station, GPS, or other methods.

All scans must be connected to a single graph (group of scans).

Step S1403 is the Global alignment Step: within the "global alignment step" an improved transformation is calculated for each scan based on all the reference scans. As illustrated in FIG. 14, the process is first performed for scan A at S1403A, then for scan B at S1403B, and so on until the final of N scans at S1403N. These improvements are all calculated independently from other scans, so that the calculations may be performed sequentially or in parallel, on a single computer or a cluster of many computers. For each scan in the scan connectivity graph (i.e. for each of the plurality of scans) as a subject (or source) point cloud, each of the one or more scans overlapping the subject point cloud are set as a reference point cloud. An alignment algorithm (which may be a rotational or translational alignment algorithm mentioned elsewhere, or may be an iterative closest point algorithm) is then executed on the subject point cloud and the reference point cloud with the defined rotational and translation relation between the subject point cloud and the reference point cloud in the point-cloud representation of the subject as an initial estimation, to rotate and translate the subject point cloud relative to the target point cloud until a process error criterion is met, to obtain a revised defined rotational and translational relation between the subject point cloud and the reference point cloud.

At S1404, the revisions of the defined rotational and translational relations are then combined, for example, as an average or weighted average (weighting may be according to extent of overlap), and the combined revision applied to the positional information of the subject point cloud. The combined revision being applied may mean that there is a merged point cloud in which the subject point cloud actually moves position, or it may mean that information storing positional information for the subject point cloud in the common coordinate system is modified.

The process finds a plurality of scans with a high degree of overlap as the plurality of scans and to within a degree of match range. These plurality of scans will normally be within the neighbourhood of the subject scan. Then the alignment vectors for the subject scan to each of these plurality is separately computed. Each pair of overlapping scans gives a rotation and translation vector correction to move the present position and orientation of the subject scan. Then these correction vectors coming from each pair of scans are averaged, optionally as a weighted average based on the degree of overlap (weighting proportional to degree of overlap).

The process may end at S1404. Optionally, at S1405 a criterion can be implemented to determine whether or not to repeat S1403 to gain further revisions. For example, if all the transformation-updates were sufficiently small (below some threshold set by the user or predefined), the algorithm has converged to a solution and can be ended. If, however, one or more transformations did not meet the convergence criterion, the "global alignment step" S1403 is repeated. Alternatively, or additionally, the user may set a maximum number of "global alignment steps" S1403 to execute, after which it terminates even if the desired solution tolerance has not yet been achieved.

At S1406 the revised rotational and translational relations are saved, and may optionally be implemented in a revised point cloud representation of the plurality of scans merged into a single point cloud according to the saved rotational and translational relations.

Figure 5:
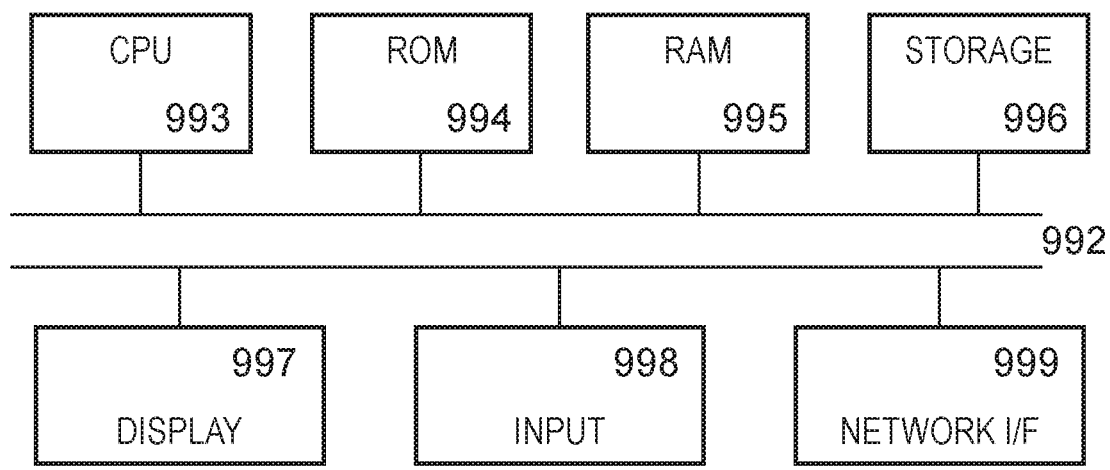
FIG. 5 illustrates a hardware configuration of embodiments.

Description of FIG. 5

FIG. 5 is a block diagram of a computing device, such as a server, which embodies the present invention, and which may be used to implement a method of any of the embodiments. In particular, the computing device of FIG. 5 may be the hardware configuration of one or more from among the 3D image acquisition unit 12, the storage unit 14, the rotational alignment processor 16, and the translational alignment processor 18. The computing device of FIG. 5 may be used to implement the method of any of FIGS. 4 & 6-14.

The computing device comprises a computer processing unit (CPU) 993, memory, such as Random Access Memory (RAM) 995, and storage, such as a hard disk, 996. Optionally, the computing device also includes a network interface 999 for communication with other such computing devices of embodiments. For example, an embodiment may be composed of a network of such computing devices operating as a cloud computing cluster. Optionally, the computing device also includes Read Only Memory 994, one or more input mechanisms such as keyboard and mouse 998, and a display unit such as one or more monitors 997. The components are connectable to one another via a bus 992.

The CPU 993 is configured to control the computing device and execute processing operations. The RAM 995 stores data being read and written by the CPU 993. In addition, there may be a GPU. The storage unit 996 may be, for example, a non-volatile storage unit, and is configured to store data.

The optional display unit 997 displays a representation of data stored by the computing device and displays a cursor and dialog boxes and screens enabling interaction between a user and the programs and data stored on the computing device. The input mechanisms 998 enable a user to input data and instructions to the computing device. The display could be a 3D display using stereo glasses or all in a helmet like Hololens or a holographic display or an autostereoscopic display neither of which need special glasses.

The network interface (network I/F) 999 is connected to a network, such as the Internet, and is connectable to other such computing devices via the network. The network I/F 999 controls data input/output from/to other apparatus via the network. The network I/F may provide a connection to a computing device from which the 3D datasets were obtained, and may receive arguments or instructions defining elements of the processing (for example, selecting algorithms).

Other peripheral devices such as microphone, speakers, printer, power supply unit, fan, case, scanner, trackerball etc may be included in the computing device.

The 3D image alignment apparatus 10 may be embodied as functionality realised by a computing device such as that illustrated in FIG. 5. The functionality of the 3D image alignment apparatus 10 may be realised by a single computing device or by a plurality of computing devices functioning cooperatively via a network connection. Methods embodying the present invention may be carried out on, or implemented by, a computing device such as that illustrated in FIG. 5. One or more such computing devices may be used to execute a computer program of an embodiment. Computing devices embodying or used for implementing embodiments need not have every component illustrated in FIG. 5, and may be composed of a subset of those components. A method embodying the present invention may be carried out by a single computing device in communication with one or more data storage servers via a network.

The 3D image acquisition unit 12 may comprise processing instructions stored on a storage unit 996, a processor 993 to execute the processing instructions, and a RAM 995 to store information objects during the execution of the processing instructions.

The rotational alignment processor 16 and the translational alignment processor 18 may be programmed processor hardware, comprising processing instructions stored on a storage unit 996, a processor 993 to execute the processing instructions, and a RAM 995 to store information objects during the execution of the processing instructions.

In either case the processor could be a CPU or a GPU or FPGA or an array of them.

DETAILED DESCRIPTION OF A FURTHER ASPECT

Point Cloud Generation Processor

Each of the first dataset and the second dataset may be a point cloud or may be some other form of scan data. The dataset acquisition unit obtains the first dataset and the second dataset as data files, and may also include hardware for converting physical readings to a dataset of scan data. That is to say the dataset acquisition unit may include an imaging apparatus for converting physical readings to datasets. Alternatively, the dataset acquisition unit is operable to receive, for example over a network or some other form of data connection, the first dataset and the second dataset from respective imaging apparatus. The imaging apparatus can be any of the examples of imaging apparatus detailed elsewhere in this document in relation to other embodiments.

In addition, the datasets obtained by scanning may be, or may be merged with, or may be aligned with, or may be obtained from, a CAD model or mesh model or any other 3D representation that is sampled at certain locations to generate a point cloud. This may have applications in building design where an architect wishes to combine elements from a CAD model, for example, a proposed extension, with scans of a physical building to which the proposed extension is to be aligned. This may also have applications in building construction where a construction engineer wishes to compare the "as-designed" CAD model with scans of a the physically constructed "as-built" building. This may also have applications in film making and augmented reality where computer generated imagery, CGI, mesh models need to be precisely aligned with a real 3D scanned environment.

The first dataset and second dataset may have already undergone a preliminary alignment processing via the apparatus of FIG. 1. The dataset acquisition unit acquires the first dataset and the second dataset as point clouds rotationally, and optionally translationally, aligned to a specified precision level by the apparatus of FIG. 1. The iterative rotation of one of the point clouds about the axis of rotation is through a range of angles in the vicinity of the present rotational alignment of the point cloud. The range is, for example, determined by the precision of the coarse alignment, and is substantially equal to the range of angles between the present rotational alignment plus/minus the specified precision level in either direction.

The subject of interest is a physical entity represented in the datasets, which may be, for example, a region of space, or all or part of one or more objects.

The input datasets (collectively referring to the first dataset and the second dataset) may be point clouds, or may be datasets representing a subject of interest by some other means, for example, lines and shapes.

When an input dataset is a point cloud already, the point cloud generation processor may convert the point cloud to the common coordinate system, and store the point cloud. In addition, the point cloud generation processor may perform sampling to increase or decrease point density, for example, for compliance with a predefined common point density for both clouds of points. The processor may also convert from one point cloud format to another say from .fls to .xyz format as the original format may not be in Cartesian coordinates.

When an input dataset is not already in the form of a point cloud, then the point cloud generation processor executes a conversion process to convert the dataset to a point cloud. For example, there may be a predefined point density common to both input datasets to which the dataset is sampled in the conversion process.

In the generated point clouds, the first point cloud and the second point cloud are defined in a common coordinate system. The common coordinate system may be a native coordinate system of either or both datasets. If either dataset is two dimensional, then the point cloud thereof defines a plane in the three-dimensional common coordinate system. Both datasets are at least 2-dimensional, and either or both may be 3-dimensional. One way to get a point cloud from a 2D dataset is to vary the point density in proportion to the darkness or brightness of part of the image. In a 2D dataset where the darkness indicates the density or strength of some feature the point density could be made to be high in this vicinity proportional to the darkness. One way to do this is to create a highly dense random array of points and superimpose on the 2D dataset. Then randomly thin out points depending how much lighter one part is than the darkest part. Another way is to have a random point generator which has as input the density of points required. Then move this generator across the 2D image and input to it the darkness of the image at each point. Another method is to put a fine regular grid over the 2D dataset. Then into each cell put a random distribution of points, of which the number of points depends on the darkness or brightness of the 2D dataset averaged over the cell. There are other methods too to get a point cloud from a drawing or model.

The relative rotational alignment of the two point clouds in the three-dimensional common coordinate system may be arbitrary. Alternatively, the two datasets may be provided in a form in which an axis or axes common to both datasets (for example, a horizontal or vertical axis) is defined, and the common axis or axes are aligned in the common coordinate system (of course, along with the rotational alignment, if known, of the respective datasets relative to said common axis or axes).

Similarly, the relative translational positions of the two point clouds in the three-dimensional common coordinate system may be arbitrary, or prior approximate knowledge may be used to approximately place them.

The alignment processor is configured to determine relative angle of rotation of the scanned subject between the two datasets, about one or more axes of rotation. The axes of rotation may be, for example, three axes according to which points in the respective point clouds are defined. It may be that angles of rotation about one or more axes are already known, for example, due to specification of a common line or plane, such as horizontal, in the two obtained datasets. A user of the apparatus may be presented with a user interface enabling indication of the one or more axes about which an angle of rotation is to be determined by the alignment processor.

For each axis of rotation of interest, the two point clouds are rotated relative to one another in the common coordinate system. The rotation is iterative (stepwise) and at each iteration, a process is carried out of projecting the two point clouds onto one or a plurality of lines, and, for each line, sliding the two projections relative to one another along the line (again in an iterative or stepwise manner) to find a correlation value between the two projections at each step/iteration, in order to determine a best/greatest correlation value for the angle of relative rotation. Once this process has been repeated for each step within a desired range of angles (which may be, for example, a complete rotation), the maximum value among the best/greatest correlation values is determined, and the relative angle of rotation yielding said maximum value is determined to be the angle of rotational alignment of the two datasets about the axis of rotation. In addition, the translation yielding said maximum value is recorded, the translation along the respective line representing the spatial separation of the two datasets along the line, and hence the direction and magnitude of translation required to bring the datasets into translational alignment.

The lines onto which the points are projected are common to both clouds of points. The at least three lines could be the Cartesian co-ordinate axes or a geographic co-ordinate system or spherical or cylindrical co-ordinates. Optionally, a plurality of lines are analysed per axis of interest.

The projection onto a line is effectively a collapsing of the three dimensional point cloud onto a rod or line. The projection onto the line may be along a vector normal to the line, at an angle to the line, or along a curve intersecting the line. The lines of projection may be the Cartesian co-ordinate axes or a geographic co-ordinate system or spherical or cylindrical co-ordinates A fine-alignment procedure may be performed: the step between successive angles is reduced and a range of angles between the relative angle of rotation and its adjacent neighbour in each direction in the initial steps processed again in order to determine whether an angle of relative rotation yielding a best/greatest correlation value greater than the previously determined maximum value can be determined, and if so, to record said angle of relative rotation as a new angle of rotational alignment. Such fine-alignment procedure may be performed iteratively, reducing the step each time. The reduction in step at each iteration may be, for example, $1/10$.

Figure 13:
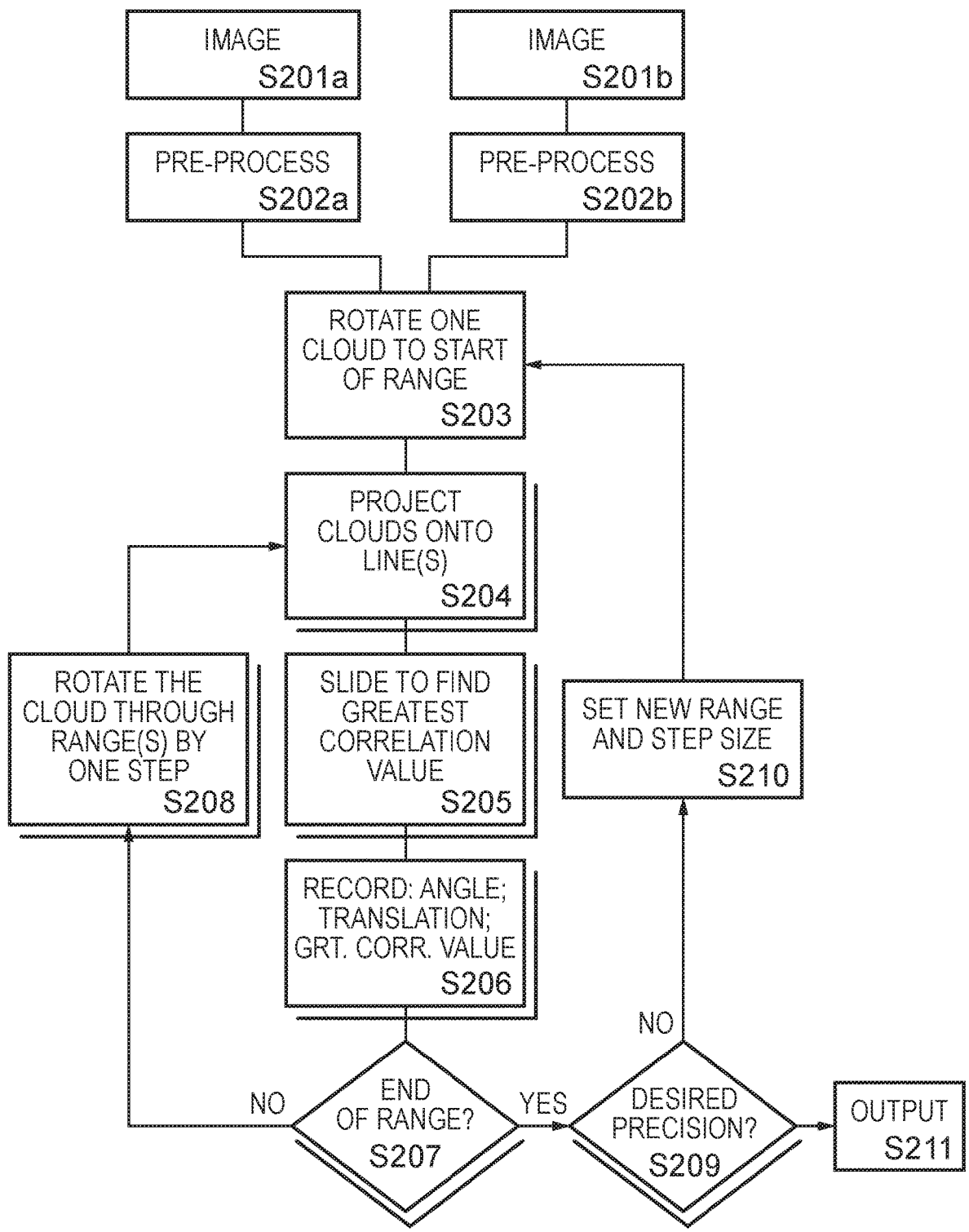
FIG. 13 is a schematic illustration of an embodiment of a further aspect.

FIG. 13 is a flowchart detailing an exemplary rotational alignment process according to the further aspect.

At step S201a & S201b, the first and second datasets are obtained. For example, the first dataset is obtained by scanning part of a 3D scene to obtain 3D point cloud data as a first dataset. The second dataset is obtained by scanning a part of the 3D scene which overlaps or has in common part of the region scanned in the first dataset to obtain a 3D point cloud as the second dataset. This scan can be done at the same time, before or after obtaining the first dataset. In an example in which the same imaging apparatus is used for both scans, the imaging apparatus translation position in deltax, deltay, deltaz, and rotation in alpha, beta, gamma angles relative to the same 3D scene will have changed between scans in a completely or partially unknown manner.

At step S202a & S202b, pre-processing of the obtained datasets is performed. At the end of the pre-processing, the datasets are represented as point clouds in a common 3-dimensional coordinate system, that is, a notional 3D workspace having a single coordinate system. The pre-processing may include one or more of the following:

Converting the first and second datasets to .xyz format;

Spatial Sampling to Even Out the Point Density

If the imaging apparatus recorded information about level, compass bearing, altitude, then using this information to place the respective dataset within the common 3-dimensional coordinate system;

Select and implement an appropriate representation for the dataset;

Filter and clean the datasets by removing artefacts or clusters of otherwise isolated points floating in the 3D space which commonly occur when the imaging apparatus interrogates the edge of a nearby object in the same line of sight as a far object;

Filter and clean the scan by removing unwanted objects, including, for example, people and furniture;

Filter and clean the scan by applying range filtering;

A non-linear filter can be applied in which edges, planes, cylinders, sphere and other shapes are recognised and the points associated with them are preserved for further processing while the rest are removed. A list of known and novel algorithms for achieving this function are listed in Annex E. The choice of such complex features depends on the 3D scene, so for buildings edges and planes can be beneficial. If the imaging apparatus is very noisy and the scene is known to contain certain complex features it can be beneficial to find those complex features by fitting known shapes to reduce the scatter of points due to noise. Then the points can be projected along the nearest surface normal onto the complex feature.

At S203, the axes of rotation are determined along with projection lines, and the rotational alignment processing begins. The rotational alignment processing of steps S203 to S210 is repeated for each axis of rotation about which an alignment angle is sought. The rotational alignment processing of steps S203 to S210 may be performed for each of two or three axes as parallel processing. In terms of processing procedure, it may be that all three angles are changed together using some optimisation technique to maximise the correlations along all projection lines simultaneously. One method is to search the parameter space by doing coarse angles and then homing in on the angles which give highest correlations along all lines and then doing a fine search. Optimisation techniques include gradient descent, simulated annealing, genetic algorithms, or Levenberg Marquardt.

The projection lines (i.e. the lines onto which the scans are collapsed) may, for example, be selected as three lines at an angle to each other. In the case of three lines, the third line must not be in the same plane as the other two lines and ideally should be at a large angle to that plane. Optionally, the three lines are orthogonal and form the three axes, x, y, z. Also optionally, in building scans the lines may be selected to align with the edges of the floor and walls. Optionally, the axes are chosen so that the first point cloud when collapsed onto an axis and correlated with itself does not generate periodic matching peaks of a similar magnitude. If it does that then rotate the first point cloud until one clear peak is seen in its autocorrelation along each axis.

Optionally, >1 line may be used. The multiple lines in the plane of a 2D image are at different angles and ideally normal to line or partial line features in the image. The lines in a 3D point cloud should ideally be normal to surfaces or surface segments or parallel to directions of highest change in point density. To save computation instead of having thousands of lines just those associated with the largest plane surface areas are selected. One way to do this is to find the surface normal vectors as disclosed herein, and plot them on a Gaussian sphere. Then calculate the point density on the surface of the Gaussian Sphere using equal area patches on the sphere surface. Then threshold to just select the regions of the highest point density. An alternative method is to use non-linear processing to emphasise the high point density values and contrast by raising the point density to the power of a number or raising 10 or e to the power of the point density. Then find the centroid of each peak point density cluster. The vectors on the Gaussian sphere to these centroids is the direction of each projection line as the largest areas have the most surface normal vectors and so give the highest peak point density. So in a room it would be the walls, floor and ceiling. In a room in the roof, there would be lines for the floor and the two sloping roof walls and the two end walls. In a cylindrical room the apparatus projects onto the floor onto the circular line which is the base of the wall. The point density pattern on the Gaussian sphere can also be used to find the plane normal to the axis of the cylinder. The apparatus looks for or fits a great circle to the peak point density around the Gaussian sphere. This great circle plane is the plane normal to the axis of the cylinder. The apparatus may also project onto two orthogonal straight lines on the floor as well to try to find the rotation assuming that there were some non-symmetric features in the room. Lines are chosen which give very high point densities and contrast ideally at certain points along the line or all along the line compared to other points on the line. After projection and before correlation the high point density values and contrast may be emphasised by raising the point density to the power of a number or raising 10 or e to the power of the point density.

For the particular axis of rotation, angles of rotation within a range between two extremes are considered in a stepwise manner. The steps may be at a desired level of precision, and the range may be a complete rotation. Optionally, the steps may be coarser than a desired level of precision, with the procedure of S203 to S208 performed iteratively with an ever-increasing precision level until a desired level of precision is reached. An approach might be to look for the coarse angles giving the highest correlations and then do a fine search just around them and not at all angles. Wherein a desired level of precision may be specified by an apparatus user. One of the point clouds remains fixed while the other is rotated. The rotating point cloud is rotated to the start of the range.

At step S204, the two point clouds are collapsed onto the line for the respective axis of rotation, and stored as two projections (i.e. one-dimensional arrays along the line). For example, S204 comprises collapsing or projecting all of first point cloud and second point cloud onto the line. If the line is a co-ordinate axis this is done by setting two of the co-ordinates to zero for a projection onto the third co-ordinate line. This type of collapse represents a projection onto the axis along a vector normal to the axis. Other types of projection or collapse along curved lines or lines at an angle to the axis or in a non-linear fashion are also possible.

Optionally, a non-linear or linear magnitude scaling can be applied to the respective projections, for example, to emphasise stronger magnitudes using an exponential or power law function or to suppress stronger magnitudes using a logarithmic function, for example.

It is noted that the loop defined by steps S204 to S208 may be performed in parallel for plural lines. The rotation at S208 is a change of relative angular relation of the two point clouds, and may be a change about one, two, or three angles of rotation. Via the loop S204 to S208, ranges of angles about one, two, or three angles of rotation are iterated through to find the greatest correlation value. Noting that where plural lines are used an agreement is required between all or a predefined proportion of the plural lines as to the angle about each axis yielding the greatest correlation value.

At step S205, the projections are translated along the line relative to one another in a stepwise manner for a range of translations between two extremes. At each step, a degree of matching (e.g. a mathematical correlation value) between the two projections is calculated, so that at the end of the stepwise translations a greatest degree of matching (represented by a greatest correlation value) is found (i.e. the maximum among the mathematical correlation values at the present rotation). At S206, the angle of the present rotation is recorded (noting that the important angle is the angle relative to the version of the point cloud prior to the start of S203), along with the greatest correlation value calculated during the stepwise sliding, and the translation of the point clouds along the line relative to their positions at the end of S202.

At S207, it is checked whether the end of the range of angles has been reached. If not, the flow proceeds to S208, in which the point cloud is rotated through the range by another step, and steps S204 to S207 repeated. If yes, the flow proceeds to S209, wherein it is determined whether the step size by which the point cloud was rotated matches a desired level of precision. If not, the flow proceeds to step S210, at which a new range is set (which may be the recorded angle plus one step either side (of the previous step size) and a new step size set (which may the step size required to satisfy the desired level of precision). If the first rotation is using very coarse angle steps it is likely that there may be several angles at which the same magnitude of correlation is achieved. So a fine search is performed around each one. Alternatively, the new step size may be a predetermined number of divisions of the range, for example, 100 or 1000, so that the step size is dependent on the range, and the process continues iteratively until the desired level of precision is satisfied.

At step S211, of all the angles, translations, and greatest correlation values recorded for the axis of rotation, a maximum greatest correlation is found (simultaneously for all of the projection lines), and the corresponding angle of rotation and translation (i.e. the amount by which each point cloud was shifted along the line relative to its stored position at the end of S202 to obtain the greatest correlation value—noting that only one point cloud need move, so the translation may be expressed as a value for the moved point cloud only) obtained. The angle of rotation (expressed as an angle of rotation of the point cloud about the respective axis of rotation relative to its angle of rotation about the same axis of rotation in the form in which the point cloud is stored at the end of S202) tells how much the rotated point cloud needs to be rotated about the respective axis of rotation for rotational alignment with the other point cloud. The translation, along with identification of the line, tells how much (and along what line and in what direction) the point cloud shifted during S205 is to be shifted to obtain translational alignment with the other point cloud. Once steps S203 to S210 have been completed for each axis of rotation of interest, a vector of rotation angles to obtain rotational alignment and a translation vector to obtain translational alignment are obtained. The vectors themselves can be output at S211, or used to rotationally and translationally align the point clouds, which are output as merged point clouds at S211.

When there are multiple projection lines it is necessary to move along a vector whose projection onto each of the multiple lines is closest to the translation values recorded. This is done by creating a trial vector and calculating the errors on each line and then adjusting the angle and length of the vector to minimise those errors. For example, the trial vector is in the direction given by the vector sum of all the vectors along each line. For example, the trial vector magnitude is the maximum magnitude of the vectors along each line. Alternatively, it can be done by statistical search and optimised convergence such as genetic algorithms or gradient descent or simulated annealing or Levenberg Marquardt to minimise the sum of the errors along each line or better the error along each line.

The method set out in FIG. 13 aligns 3D to 2D and 2D at one rotation and translation in a 3D space to another 2D at another rotation and translation in the 3D space. This 2D to 2D alignment in a 3D space is of relevance to line scan LIDARs on a self driving car if the scanner rotates very fast compared to the cars speed. If the car is slower the line scan lidar will scan a helix and the rotation from one scan to the next and so the bend and twist in the helix can be found by the method. Note that there is no overlap at all of the successive adjacent line scans for forward moving cars. In this case one "line" (of projection) could be a circle centred on the centre of the helix. The apparatus allows this to be done in real time. So that the previous few scans are aligned into a 3D volume and the most recent new scan is to be aligned to this 3D volume. Advantageously, any errors in the alignment of previous scans from one scan to another in the recording due to moving objects or noise will be averaged out. Only a few previous scans can be combined in this way as the surrounding environment may only have certain features which continue to persist in the same place relative to the vehicle from one scan to another. When the vehicle enters or exits a tunnel the averaging cannot be used. This can easily be detected by detecting sudden changes and can be compensated by using a LIDAR whose scan is at an angle to the forward direction and using more than one LIDAR whose scans are at an angle to each other, say at plus and minus an angle to the forward direction. When there are two LIDAR scanners alignment of each new scan from one scanner with previous scans from that scanner should be carried out at the same time as the equivalent alignment for the other scanner and an average or optimised rotation and translation vector calculated which is consistent with both scanners and with the velocity measurement system of the vehicle and any onboard accelerometers and gyroscopes and barometers and magnetometers and inclinometer readings.

The further aspect, and indeed any other aspect, may be implemented by a computing apparatus such as that illustrated in FIG. 5 and described above.

The invention claimed is:
1. An apparatus comprising:
 a 3D dataset acquisition unit, configured to:
  obtain from an imaging apparatus at a first position and orientation, a first 3D dataset of a first space at a first time, the first 3D dataset being a first point cloud in three dimensions, each point in the first point cloud representing a reading within the first space by the imaging apparatus; and
  obtain from an imaging apparatus at a second position and orientation, a second 3D dataset of a second space at a second time, the second space and the first space overlapping, the second 3D dataset being a second point cloud in three dimensions, each point in the second point cloud representing a reading within the second space by the imaging apparatus;

a storage unit configured to store the first 3D dataset and the second 3D dataset as respective clouds of points in a common coordinate system; and a rotational alignment processor configured to:
  transform the stored first point cloud into a first set of vectors, and transform the stored second point cloud into a second set of vectors, wherein each member of the first set of vectors and each member of the second set of vectors represents the respective point and neighbouring points;
  find at which angle of rotation of the second set of vectors relative to the first set in one or more of three axes of rotation, defined in the common coordinate system, the greatest degree of matching between the angular distribution of the first set of vectors and the angular distribution of the second set of vectors is obtained, the degree of matching being measured to compare the angular distributions of the first and second sets of vectors; and either:
    output the angle of rotation about each of the one or more axis or axes of rotation for which the calculated degree of matching is greatest; or
    rotate the second point cloud by the found angle of rotation about the respective one or more axes of rotation in the common coordinate system and output the rotated second point cloud in the common coordinate system;
wherein
  the apparatus further comprises:
  a translational alignment processor configured to:
  for a line and a plane in the common coordinates system, wherein the line is at an angle to or normal to the plane:
    record the position, relative to an arbitrary origin, of a projection onto the line of each point among the first point cloud and store the recorded positions as a first 1-dimensional array, and/or store one or more properties or readings of each point at the respective recorded position as the first 1-dimensional array;
    record the position, relative to an arbitrary origin, of a projection onto the plane of each point among the first point cloud, and store the recorded positions as a first 2-dimensional array, and/or store one or more properties or readings of each point at the respective recorded position as the first 2-dimensional array;
    record the position, relative to the arbitrary origin, of the projection onto the line of each point among the rotated second point cloud, and store the recorded positions as a second 1-dimensional array, and/or store one or more properties or readings of each point at the respective recorded position as the second 1-dimensional array;
    record the position, relative to an arbitrary origin, of a projection onto the plane of each point among the rotated second point cloud, and store the recorded positions as a second 2-dimensional array, and/or store one or more properties or readings of each point at the respective recorded position as the second 2-dimensional array;
    find a translation along the line of the second 1-dimensional array relative to the first 1-dimensional array at which a greatest degree of matching between the first 1-dimensional array and the second 1-dimensional array is computed, and record the translation at which the greatest degree of matching is computed; and
    find a translation, in the plane, of the second 2-dimensional array relative to the first 2-dimensional array at which a greatest degree of matching between the first 2-dimensional array and the second 2-dimensional array is computed, and record said translation;
  output either:
    the first point cloud and the rotated second point cloud as a merged point cloud in the common coordinate system, with the rotated second point cloud translated along the line and in the plane in the common coordinates system by the respective recorded translation; and/or
    a vector representation of the recorded translation along the line and in the plane, and a vector representation of the three axes of rotation and the respective found angles of rotation; and/or
    the rotated second point cloud translated along the line and in the plane in the common coordinates system by the respective recorded translation.

2. An apparatus comprising:
a 3D dataset acquisition unit, configured to:
  obtain from an imaging apparatus at a first position and orientation, a first 3D dataset of a first space at a first time, the first 3D dataset being a first point cloud in three dimensions, each point in the first point cloud representing a reading within the first space by the imaging apparatus; and
  obtain from an imaging apparatus at a second position and orientation, a second 3D dataset of a second space at a second time, the second space and the first space overlapping, the second 3D dataset being a second point cloud in three dimensions, each point in the second point cloud representing a reading within the second space by the imaging apparatus;
a storage unit configured to store the first 3D dataset and the second 3D dataset as respective clouds of points in a common coordinate system; and
a rotational alignment processor configured to:
  transform the stored first point cloud into a first set of vectors, and transform the stored second point cloud into a second set of vectors, wherein each member of the first set of vectors and each member of the second set of vectors represents the respective point and neighbouring points;
  find at which angle of rotation of the second set of vectors relative to the first set in one or more of three axes of rotation, defined in the common coordinate system, the greatest degree of matching between the angular distribution of the first set of vectors and the angular distribution of the second set of vectors is obtained, the degree of matching being measured to compare the angular distributions of the first and second sets of vectors; and either:
    output the angle of rotation about each of the one or more axis or axes of rotation for which the calculated degree of matching is greatest; or
    rotate the second point cloud by the found angle of rotation about the respective one or more axes of rotation in the common coordinate system and output the rotated second point cloud in the common coordinate system;
wherein
the vectors of the first set of vectors and the vectors of the second set of vectors each comprise a plurality of subsets of vectors, each subset among the plurality representing the respective point cloud as vectors of a particular type, the particular type being different from that of the other subsets;
wherein, the particular types include one or more from among:

surface normal unit vectors, wherein the reading represented by each point in the first and second point clouds is a reading of a surface or interface between two materials, sum vectors, divergence vectors, a divergence vector being a vector in the same direction as the surface normal vector at the same point and having a magnitude proportional to the average divergence angle between the point and a set of neighbouring points, the angle deviation between each member of the set of neighbouring points and the point being the angle deviation between the normal at the member of the set of neighbouring points and the normal at the point;

edge vectors, an edge vector representing an edge, cylinder vectors, a cylinder vector representing a cylinder, pipe, or column, plane vectors, a plane vector representing a plane area, point density gradient vectors, a point density gradient vector representing the direction of increase of point density, point density gradient divergence vectors, a point density gradient vector representing where the point density gradient vectors diverge, and gradient vectors;

wherein, in finding the greatest degree of matching between the angular distribution of the first set of vectors and the angular distribution of the second set of vectors, degrees of matching between subsets of vectors of the same particular type are calculated on a type-by-type basis, and the degree of matching at any translation or angle of rotation, is a combination of the degrees of matching for the respective particular types, the combination being an average or a weighted average;

and wherein, in a case in which one of the particular types is sum vectors:

the vectors of the first set of vectors are sum vectors, and the vectors of the second set are sum vectors; and transforming the first point cloud into a first set of sum vectors and transforming the second point cloud into a second set of sum vectors, comprises:

for each point cloud individually, for each point in the respective point cloud as an inquiry point: form a search radius sphere of predetermined radius around the inquiry point or find a specific number of nearest neighbour points; calculate vectors from the inquiry point to all other points within the search radius sphere or within the near neighbourhood; sum the calculated vectors to obtain the sum vector.

3. The apparatus according to claim 1 or 2, wherein a 3D pattern matching algorithm is executed on the first point cloud and the second point cloud to recognise sets of points describing instances of features identifiable by said algorithm, to label the members of the sets of points as members of an instance of the respective identified feature, said label being a property of the labelled point; wherein in finding a greatest degree of matching between the first 1-dimensional array and the second 1-dimensional array, and/or between the first 2-dimensional array and the second 2-dimensional array, degrees of matching for instances of the same feature are calculated on a feature-by-feature basis, and the degree of matching is a weighted combination of the feature-by-feature degrees of matching, weighted according to the number of labelled points labelled as members of an instance of the respective feature.

4. The apparatus according to claim 1 or 2, wherein:

the imaging apparatus from which one or both of the first 3D dataset and the second 3D dataset is obtained is either a LIDAR scanner, optical 3D scanning apparatus including photogrammetry, or a sonar scanner.

5. The apparatus according to claim 1 or 2, wherein the imaging apparatus from which one or both of the first 3D dataset and the second 3D dataset is obtained is an electrical resistivity tomography scanner inserted into a ground surface and the imaged space is below the ground surface; or the imaging apparatus from which one or both of the first 3D dataset and the second 3D dataset is obtained is an electrical impedance tomography scanner comprising electrodes for placement on a skin of a subject animal, and the imaged space is interior of the subject animal.

6. The apparatus according to claim 1 or 2, wherein the imaging apparatus from which one or both of the first 3D dataset and the second 3D dataset is obtained is an MRI scanner or a scanner detecting nuclear quadrupole resonance, and the imaged space is the interior of a subject animal.

7. The apparatus according to claim 6, wherein the recognising is implemented by executing a segmentation algorithm on the first set of surface normal unit vectors and on the second set of surface normal unit vectors, respectively.

8. The apparatus according to claim 1 or 2, wherein the 3D dataset acquisition unit comprises a denoising processor, wherein obtaining the first 3D dataset and obtaining the second 3D dataset includes the denoising processor executing a denoising algorithm on the first point cloud, and executing the denoising algorithm on the second point cloud.

9. The apparatus according to claim 1 or 2, wherein the reading represented by each point in the first and second point clouds is a reading of a surface or interface between two materials; and the vectors of the first set of vectors are surface normal unit vectors, and the vectors of the second set are surface normal unit vectors; and transforming the first point cloud into a first set of surface normal vectors and transforming the second point cloud into a second set of surface normal vectors, comprises generating the first set of surface normal vectors and generating the second set of surface normal vectors by:

for each point cloud individually, for each point in the respective point cloud as an inquiry point: selecting a set of neighbour points, calculating a covariance matrix for the set of neighbour points and the inquiry point; solving the covariance matrix to find the three eigenvalues and three eigenvectors for the covariance matrix, determining the eigenvector with the smallest eigenvalue, normalising the eigenvector to a predetermined unit length, adding the normalised unit vector to the respective first or second set of normal vectors.

10. The apparatus according to claim 9, wherein selecting the set of neighbour points for the inquiry point comprises either selecting each of the points within a sphere of a predefined radius with an origin coincident with the inquiry point, or selecting the N nearest points to the inquiry point; and transforming the first point cloud into a first set of surface normal unit vectors and/or transforming the second point cloud into a second set of surface normal unit vectors further comprises:
storing the respective set of surface normal unit vectors as a reference set of normal unit vectors;
repeating the generating the respective set of surface normal unit vectors with a progressively smaller radius of the sphere until a minimum radius is reached, at which point the repeating is terminated and the reference set of surface normal unit vectors is set as the respective set of surface normal unit vectors, at each repetition:
determining a degree of confidence with which the respective set of surface normal unit vectors generated in the repetition match the reference set of surface normal unit vectors, and
if the determined degree of confidence satisfies a predetermined criterion, setting the reference set of surface normal unit vectors as the respective set of surface normal unit vectors, and terminating the transforming, and
if the determined degree of confidence does not satisfy the predetermined criterion, replacing the stored reference set of surface normal unit vectors with the respective set of surface normal unit vectors generated in the repetition, and continuing the repeating.

11. The apparatus according to claim 1 or 2, wherein
edge detection is performed using the sum vectors, wherein the magnitude of the sum vectors are used to detect sum vectors representing edges and those representing corners, with larger magnitude indicating a vector representing an edge; and
surface feature detection is performed by calculating the vector dot product of the sum vector originating from a point of the point cloud and one or more nearby surface normal vectors, the angle having a cosine that is equal to the calculated vector dot product indicating the presence of a surface feature, and identifying the surface feature as an edge, a corner, or a hole or occlusion.

12. The apparatus according to claim 1 or 2, wherein
transforming the stored first point cloud into a first set of vectors, and transforming the stored second point cloud into a second set of vectors, wherein each member of the first set of vectors and each member of the second set of vectors represents the respective point and neighbouring points, includes executing an autoencoder on the stored first and second point clouds, or on a set of vectors representing said point clouds;
the autoencoder being an unsupervised deep learning algorithm for extracting features within the 3D space; wherein
the extracted features are represented by corresponding vectors in which position, orientation, and magnitude of the vector is determined by position, orientation, and dimension or dimensions of the extracted feature.

13. An apparatus according to claim 1 or 2, wherein transforming the stored first and second point clouds into first and second sets of vectors includes applying a non-linear filter to the point clouds or sets of vectors, wherein applying the non-linear filter comprises excluding from further processing any point from the point clouds, or any vectors from the sets of vectors, not recognised as representing edges by an edge detection algorithm.

14. An apparatus according to claim 1 or 2, wherein the rotational alignment processor is configured to transform the stored first and second point clouds into first and second sets of vectors, respectively, by,
for each point in the respective point cloud as an inquiry point:
calculating a surface normal;
calculating an angle deviation between the surface normal at the inquiry point compared to the surface normal of all of the near neighbour points within a small search radius sphere or for a specified number of nearest neighbour points;
calculating an average of the calculated angle deviations for the inquiry point;
obtaining, as the vector for the inquiry point in the respective set of vectors, a divergence vector, the divergence vector being a vector having the direction of the surface normal calculated for the inquiry point, and having a length proportional to the calculated average; and
filtering the first and second set of vectors by selecting those divergence vectors longer than a certain specified threshold value.

15. An apparatus according to claim 1 or 2, wherein transforming the stored first and second point clouds into first and second sets of vectors includes:
finding planes by one or more from among: RANSAC plane detection, Hough Transform plane detection, and region growing based on surface curvature, surface normal angle deviation, colour, reflectivity or roughness and distance from the plane;
finding the area of each plane;
and wherein the respective set of vectors includes a vector for each found plane, the vector being a plane vector, which is a surface normal vector having a length equal to the area of the plane.

16. An apparatus according to claim 1 or 2, wherein,
the vectors of the first set of vectors include cylinder vectors, and the vectors of the second set include cylinder vectors; and transforming the first point cloud into a first set of cylinder vectors and transforming the second point cloud into a second set of cylinder vectors, respectively, comprises:
using a method for recognition of cylinders in the respective 3D dataset and finding the radius, position and orientation of each recognised cylinder;
and including in the respective set of vectors, a cylinder vector for each recognised cylinder, the cylinder vector for the recognised cylinder lying along, and parallel to, the orientation of the axis of the recognised cylinder, and having a length related to the radius of the recognised cylinder.

17. An apparatus according to claim 16, wherein
the method for recognition of cylinders in a 3D dataset comprises:
executing a segmentation algorithm to find potential cylinder candidates;
choose two random points lying within a certain distance of one another and lying on the same potential cylinder;
calculate a cylinder model for the potential cylinder on which the two points lie, the cylinder model comprising orientation, radius, and position;
based on surface curvature or surface angle deviation of the cylinder model, investigate points within a predetermined distance of the cylinder surface and, for any investigated points having a surface curvature or surface angle deviation within a predetermined threshold range of the surface curvature or surface angle deviation of the cylinder model, region grow the cylinder model to include the investigated points.

18. The apparatus according to claim 1 or 2, wherein finding at which angle of rotation of the second set of vectors relative to the first set in one or more of three axes of rotation defined in the common coordinate system the greatest degree of matching between the angular distribution of the first set of vectors and the angular distribution of the second set of vectors is obtained, comprises:
   attributing a common origin to the vectors in the first and second sets of vectors;
   dividing a notional sphere centred on the common origin into surface regions or volume regions;
   finding at which angle of rotation of the second set of vectors relative to the first set in each of the one or more of the three axes of rotation defined in the common coordinate system the best match between the vector point distribution of vectors from the first set of vectors and the vector point distribution of vectors from the second set of vectors among the surface regions or volume regions is obtained.

19. The apparatus according to claim 1 or 2, wherein the reading represented by each point in the first and second point clouds is a reading of a surface or interface between two materials;
   the rotational alignment processor is further configured, before finding the best match between the angular distributions of the first and second sets of vectors, to:
   filter the first and second sets of vectors by recognising, in both sets, surface normal unit vectors representing one of template shapes, and removing from the respective sets surface normal unit vectors not recognised as representing one of the template shapes.

20. An apparatus according to claim 1 or 2, further comprising:
   a translation alignment processor configured to find 3D objects and features in the first point cloud that match 3D objects and features in the second point cloud;
   find the translation vectors which bring said 3D objects and features into alignment in the two point clouds;
   find the most common translation vector from among said translation vectors by plotting histogram graphs of the lengths and angles of the translation vectors relative to three orthogonal axes, choosing the most common length and angles, and selecting any vectors within a small range of the most common vectors, and discarding the rest;
   performing translational alignment of the two point clouds based on the most common translation vectors and the selected vectors.

21. The apparatus according to claim 2, wherein the apparatus further comprises:
   a translational alignment processor configured to:
   for each of three or more lines in the common coordinates system, wherein each pair of lines from among the three or more lines is non-parallel and at least one pair of lines from among the three or more lines is non-coplanar:
      record the position, relative to an arbitrary origin, of a projection onto the line of each point among the first point cloud;
      store the recorded positions as a first 1-dimensional array, and/or store one or more properties or readings of each point at the respective recorded position as the first 1-dimensional array;
      record the position, relative to the arbitrary origin, of the projection onto the line of each point among the second point cloud;
      store the recorded positions as a second 1-dimensional array, and/or store one or more properties or readings of each point at the respective recorded position as the second 1-dimensional array;
      find a translation along the line of the second 1-dimensional array relative to the first 1-dimensional array at which a greatest degree of matching between the first 1-dimensional array and the second 1-dimensional array is computed, and record the translation at which the greatest degree of matching is computed; and
   output either:
      the first point cloud and the rotated second point cloud as a merged point cloud in the common coordinate system, with the rotated second point cloud translated along each of the three or more lines in the common coordinates system by the respective recorded translation; and/or
      a vector representation of the three lines and recorded translation along each of the three or more lines, and a vector representation of the three axes of rotation and the respective found angles of rotation; and/or
      the rotated second point cloud translated along each of the three or more lines in the common coordinates system by the respective recorded translation.

22. An apparatus according to claim 21, wherein rotational movement of the imaging apparatus is tracked with the angles of rotation output by the rotational alignment processor; and
   movement of the imaging apparatus between obtaining the two point clouds is tracked with the vector representation of the three lines and the recorded translation along each of the three lines output by the translation processor.

23. An apparatus according to claim 22, wherein the imaging apparatus is mounted to a vehicle, and a vehicle track is obtained from the vector representation of the three lines and the recorded translation along each of the three lines.

24. The apparatus according to claim 2, wherein the apparatus further comprises:
   a translational alignment processor configured to:
   for a line and a plane in the common coordinates system, wherein the line is at an angle to or normal to the plane:
      record the position, relative to an arbitrary origin, of a projection onto the line of each point among the first point cloud and store the recorded positions as a first 1-dimensional array, and/or store one or more properties or readings of each point at the respective recorded position as the first 1-dimensional array;
      record the position, relative to an arbitrary origin, of a projection onto the plane of each point among the first point cloud, and store the recorded positions as a first 2-dimensional array, and/or store one or more properties or readings of each point at the respective recorded position as the first 2-dimensional array;
      record the position, relative to the arbitrary origin, of the projection onto the line of each point among the rotated second point cloud, and store the recorded positions as a second 1-dimensional array, and/or store one or more properties or readings of each point at the respective recorded position as the second 1-dimensional array;

record the position, relative to an arbitrary origin, of a projection onto the plane of each point among the rotated second point cloud, and store the recorded positions as a second 2-dimensional array, and/or store one or more properties or readings of each point at the respective recorded position as the second 2-dimensional array;

find a translation along the line of the second 1-dimensional array relative to the first 1-dimensional array at which a greatest degree of matching between the first 1-dimensional array and the second 1-dimensional array is computed, and record the translation at which the greatest degree of matching is computed; and find a translation, in the plane, of the second 2-dimensional array relative to the first 2-dimensional array at which a greatest degree of matching between the first 2-dimensional array and the second 2-dimensional array is computed, and record said translation;

output either:

the first point cloud and the rotated second point cloud as a merged point cloud in the common coordinate system, with the rotated second point cloud translated along the line and in the plane in the common coordinates system by the respective recorded translation; and/or a vector representation of the recorded translation along the line and in the plane, and a vector representation of the three axes of rotation and the respective found angles of rotation; and/or the rotated second point cloud translated along the line and in the plane in the common coordinates system by the respective recorded translation.

25. A system comprising:

a first imaging apparatus configured to generate, at a first position and orientation a first 3D dataset, the first 3D dataset of a first space at a first time;

a second imaging apparatus configured to generate, at a second position and orientation, a second 3D dataset, the second 3D dataset of a second space at a second time, the second space and the first space overlapping, wherein, either the second imaging apparatus is the first imaging apparatus and the second time is different from the first time, or the second imaging apparatus is different from the first imaging apparatus;

an apparatus according to claim 1 or 2, wherein the imaging apparatus at the first position and orientation is the first imaging apparatus, and the imaging apparatus at the second position and orientation is the second imaging apparatus.

26. A method comprising:

obtaining a first 3D dataset of a first space at a first time, the first 3D dataset being a first point cloud in three dimensions, each point in the first point cloud representing a reading within the first space by an imaging apparatus; and obtaining a second 3D dataset of a second space at a second time, the second space and the first space overlapping, the second 3D dataset being a second point cloud in three dimensions, each point in the second point cloud representing a reading within the second space by an imaging apparatus;

storing the first 3D dataset and the second 3D dataset as respective clouds of points in a common coordinate system;

transforming the stored first point cloud into a first set of vectors, and transforming the stored second point cloud into a second set of vectors, wherein each member of the first set of vectors and each member of the second set of vectors represents the respective point and neighbouring points;

finding at which angle of rotation of the second set of vectors relative to the first set in one or more of three axes of rotation, defined in the common coordinate system, the greatest degree of matching between the angular distribution of the first set of vectors and the angular distribution of the second set of vectors is obtained, the degree of matching being measured to compare the angular distributions of the first and second sets of vectors;

and either:

storing the angle of rotation about each of the one or more axis or axes of rotation for which the calculated degree of matching is greatest; or rotating the second point cloud by the stored angle of rotation about the respective one or more axes of rotation in the common coordinate system, and outputting the rotated second point cloud in the common coordinate system, wherein the method further comprises:

for a line and a plane in the common coordinates system, wherein the line is at an angle to or normal to the plane:

recording the position, relative to an arbitrary origin, of a projection onto the line of each point among the first point cloud and store the recorded positions as a first 1-dimensional array, and/or store one or more properties or readings of each point at the respective recorded position as the first 1-dimensional array;

recording the position, relative to an arbitrary origin, of a projection onto the plane of each point among the first point cloud, and store the recorded positions as a first 2-dimensional array, and/or store one or more properties or readings of each point at the respective recorded position as the first 2-dimensional array;

recording the position, relative to the arbitrary origin, of the projection onto the line of each point among the rotated second point cloud, and store the recorded positions as a second 1-dimensional array, and/or store one or more properties or readings of each point at the respective recorded position as the second 1-dimensional array;

recording the position, relative to an arbitrary origin, of a projection onto the plane of each point among the rotated second point cloud, and store the recorded positions as a second 2-dimensional array, and/or store one or more properties or readings of each point at the respective recorded position as the second 2-dimensional array;

finding a translation along the line of the second 1-dimensional array relative to the first 1-dimensional array at which a greatest degree of matching between the first 1-dimensional array and the second 1-dimensional array is computed, and record the translation at which the greatest degree of matching is computed; and finding a translation, in the plane, of the second 2-dimensional array relative to the first 2-dimensional array at which a greatest degree of matching between the first 2-dimensional array and the second 2-dimensional array is computed, and record said translation;

outputting either:
the first point cloud and the rotated second point cloud as a merged point cloud in the common coordinate system, with the rotated second point cloud translated along the line and in the plane in the common coordinates system by the respective recorded translation; and/or
a vector representation of the recorded translation along the line and in the plane, and a vector representation of the three axes of rotation and the respective found angles of rotation; and/or
the rotated second point cloud translated along the line and in the plane in the common coordinates system by the respective recorded translation.

27. A method comprising:
obtaining a first 3D dataset of a first space at a first time, the first 3D dataset being a first point cloud in three dimensions, each point in the first point cloud representing a reading within the first space by an imaging apparatus; and
obtaining a second 3D dataset of a second space at a second time, the second space and the first space overlapping, the second 3D dataset being a second point cloud in three dimensions, each point in the second point cloud representing a reading within the second space by an imaging apparatus;
storing the first 3D dataset and the second 3D dataset as respective clouds of points in a common coordinate system;
transforming the stored first point cloud into a first set of vectors, and transforming the stored second point cloud into a second set of vectors, wherein each member of the first set of vectors and each member of the second set of vectors represents the respective point and neighbouring points;
finding at which angle of rotation of the second set of vectors relative to the first set in one or more of three axes of rotation, defined in the common coordinate system, the greatest degree of matching between the angular distribution of the first set of vectors and the angular distribution of the second set of vectors is obtained, the degree of matching being measured to compare the angular distributions of the first and second sets of vectors;
and either:
storing the angle of rotation about each of the one or more axis or axes of rotation for which the calculated degree of matching is greatest; or
rotating the second point cloud by the stored angle of rotation about the respective one or more axes of rotation in the common coordinate system, and outputting the rotated second point cloud in the common coordinate system,
wherein
the vectors of the first set of vectors and the vectors of the second set of vectors each comprise a plurality of subsets of vectors, each subset among the plurality representing the respective point cloud as vectors of a particular type, the particular type being different from that of the other subsets;
wherein, the particular types include one or more from among:
surface normal unit vectors, wherein the reading represented by each point in the first and second point clouds is a reading of a surface or interface between two materials,
sum vectors,
divergence vectors, a divergence vector being a vector in the same direction as the surface normal vector at the same point and having a magnitude proportional to the average divergence angle between the point and a set of neighbouring points, the angle deviation between each member of the set of neighbouring points and the point being the angle deviation between the normal at the member of the set of neighbouring points and the normal at the point;
edge vectors, an edge vector representing an edge,
cylinder vectors, a cylinder vector representing a cylinder, pipe, or column,
plane vectors, a plane vector representing a plane area,
point density gradient vectors, a point density gradient vector representing the direction of increase of point density,
point density gradient divergence vectors, a point density gradient vector representing where the point density gradient vectors diverge, and
gradient vectors;
wherein, in finding the greatest degree of matching between the angular distribution of the first set of vectors and the angular distribution of the second set of vectors,
degrees of matching between subsets of vectors of the same particular type are calculated on a type-by-type basis, and the degree of matching at any translation or angle of rotation, is a combination of the degrees of matching for the respective particular types, the combination being an average or a weighted average;
and wherein, in a case in which one of the particular types is sum vectors:
the vectors of the first set of vectors are sum vectors, and the vectors of the second set are sum vectors; and transforming the first point cloud into a first set of sum vectors and transforming the second point cloud into a second set of sum vectors, comprises:
for each point cloud individually, for each point in the respective point cloud as an inquiry point: form a search radius sphere of predetermined radius around the inquiry point or find a specific number of nearest neighbour points; calculate vectors from the inquiry point to all other points within the search radius sphere or within the near neighbourhood; sum the calculated vectors to obtain the sum vector.

28. The method according to claim 26 or 27, wherein the outputting comprises outputting the rotated second point cloud and the stored first point cloud defined in a common coordinate system and/or the first and second point clouds in their respective coordinate systems with the one or more stored angles of rotation.

29. The method according to claim 27, the method further comprising:
a translational alignment process comprising:
for each of three or more lines in the common coordinates system, wherein each pair of lines from among the three or more lines is non-parallel and at least one pair of lines from among the three or more lines is non-coplanar:
recording the position, relative to an arbitrary origin, of a projection onto the line of each point among the first point cloud;

storing the recorded positions as a first 1-dimensional array, and/or storing one or more properties or readings of each point at the respective recorded position as the first 1-dimensional array;

recording the position, relative to the arbitrary origin, of the projection onto the line of each point among the rotated second point cloud; storing the recorded positions as a second 1-dimensional array, and/or storing one or more properties or readings of each point at the respective recorded position as the second 1-dimensional array;

finding a translation along the line of the second 1-dimensional array relative to the first 1-dimensional array at which a greatest degree of matching between the first 1D array and the second 1D array is computed, and recording the translation at which the greatest degree of matching is computed; and outputting either:

the first point cloud and the rotated second point cloud as a merged point cloud in the common coordinate system, with the rotated second point cloud translated along each of the three or more lines in the common coordinates system by the respective recorded translation; and/or a vector representation of the three or more lines and recorded translation along each of the three or more lines, and a vector representation of the three axes of rotation and the respective stored angles of rotation; and/or the rotated second point cloud translated along each of the three or more lines in the common coordinates system by the respective recorded translation.

30. A pair of point clouds defined in a common coordinate system obtained by the method according to claim 27.

31. An image processing method of claim 27, further comprising:

obtaining a point-cloud representation of a subject, the point-cloud representation being composed of a plurality of individual scans, each scan being a point-cloud representation of a portion of the subject, each scan overlapping one or more other scans and having a defined rotational and translational relation to said one or more other scans, wherein at least one of the scans is overlapping more than one other scan, and characterised by executing a global alignment process comprising:

for each of the plurality of individual scans as a subject point cloud, setting the one or more other scans overlapping with the subject scan as a reference point cloud, for each individual scan of the reference point cloud, executing a rotational alignment algorithm and translational alignment algorithm on the subject point cloud and the individual scan of the reference point cloud with the defined rotational and translation relation between the subject point cloud and the individual scan of the reference point cloud in the point-cloud representation of the subject as an initial estimation, to rotate and translate the subject point cloud relative to the individual scan of the reference point cloud until a process error criterion is met, to obtain a revised defined rotational and translational relation between the subject point cloud and the individual scan of the reference point cloud;

combining the revised defined rotational and translational relations between the subject point cloud and each of the individual scans in the reference point cloud;

implementing the combined revised defined rotational and translational relation between the subject point cloud and the reference point cloud in the point-cloud representation of the subject;

wherein executing the rotational alignment algorithm comprises rotationally aligning the pair of scans, as first and second 3D datasets, by the method of claim 27;

the method further comprising:

repeating the global alignment process one or more times, with a progressively stricter process error criterion on each repetition.

32. The image processing method according to claim 31, wherein the process error criterion is a maximum allowable error.

33. A method comprising:

obtaining a plurality of individual 3D datasets representing respective portions of a subject, the translational and rotational relations among the plurality of individual 3D datasets being unknown;

performing a method comprising, for each combination of a pair of individual 3D datasets among the plurality of individual 3D datasets:

storing the first 3D dataset and the second 3D dataset as respective clouds of points in a common coordinate system;

transforming the stored first point cloud into a first set of vectors, and transforming the stored second point cloud into a second set of vectors, wherein each member of the first set of vectors and each member of the second set of vectors represents the respective point and neighbouring points;

finding at which angle of rotation of the second set of vectors relative to the first set in one or more of three axes of rotation, defined in the common coordinate system, the greatest degree of matching between the angular distribution of the first set of vectors and the angular distribution of the second set of vectors is obtained, the degree of matching being measured to compare the angular distributions of the first and second sets of vectors; and either:

storing the angle of rotation about each of the one or more axis or axes of rotation for which the calculated degree of matching is greatest; or rotating the second point cloud by the stored angle of rotation about the respective one or more axes of rotation in the common coordinate system, and outputting the rotated second point cloud in the common coordinate system, wherein the vectors of the first set of vectors and the vectors of the second set of vectors each comprise a plurality of subsets of vectors, each subset among the plurality representing the respective point cloud as vectors of a particular type, the particular type being different from that of the other subsets; wherein, the particular types include one or more from among:

surface normal unit vectors, wherein the reading represented by each point in the first and second point clouds is a reading of a surface or interface between two materials, sum vectors, divergence vectors, a divergence vector being a vector in the same direction as the surface normal vector at the same point and having a magnitude proportional to the average divergence angle between the point and a set of neighbouring points, the angle deviation between each member of the set of neighbouring points and the point being the angle deviation between the normal at the member of the set of neighbouring points and the normal at the point;
edge vectors, an edge vector representing an edge,
cylinder vectors, a cylinder vector representing a cylinder, pipe, or column,
plane vectors, a plane vector representing a plane area,
point density gradient vectors, a point density gradient vector representing the direction of increase of point density,
point density gradient divergence vectors, a point density gradient vector representing where the point density gradient vectors diverge, and
gradient vectors;
wherein, in finding the greatest degree of matching between the angular distribution of the first set of vectors and the angular distribution of the second set of vectors
degrees of matching between subsets of vectors of the same particular type are calculated on a type-by-type basis, and the degree of matching at any translation or angle of rotation, is a combination of the degrees of matching for the respective particular types, the combination being an average or a weighted average;
and wherein, in a case in which one of the particular types is sum vectors:
  the vectors of the first set of vectors are sum vectors, and the vectors of the second set are sum vectors; and transforming the first point cloud into a first set of sum vectors and transforming the second point cloud into a second set of sum vectors, comprises:
  for each point cloud individually, for each point in the respective point cloud as an inquiry point: form a search radius sphere of predetermined radius around the inquiry point or find a specific number of nearest neighbour points; calculate vectors from the inquiry point to all other points within the search radius sphere or within the near neighbourhood; sum the calculated vectors to obtain the sum vector;
  the method further comprising:
  storing, in addition to the angle of rotation about the respective one or more axes of rotation, the magnitude of the corresponding greatest degree of matching between the angular distribution of the first set of vectors and the angular distribution of the second set of vectors;
for each individual 3D dataset among the plurality of individual 3D datasets: of all pairs including the individual 3D dataset as a member of the pair, identifying the pair for which the stored greatest degree of matching is the maximum, and optionally any pair for which the stored greatest degree of matching is within a defined range of said maximum, and performing, on each identified pair, a translational alignment process comprising:
for a line and a plane in the common coordinates system, wherein the line is at an angle to or normal to the plane:
  record the position, relative to an arbitrary origin, of a projection onto the line of each point among the first point cloud and store the recorded positions as a first 1-dimensional array, and/or store one or more properties or readings of each point at the respective recorded position as the first 1-dimensional array;
  record the position, relative to an arbitrary origin, of a projection onto the plane of each point among the first point cloud, and store the recorded positions as a first 2-dimensional array, and/or store one or more properties or readings of each point at the respective recorded position as the first 2-dimensional array;
  record the position, relative to the arbitrary origin, of the projection onto the line of each point among the rotated second point cloud, and store the recorded positions as a second 1-dimensional array, and/or store one or more properties or readings of each point at the respective recorded position as the second 1-dimensional array;
  record the position, relative to an arbitrary origin, of a projection onto the plane of each point among the rotated second point cloud, and store the recorded positions as a second 2-dimensional array, and/or store one or more properties or readings of each point at the respective recorded position as the second 2-dimensional array;
  find a translation along the line of the second 1-dimensional array relative to the first 1-dimensional array at which a greatest degree of matching between the first 1-dimensional array and the second 1-dimensional array is computed, and record the translation at which the greatest degree of matching is computed; and
  find a translation, in the plane, of the second 2-dimensional array relative to the first 2-dimensional array at which a greatest degree of matching between the first 2-dimensional array and the second 2-dimensional array is computed, and record said translation;
and, for each identified pair of individual 3D datasets as first and second 3D datasets, rotating the second point cloud by the stored angle of rotation about the respective one or more axes of rotation in the common coordinate system, translating the rotated second point cloud along the line and in the plane in the common coordinates system by the respective recorded translations from the translational alignment process, thereby obtaining a pairwise point cloud representation of the pair of individual 3D datasets with a fixed rotational and translational relation between the pair;
merging the pairwise point cloud representations of the pairs into a single point cloud by co-locating instances of the same individual 3D dataset appearing in more than one of the pairwise point cloud representations.

* * * * *